(12) United States Patent
Komma et al.

(10) Patent No.: US 8,305,864 B2
(45) Date of Patent: Nov. 6, 2012

(54) COMPOUND OBJECTIVE LENS, OPTICAL HEAD DEVICE, OPTICAL INFORMATION DEVICE, AND INFORMATION PROCESSING DEVICE

(75) Inventors: Yoshiaki Komma, Osaka (JP);
Katsuhiko Hayashi, Nara (JP);
Fumitomo Yamasaki, Nara (JP);
Michihiro Yamagata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/257,380

(22) PCT Filed: Jan. 7, 2011

(86) PCT No.: PCT/JP2011/000054
§ 371 (c)(1),
(2), (4) Date: Sep. 19, 2011

(87) PCT Pub. No.: WO2011/093007
PCT Pub. Date: Aug. 4, 2011

(65) Prior Publication Data
US 2012/0023514 A1    Jan. 26, 2012

(30) Foreign Application Priority Data

Jan. 27, 2010    (JP) .................................. 2010-014940
Mar. 25, 2010    (JP) .................................. 2010-070706

(51) Int. Cl.
*G11B 7/00* (2006.01)
(52) U.S. Cl. ................... 369/112.07; 369/121
(58) Field of Classification Search .................. None
See application file for complete search history.

(56) References Cited

U.S. PATENT DOCUMENTS 7,301,882 B2    11/2007    Itonaga
(Continued)

FOREIGN PATENT DOCUMENTS

JP    2004-71134    3/2004
(Continued)

OTHER PUBLICATIONS

International Search Report issued Apr. 19, 2011 in International (PCT) Application No. PCT/JP2011/000054.

*Primary Examiner* — Paul Huber
(74) *Attorney, Agent, or Firm* — Wenderoth, Lind & Ponack, L.L.P.

(57) ABSTRACT

A compound objective lens, an optical head device, an optical information device, and an information processing device that can inhibit the occurrence of aberration even when a light beam source wavelength shifts from the designed value. A diffraction structure having a sawtooth or stepwise cross section is formed in the region (R10) and region (R20). The height of the sawtooth or stepwise cross section formed in the region (R10) provides a light beam, which has a predetermined wavelength, with a difference in optical path length of N times the predetermined wavelength, as compared with a case of propagation in air. The height of the sawtooth or stepwise cross section formed in the region (R20) provides the light beam, which has the predetermined wavelength, with a difference in optical path length of J times the predetermined wavelength, as compared with a case of propagation in air. At least one of the difference in height between both ends of a boundary band (RB) provided between the region (R10) and the region (R20), and the width of the boundary band (RB) provides the light beam, which has the predetermined wavelength, with a difference in optical path length of (N+J)/2 times (N and J are mutually different natural numbers) the predetermined wavelength, as compared with a case of transmission in air.

22 Claims, 25 Drawing Sheets

U.S. PATENT DOCUMENTS

| | | |
|---|---|---|
| 7,672,212 B2 * | 3/2010 | Nakamura et al. ....... 369/112.12 |
| 2004/0047269 A1 * | 3/2004 | Ikenaka et al. ........... 369/112.08 |
| 2005/0157623 A1 | 7/2005 | Itonaga |
| 2010/0157777 A1 | 6/2010 | Mizuno |

FOREIGN PATENT DOCUMENTS

| | | |
|---|---|---|
| JP | 2005-203043 | 7/2005 |
| JP | 2005-243151 | 9/2005 |
| WO | 2007/013346 | 2/2007 |
| WO | 2009/016847 | 2/2009 |

* cited by examiner

COMPOUND OBJECTIVE LENS, OPTICAL HEAD DEVICE, OPTICAL INFORMATION DEVICE, AND INFORMATION PROCESSING DEVICE

This application is a 371 of PCT/JP2011/000054, filed Jan. 7, 2011.

TECHNICAL FIELD

The present invention relates to a compound objective lens in which an objective lens is combined with a diffraction structure, an optical head device that is provided with the compound objective lens and records, reproduces, and deletes information by using an optical information medium such as an optical disk, an optical information device provided with the optical head device, and an information processing device provided with the optical information device.

BACKGROUND ART

Optical memory techniques using an optical disk having a pit-like pattern as a high-density and large-capacity information medium have been put to practical use, the application thereof expanding to digital audio disks, video disks, text file disks, and then to data files. The functions enabling highly reliable and successful recording/reproduction of information on/from the optical disk with a micro-focused light beam are generally classified into a condensing function of forming a micro-spot of a diffraction limit, a focus control (focus servo) function of the optical system, a tracking control function, and a pit signal (information signal) detection function.

Recent progress in optical system design technology and transition to shorter wavelengths in semiconductor lasers, which are the light beam sources, has resulted in increased recording density of optical disks. An approach to increasing the density includes the increase in numerical aperture (NA) of optical disk in a condensing optical system that finely condenses an optical beam on the optical disk. In this case, the problem is associated with the increase in amount of aberration generated by inclination (the so-called tilt) of optical axis. Where the NA is increased, the amount of aberration generated in response to the tilt increases. The thickness of optical disk substrate (base material thickness) is decreased to prevent such an increase.

In compact disks (CD), which are called first-generation optical disks, an infrared light beam having a wavelength $\lambda 3$ (wavelength $\lambda 3$ is 780 nm to 820 nm) and an objective lens with an NA of 0.45 are used and the base material thickness of the optical disk is 1.2 mm. In the DVD of the second generation, a red light beam having a wavelength $\lambda 2$ (wavelength $\lambda 2$ is 630 nm to 680 nm) and an objective lens with an NA of 0.6 are used and the base material thickness of the optical disk is 0.6 mm. In the optical disks of the third generation, a blue light beam having a wavelength $\lambda 1$ (wavelength $\lambda 1$ is 390 nm to 415 nm) and an objective lens with an NA of 0.85 are used and the base material thickness of the optical disk is 0.1 mm.

In the present detailed description of the invention, the substrate thickness (or base material thickness) is a thickness from the surface of the optical disk (or optical recording medium) onto which a light beam falls to the information recording surface where information has been recorded.

Thus, the base material thickness of high-density optical disks has been decreased. From the standpoint of cost efficiency and space occupied by the device, an optical information device is desired in which information can be recorded/reproduced on/from optical disks of different base material thickness or recording density. Therefore, an optical head device is necessary that is equipped with a condensing optical system capable of condensing a light beam to a diffraction limit on optical disks with different substrate thickness.

For example, Patent Literature 1 discloses an optical information device designed for compatible reproduction. Principal components of the optical information device described in Patent Literature 1 will be explained below, as the conventional example, in a simple manner with reference to FIG. 27. FIG. 27 shows part of the objective lens that is provided in the optical head device located in the optical information device and serving to condense a light beam at the desired position on the optical disk.

In the conventional example, a diffraction action is used to condense, without aberration, incident light beams of substantially different wavelengths, such as a red light beam and an infrared light beam, through different base material thicknesses. As for a portion in which the grating period (pitch) should be decreased to increase the diffraction angle, the grating depth is increased and the grating period is enlarged. in FIG. 27, the objective lens has a region R21 and a region R22. The depth HB of the sawtooth diffraction grating of the region R22 is set to be twice as large as the depth HA of the sawtooth diffraction grating of the region R21, and the period (pitch) of the sawtooth diffraction grating of the region R22 is set to be twice as large as the period of the sawtooth diffraction grating of the region R21. The fabrication of the diffraction grating of the region R22 is thus facilitated.

When the shape of diffraction grating is changed between a plurality of regions and light beams diffracted from the plurality of regions are condensed in one point, as in the conventional example, phases of light beams in the boundaries of adjacent regions should be matched.

In the configuration described in Patent Literature 1, the height of the diffraction grating is doubled, the period is also doubled, and the diffraction direction is matched in the region R21 and region R22. The phase of the apex C21 as a boundary matches the phase of the apex C22 when the difference in optical path length that is caused by the height HA of the diffraction grating, that is, the phase difference, is an integer multiple of $2\pi$.

However, in the case of products produced in huge amounts, such as optical disks, the wavelength of light beam emitted from a semiconductor laser used as a light beam source has a spread of several nanometers. Further, the wavelength also changes depending on the difference in operation environment temperature. Thus, even when the wavelength shifts from the designed center, since the diffraction direction is determined by the relationship between the pitch of the diffraction grating and wavelength and changes in the diffraction direction are the same, no mismatch occurs between the regions, but the configuration of the conventional example does not guarantee that phases will match.

In the configuration shown in FIG. 27, light beams of matched phases are assumed to incident from the lower side of the sheet surface. As shown in FIG. 27, the phases are matched vertically at a position BA. In this configuration, where the zone below the sloped surface is assumed to be a glass material (glass or resin), rather than air, as the light beam propagates upward in the glass material that has a refractive index different from that of the air, a phase difference is generated between the light beam propagating in the glass material and the light beam propagating in the air under the effect of sawtooth-shaped diffraction grating. Where the range between the apex C20 and the apex C22 in FIG. 27 is considered, since the light beam practically does not propagate in the glass material in the vicinity of the apex C20, no phase difference is generated. By contrast, on the side close to the apex C20 in the vicinity of the apex C22, the propagation length of the light beam in the glass material is the largest and the phase difference between this light beam and the light beam propagating in the air is at a maximum. Where the wavelength changes, the phase difference changes proportionally to the wavelength, and within the range from the apex C20 to the apex C22, the variation amount of phase is at a maximum in the vicinity of the apex C21.

Since phase variation of the diffracted light beam is averaged within the range from the apex C20 to the apex C22, the phase difference in the region R21 is a phase difference obtained in the case in which the glass material is present as far as a position M211 in the up-down direction in FIG. 27. Likewise, the phase difference in the region R22 is a phase difference obtained in the case in which the glass material is present as far as a position M212 in the up-down direction in FIG. 27. Since the phase difference obtained in the case in which the glass material is present as far as the position M212 in the up-down direction in FIG. 27 is different from the phase difference obtained in the case in which the glass material is present as far as the position M211 in the up-down direction in FIG. 27, the variation amount in the case in which the wavelength varies is also different. The resultant problem is that when the wavelength varies, the light beam diffracted from the region R21 and the light beam diffracted from the region R22 have the same diffraction direction, but a phase shift occurs and aberration occurs when the light beam diffracted from the region R21 and the light beam diffracted from the region R22 are condensed.

Thus, in the conventional example, the problem associated with a phase shift caused by the deviation of light beam source wavelength from the designed value occurring when the shape of diffraction grating is different in each region and light beams diffracted from the regions are condensed in one point has not been recognized and measures aimed at the resolution of this problem have not been disclosed.

CITATION LIST

Patent Literature

Patent Literature 1: Japanese Patent Application Publication No. 2005-243151

SUMMARY OF INVENTION

The present invention has been created to resolve the above-described problem, and it is an object of the present invention to provide a compound objective lens, an optical head device, an optical information device, and an information processing device in which the occurrence of aberration can be inhibited even when the light beam source wavelength shifts from the designed value.

A compound objective lens according to one aspect of the present invention includes: an optical element having a diffraction structure; and a refractive lens, wherein the diffraction structure includes a first region, a second region, and a first boundary band provided between the first region and the second region; a diffraction structure having a sawtooth or stepwise cross section is formed in the first region and the second region; a height of the sawtooth or stepwise cross section formed in the first region provides a light beam, which has a predetermined wavelength, with a difference in optical path length of N times the predetermined wavelength, as compared with a case of transmission in air; a height of the sawtooth or stepwise cross section formed in the second region provides the light beam, which has the predetermined wavelength, with a difference in optical path length of J times the predetermined wavelength, as compared with a case of transmission in air; and at least one of a difference in height between both ends of the first boundary band and a width of the first boundary band provides the light beam, which has the predetermined wavelength, with a difference in optical path length of $(N+J)/2$ times (N and J are mutually different natural numbers) the predetermined wavelength, as compared with a case of transmission in air.

With such a configuration, the compound objective lens is provided with an optical element having a diffraction structure and a refractive lens. The diffraction structure includes a first region, a second region, and a first boundary band provided between the first region and the second region. A diffraction structure having a sawtooth or stepwise cross section is formed in the first region and the second region. A height of the sawtooth or stepwise cross section formed in the first region provides a light beam, which has a predetermined wavelength, with a difference in optical path length of N times the predetermined wavelength, as compared with a case of transmission in air. A height of the sawtooth or stepwise cross section formed in the second region provides the light beam, which has the predetermined wavelength, with a difference in optical path length of J times the predetermined wavelength, as compared with a case of transmission in air. At least one of a difference in height between both ends of the first boundary band and a width of the first boundary band provides the light beam, which has the predetermined wavelength, with a difference in optical path length of $(N+J)/2$ times (N and J are mutually different natural numbers) the predetermined wavelength, as compared with a case of transmission in air.

In accordance with the present invention, a light beam having a predetermined wavelength is provided with a difference in optical path length of $(N+J)/2$ times (N and J are mutually different natural numbers) the predetermined wavelength, as compared with a case of transmission in air, by at least either of a difference in height between both ends of the first boundary band provided between the first region and the second region and a width of the first boundary band. Therefore, a phase shift can be avoided and the occurrence of aberration can be inhibited even when the light beam source wavelength shifts from the designed value.

The objects, specific features, and advantages of the present invention will become more apparent from the following detailed description and appended drawings.

DESCRIPTION OF EMBODIMENTS

The embodiments of the present invention will be described below with reference to the appended drawings. The below-described embodiments are examples of specific implementation of the present invention and place no limitation on the technical scope of the present invention.

Embodiment 1

Figure 1:
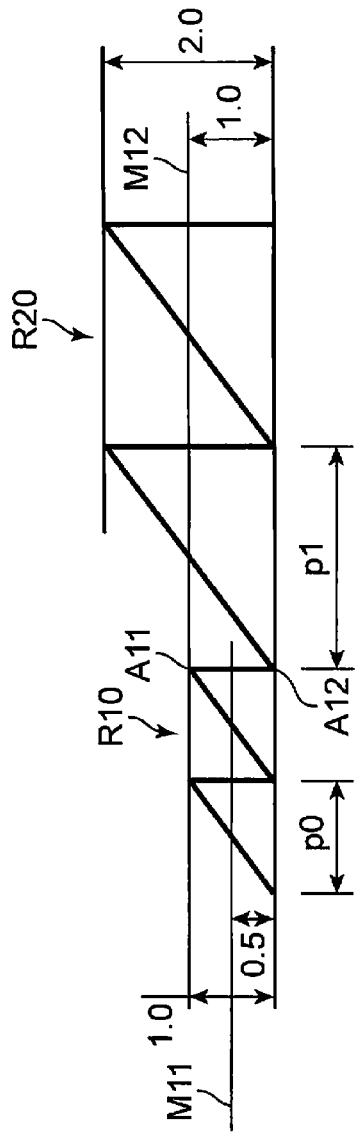
FIG. 1 illustrates a process leading to Embodiment 1 of the present invention.
Figure 2:
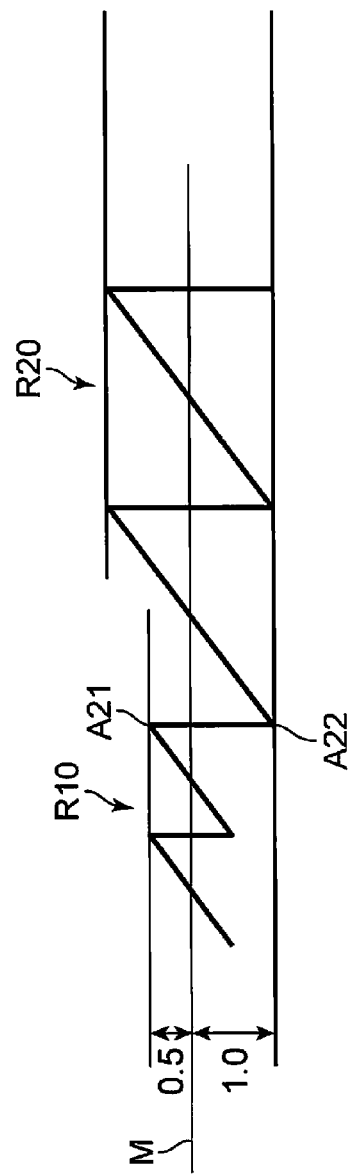
FIG. 2 illustrates a process leading to Embodiment 1 of the present invention.

FIG. 1 and FIG. 2 illustrates a process leading to Embodiment 1 of the present invention. When the embodiments are explained, first, several definitions are given by using FIG. 1. In FIG. 1, a sawtooth-like shape, in other words, the oblique lines and vertical lines connecting the oblique lines to each other, represents the cross-sectional shape of a diffraction structure. The numerical values representing the height in the vertical direction, such as "0.5" and "1.0", are coefficients of the difference in optical path length when the designed wavelength $\lambda 1$ is taken as a unit. In other words, the coefficient is obtained by dividing a difference in optical path length generated by one step or one-stage glass material by the wavelength $\lambda 1$, and where the refractive index of the glass material is denoted by nb, the coefficient is equal to a value obtained by dividing the product of the step and (nb−1) by the designed wavelength $\lambda 1$. Further, one period p0 of the diffraction grating is a period (pitch) for causing 1st-order diffraction of a light beam having the wavelength $\lambda 1$ in the desired diffraction direction. The explanation is given herein as if the period p0 has a constant value, but when the desired diffraction direction differs depending on the position of diffraction grating, this period assumes a value changing in response to the diffraction direction. When the pitch of the diffraction structure or the diffraction direction of the diffraction grating differs depending on location, it is called in some cases a hologram or a hologram element. Further, where the diffraction grating is concentric, it is sometimes called a hologram lens. The present application can be adapted to any such configuration.

The height of the sawtooth cross section as referred to herein is a height in the optical axis direction between the uppermost point and lowermost point of the sawtooth diffraction structure, and the height of the stepwise cross section is a height in the optical axis direction between the uppermost surface and lowermost surface of the stepwise diffraction structure.

Further, even if the period is the same, the period p1 is a period (pitch) for causing 2nd-order diffraction of the optical beam having the wavelength $\lambda 1$ in the desired diffraction direction and has a length about twice that of the period p0.

A region R10 and a region R20 as referred to herein represent regions with different diffraction structures. In FIG. 1, the region R10 represents a region in which a 1st-order diffracted light beam is generated in the light beam having the wavelength and the region R20 represents a region in which a 2nd-order diffracted light beam is generated in the light beam having the wavelength $\lambda 1$. Further, a point A11 and a point A12 represent respectively a peak and a valley of the sawtooth pattern, and an average level M11 indicates an average level of peaks and valleys of the sawtooth pattern in the region R10. Likewise, an average level M12 indicates an average level of peaks and valleys of the sawtooth pattern in the region R20.

In order to prevent the average phase in both regions from shifting even when the wavelength shifts from the designed wavelength the average level M11 and the average level M12 may be made equal to each other. For example, when the region R20 is lowered, downward as shown in the figure, with respect to the region R10 by 0.5 wavelength difference in optical path length as shown in FIG. 2, the average levels M in the two regions match. Therefore, the average phase of both regions does not shift even when the wavelength shifts from the designed wavelength $\lambda 1$. However, with such a shape, a discontinuity appears in the phase of the peak A21 and peak A22. Since the region R20 has been lowered, downward as shown in the figure, by 0.5 wavelength (difference in optical path length), the difference in optical path length between the peak A21 and peak A22 becomes 1.5 times the wavelength, and the difference in optical path length is not an integral multiple of the wavelength. In other words, in the configuration shown in FIG. 2, the phase is discontinuous at the designed (central) wavelength.

It is not that simple to ensure continuity of phase at the designed wavelength and avoid a phase shift when the wavelength changes.

Figure 3:
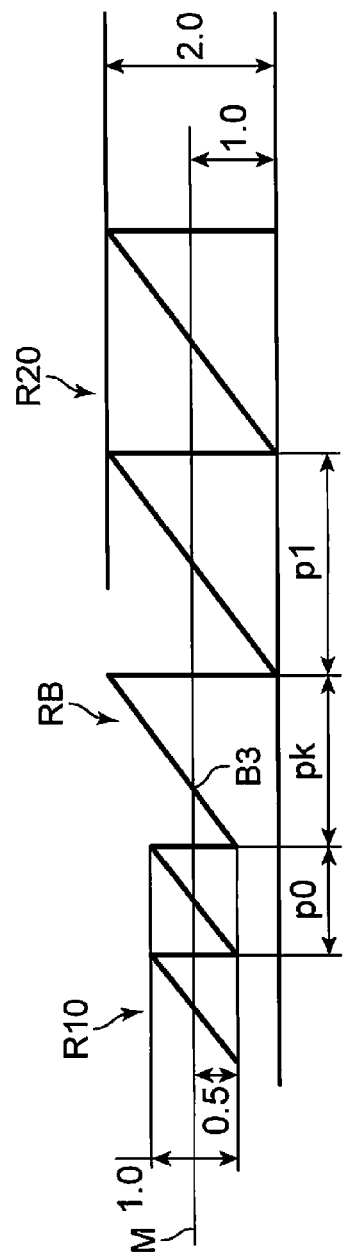
FIG. 3 shows a diffraction structure in Embodiment 1 of the present invention.

Accordingly, the inventors have invented the grating shape shown in FIG. 3. FIG. 3 shows a diffraction structure according to Embodiment 1 of the present invention. In this diffraction structure, a boundary band RB is provided between the region R10 and the region R20. The width (period) pk of the boundary band RB is an average value of the period p0 of the region R10 and the period p1 of the region R20 and in this case the width is 1.5 times the period p0. Thus, the width pk of the boundary band RB is 1.5 times the period causing 1st-order diffraction. A slope with a height creating a difference in optical path length of 1.5 wavelength is provided in the up-down direction within the width of 1.5 period. In the present configuration, the difference in optical path length between the peaks and valleys of each sawtooth can be one wavelength or two wavelengths. All of the differences in optical path lengths can be made integral multiples of the wavelength λ1. Further, the average levels M of the region R10 and the region R20 match each other. The average level of the boundary band RB seems to be different from the average level M of the region R10 and region R20, but where the zone to the left (as shown in the figure) from the crossing point B3 of the slope and the average level M is taken as the region R10 and the zone to the right is taken as the region R20, it is clear that the average level of the boundary band should not be a problem.

By providing such a boundary band RB that has a slope with a height causing a difference in optical path length of 1.5 wavelength in the up-down direction within the width of 1.5 period, it is possible to obtain a remarkable effect of realizing phase continuity at the designed wavelength and avoid phase shift when the wavelength changes.

In the above-described example, the diffraction structure is explained in which the region R10 causes 1st-order diffraction and the region R20 causes 2nd-order diffraction. When a more general case is considered, the region R10 is a diffraction region causing Nth-order diffraction, the region R20 is a diffraction region causing Jth-order diffraction (N and J are mutually different natural numbers), and when the period causing 1st-order diffraction is 1 period, by providing a boundary band RB that has a slope with a height causing a difference in optical path length of (N+J)/2 wavelength in the up-down direction within the width of (N+J)/2 period, it is possible to obtain a remarkable effect of realizing phase continuity at the designed wavelength and avoid phase shift when the wavelength changes.

Where a combination with a lens is considered, a compound objective lens includes an optical element having a diffraction structure and a refractive lens. The diffraction structure includes the region R10, the region R20, and the boundary band RB provided between the region R10 and the region R20. A diffraction structure having a sawtooth cross section is formed in the region R10 and region R20. The height of the sawtooth cross section formed in the region R10 provides the light beam having a predetermined wavelength λ0 with a difference in optical path length of N times the predetermined wavelength λ0, by comparison with transmission in air. The height of the sawtooth cross-sectional shape formed in the region R20 provides the light beam having the predetermined wavelength λ0 with a difference in optical path length of J times the predetermined wavelength λ0, by comparison with transmission in air. The difference in height between the two ends of the boundary band RB provides the light beam having a predetermined wavelength λ0 with a difference in optical path length of (N+J)/2 (N and J are mutually different natural numbers) times the predetermined wavelength λ0, by comparison with transmission in air.

Further, the wavelength λ1 is set to about 660 nm, which corresponds to the red light beam, the refractive index nb is set to a refractive index corresponding to the red light beam, the region R10 is formed on the inner circumferential side close to the optical axis of the lens, the region R20 is formed on the outer circumferential side far from the optical axis of the lens, the upper part in FIG. 3 is taken as an optical element material with a refractive index nb (>1), N is taken as 1, and J is taken as a natural number equal to or greater than 2. In this case, the compatible objective lens condenses the red light beam via a transparent base material with a thickness of 1.2 mm on the recording surface of a compact disk (CD) and condenses the red light beam via a transparent base material with a thickness of 0.6 mm on the recording surface of a DVD. As a result, the occurrence of aberration can be inhibited regardless of the shift from the designed wavelength.

The boundary band RB is provided between the region R10 and the region R20, and the difference in height between both ends of the boundary band RB provides the light beam having the wavelength λ1 with a difference in optical path length of about (1+J)/2 times the wavelength λ1, by comparison with transmission in air. The width of the boundary band RB is about (1+J)/2 times the period causing 1st-order diffraction of the light beam having the wavelength λ1.

Further, the inventors have disclosed a system compatible with DVD and Blu-ray Disc in Japanese Patent Application Publication No. 2004-071134. In this system, where the depth of the sawtooth cross section is h1, the wavelength λ1 of the blue light beam is 390 nm to 415 nm, the wavelength λ2 of the red light beam is 630 nm to 680 nm, and the depth h1 is taken as a depth providing the first light beam having the wavelength λ1 with an optical path difference of about two wavelengths, then the +2nd-order diffracted light beam is generated most strongly with respect to the first optical beam and the +1st-order diffracted light beam is generated most strongly with respect to the second optical beam having the wavelength λ2. For this reason, it has been suggested that the region having such a sawtooth cross section be formed on the inner circumferential side close to the optical axis of the lens.

In the present embodiment, such sawtooth shape with the depth h1 is taken as the region R20 in FIG. 3, and a sawtooth-like shape with a depth providing the first optical beam having the wavelength λ1 with a difference in optical path length of about one wavelength is formed in the region R10. In other words, N=1 and J=2 and also the refractive index nb is taken as a refractive index corresponding to the blue light beam, the region R20 is formed on the inner circumferential side close to the optical axis of the lens, the region R10 is formed on the outer circumferential side far from the optical axis of the lens, and the lower part of FIG. 3 is taken as an optical element material with the refractive index nb (>1). In this case, the compatible objective lens condenses the red light beam via a transparent base material with a thickness of 0.6 mm on the recording surface of a DVD and condenses the blue light beam via a transparent base material with a thickness of about 0.1 mm or less than 0.1 mm on the recording surface of a BD. As a result, the occurrence of aberration can be inhibited regardless of the shift from the designed wavelength. In this case, N may be an integer equal to or greater than 3, and by taking an integer equal to or greater than 3 as N, it is possible to realize a difference in aperture with respect to the red light beam.

The boundary band BR is provided between the region R10 and the region R20, and the difference in height between both ends of the boundary band BR provides the light beam having the wavelength λ1 with a difference in optical path length of about (N+2)/2 times the wavelength λ1, by comparison with transmission in air. The width of the boundary band BR is about (N+2)/2 times the period causing 1st-order diffraction of the light beam having the wavelength λ1.

Thus, the height of the sawtooth cross section formed in the region R20 provides the blue light beam having the wavelength λ1 with a difference in optical path length that is twice the wavelength λ1, by comparison with transmission in air. The height of the sawtooth cross section formed in the region R10 provides the blue light beam having the wavelength λ1 with a difference in optical path length of N times (N is a natural number other than 2) the wavelength λ1, by comparison with transmission in air. At least either of the difference in height between both ends of the boundary band RB and the width of the boundary band RB provides the blue light beam having the wavelength λ1 with a difference in optical path length of (N+2)/2 times the wavelength λ1, by comparison with transmission in air. In the region R10, the 1st-order diffracted light beam is generated most strongly with respect to the red light beam having the wavelength λ2 and the 2nd-order diffracted light beam is generated most strongly with respect to the blue light beam having the wavelength λ1. The 2nd-order diffracted light beam of the blue light beam generated from the region R20 and the Nth-order diffracted light beam of the blue light beam generated from the region R10 are condensed through a transparent base material with a thickness t1. The 1st-order diffracted light beam of the red light beam generated from the region R20 is condensed through a transparent base material with a thickness t2 that is larger than the thickness t1.

The diffraction grating for realizing these compatible lenses is concentric, with the optical axis of the lens as a central axis, and called a hologram lens.

The sawtooth diffraction structure can be also approximated by a stepwise shape. Even if the approximation is performed by a stepwise shape, when regions causing diffraction of different orders are provided, the approximation with a stepwise shape may be performed after virtually creating a sawtooth diffraction structure that serves as a base structure for approximation and providing the abovementioned boundary band BR. In order to approximate a sawtooth shape with a stepwise shape on the basis of such an approach, the difference in optical path length provided by one step is taken equal to or less than 0.5 wavelength and the phase difference is taken equal to or less than it. In this case, the sawtooth shape may be approximated in a simple manner as described hereinabove.

Further, in the present embodiment the region R10 corresponds to an example of the first region, the region R20 corresponds to an example of the second region, and the boundary band RB corresponds to an example of the first boundary band.

Embodiment 2

The invention relating to a diffraction structure having a novel stepwise cross section in which the blue light beam and the red light beam are diffracted in substantially different directions has been disclosed by the inventors in Japanese Patent Application Publication No. 2004-071134. Japanese Patent Application Publication No. 2004-071134 discloses a stepwise diffraction structure such as the region R1 shown in FIG. 4A.

Figure 4A:
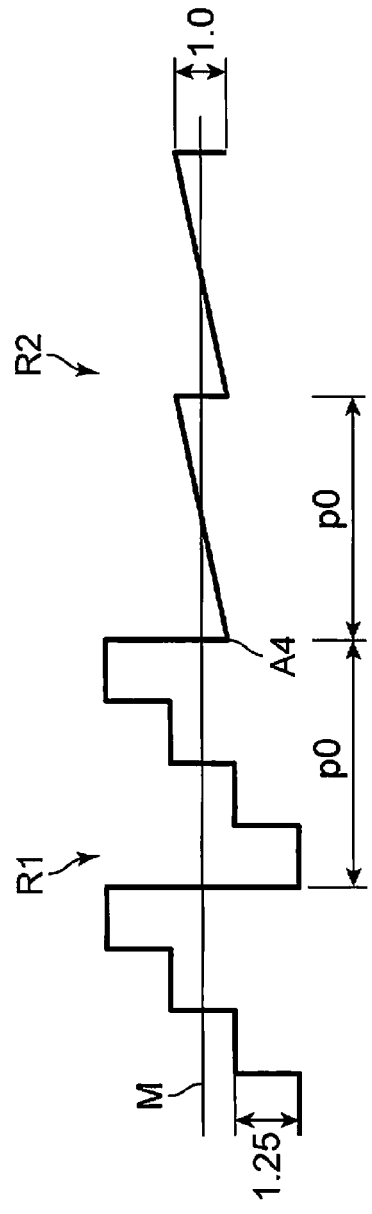
FIGS. 4A and 4B illustrate a process leading to Embodiment 2 of the present invention.
Figure 4B:
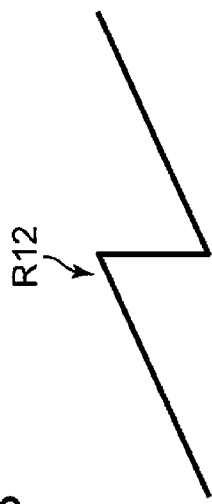
Figure 5:
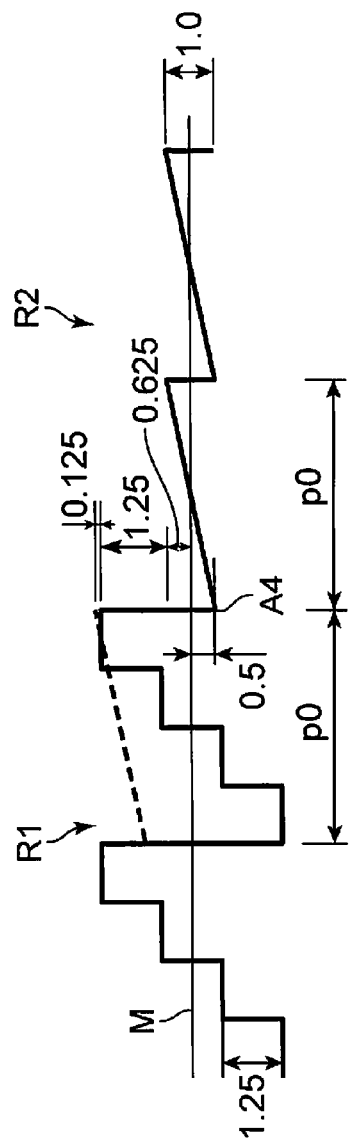
FIG. 5 illustrates a process leading to Embodiment 2 of the present invention.

FIGS. 4A, 4B, and 5 illustrate the process leading to Embodiment 2 of the present invention. In FIG. 4A, in the region R1, the height (depth) of one step is formed such that the difference in optical path length, with the optical beam passing through the air, that is provided to the blue light beam having a wavelength λ1 is about 1.25λ1. FIG. 4A shows a physical cross section. For example, the lower side in FIG. 4A is a base material side or glass material side of the diffraction structure or hologram element, that is, the side with a high refractive index, and the upper side in the figure is the air side, that is, the side with a low refractive index, but reversed arrangement may be also used. This feature is common to other embodiments of the present invention.

In FIG. 4A, the vertical direction corresponds to the thickness or height of the glass material. In the present detailed description of the invention, the cross-sectional shape in which rectangles are combined as in the region R1 will be called a stepwise cross section. The refractive index of the hologram element material or glass material with respect to the blue light beam is denoted by nb. In the region R1 in FIG. 4A, the difference in optical path length caused by a unit step is 1.25 times the wavelength λ1 of the blue light beam. Here, the wavelength λ1 is 390 nm to 415 nm. As a standard, the wavelength λ1 is about 405 nm, the wavelength of 390 nm to 415 nm will be generally referred to as about 405 nm, and the light beam having a wavelength of 390 nm to 415 nm will called a blue light beam. Where the height (level) of steps of a diffraction grating is represented as an integral multiple of a unit step, the phase modulation quantity of the blue light beam created by the stepwise shape will be an integral multiple of $2\pi+\pi/2$, and the phase modulation quantity will essentially be $\pi/2$ per one step. For example, by forming four-level gradation (three differences in height, that is, three steps), it is possible to approximate a sawtooth shape having a height with a difference in optical path length of one wavelength.

Further, the wavelength λ2 is taken as 630 nm to 680 nm. As a standard, a wavelength of 660 nm is most often used as the wavelength λ2, the wavelength of 630 nm to 680 nm will be generally referred to as about 660 nm, and the light beam having a wavelength of 630 nm to 680 nm will be called a red light beam. In the region R1 in FIG. 4A, in respect of the light beam having the wavelength λ2, the difference in optical path length caused by a unit step is about 0.75 times the wavelength λ2 of the red light beam. The phase modulation quantity of the red light beam created by the stepwise shape will be an integral multiple of $2\pi-\pi/2$, and the phase modulation quantity will essentially be $-\pi/2$ per one step. For example, where four-level gradation (three steps) is formed, it is possible to approximate a sawtooth shape having the slope that is reversed with respect to that of the above-described stepwise shape relating to the blue light beam and a height with a difference in optical path length of one wavelength.

When compatible reproduction is performed for an optical disk with a base material thickness of 0.6 mm that corresponds to the light beam having the wavelength λ2 and an optical disk with a base material thickness of 0.1 mm that corresponds to the light beam having the wavelength λ1, a hologram lens having the cross-sectional shape of the region R1 shown in FIG. 4A is formed on the inner circumferential side (region close to the optical axis) of the objective lens, the blue light beam passes through the transparent base material with a thickness of 0.1 mm, the red light beam passes through the base material with a thickness of 0.6 mm, and the two light beams are condensed on the information recording surface. Since the blue light beam passing through the outer circumferential side of the objective lens (region far from the optical axis) is condensed through the transparent base material with a thickness of 0.1 mm together with the blue light beam passing through the inner circumferential side, for example, a sawtooth-shaped hologram lens is formed that has a height with a difference in optical path length of one wavelength, such as in the region R2 shown in FIG. 4A, on the outer circumferential side of the objective lens. The objective lens thus condenses the blue light beam on the information recording surface of Blu-ray Disk (BD) or the like via the transparent base material with a thickness of 0.1 mm because of a numerical aperture (NA) being higher than that for the red light beam.

Since the blue light beam passes through both the region R1 and the region R2, it is necessary to match phases of the region R1 and region R2. The stepwise shape of the region R1 shown in FIG. 4A seems to approximate the sawtooth shape such as shown in FIG. 4B. Therefore, in order to match the phase respect to the designed wavelength $\lambda 1$ and prevent the average phase of both regions from shifting even when the designed wavelength has shifted by several nm from $\lambda 1$, it is generally thought that a configuration may be used in which, as shown in FIG. 4A, and a slope of one period p0 is made in the slope direction of the sawtooth-shaped region R2 from a position A4 in which the difference in optical path length is lower by 0.5 wavelength than the average level M of the stepwise shape.

However, upon considering the phase in greater detail, the inventors have noticed that a phase shift of the blue light beam in both regions occurs in the configuration shown in FIG. 4A. This phase shift will be explained below with reference to FIG. 5. The broken line in FIG. 5 shows the slope of phase approximated by the rightmost step in region R1. The slope is a phase variation quantity of one wavelength occurring within one period p0. The intersection point of the broken line and the average level of one step is the center of the flat portion. Therefore, at the right end of the rightmost step in the region R1, the broken line rises above the flat level by a difference in optical path length of ⅛ (0.125) wavelength. Where the 0.125 wavelength, 1.25 wavelength which is the height of the rightmost step in the region R1, and 0.625 wavelength which is half of the height of the step adjacent on the left to the rightmost step in the region R1 are added up, it is clear that at the rightmost end of the region R1, the difference in optical path length of the approximated sawtooth has a phase difference of 2 wavelengths, that is, $4\pi$, with the average level M. Since this phase difference is an integral multiple of $2\pi$, it is substantially same as the average level M. As a result, a phase shift of 0.5 wavelength occurs between the phase at the right end of the approximated sawtooth and the phase at the position A4. In the configuration in which the difference in optical path length per one step exceeds 0.5 wavelength, the sawtooth shape cannot be approximated by the stepwise shape in a simple manner.

Figure 6:
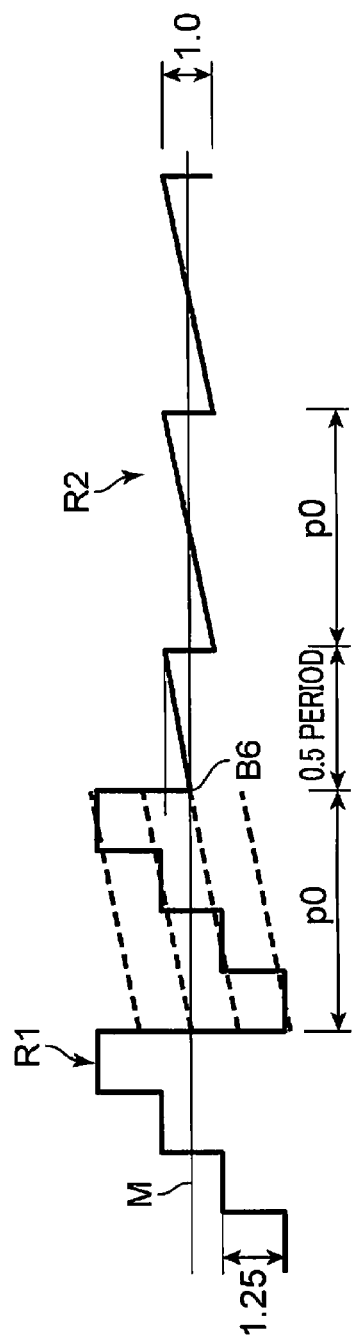
FIG. 6 shows a diffraction structure in Embodiment 2 of the present invention.

Accordingly, the inventors have invented a grating shape (diffraction structure) shown in FIG. 6. FIG. 6 shows a diffraction structure according to Embodiment 2 of the present invention. In this diffraction structure, a slope having a height causing a difference in optical path length of 0.5 wavelength is formed over 0.5 period from a position B6 at a height between the uppermost level and the lowermost level of the region R1, that is, at the average level M, toward a sawtooth sloping direction, at the right end of the region R1 having a stepwise cross section. In the diffraction R2, the diffraction grating with a period p0 is formed repeatedly.

As described hereinabove, at the right end of the region R1 having a stepwise cross section, the phase identical to the average level M is approximated in the region R1. Therefore, the phase is matched with that of the region R2. Further, the average phase levels in both regions also match at the average level M, and no phase shift occurs even when the wavelength somewhat shifts from the designed value. The slopes approximated by the steps are shown by four broken lines in FIG. 6, but these slopes are different in optical path lengths that are shifted with respect to each other in the up-down direction by an integral multiple of the wavelength and a substantially same phase is provided to the blue light beam. The third broken line from the top is continuous with the slope of the region R2. Therefore, phase continuity can be confirmed.

Figure 7:
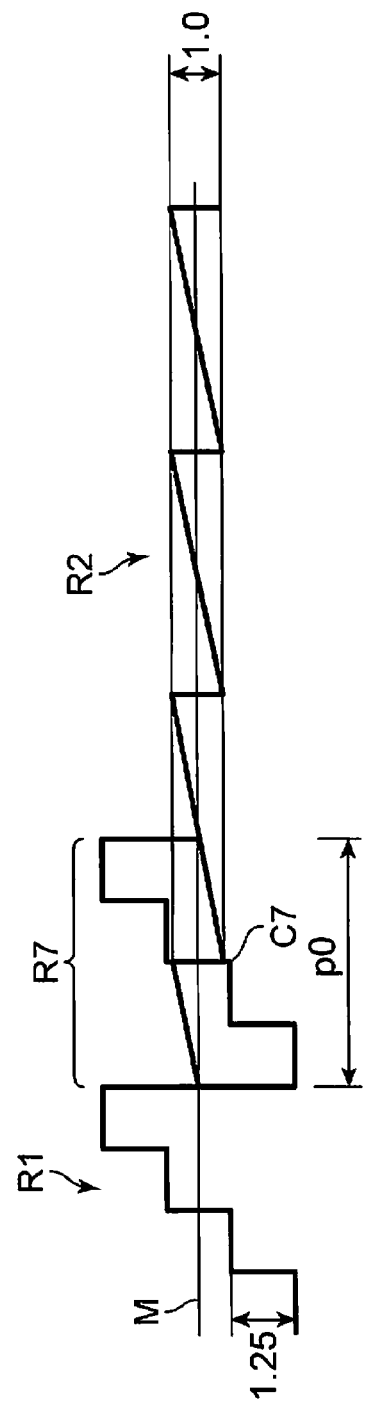
FIG. 7 shows a diffraction structure in the first variation example of Embodiment 2 of the present invention.

It is not necessary that the regions be switched only at the point of time in which one period is completed. This will be explained below with reference to FIG. 7. FIG. 7 shows a diffraction structure in the first variation example of Embodiment 2 of the present invention.

In FIG. 7, the inclined portions of the region R2 are superimposed on a region R7 of a stepwise shape that has a length of one period p0. The overlapping inclined portions are obtained by extending the region R2. Switching from the stepwise shape to the sawtooth shape can be performed at any position in the region R7. For example, switching to the sawtooth shape may be performed from the central portion of the region R7, that is, from a position C7 in which the stepwise shape is formed to 0.5 period. Thus, in Embodiment 2, the case is represented in which the slope having a height causing a difference in optical path length of 0.5 wavelength is formed over 0.5 period in the slope direction of the sawtooth shape from the position of the average level M at the right end of one period of the stepwise shape, including the case in which the position of switching from the stepwise shape to the sawtooth shape has changed. Such a representation does not limit the switching portion to the right end of one period of the stepwise shape. The region R7 corresponds to a boundary band.

Further, the region R2 is not limited to the diffraction structure causing a 1st-order diffraction. In the case in which a diffraction grating causing an Nth-order diffraction (N is a natural number) is formed in the region R2, when the period of the diffraction grating causing the 1st-order diffraction is represented as one period, the slope having a height causing a difference in optical path length of N/2 wavelength is formed over an N/2 period from the position of the average level M at the right end of the stepwise shape toward the sloping direction of the sawtooth shape. This representation does not limit the switching portion to the right end of one period of the stepwise shape and also includes switching in the extension of the sloping portion to the region R1 side having the stepwise shape.

Thus, a diffraction structure having a stepwise cross section is formed in the region R1. The height da of one step of the steps in the region R1 provides the blue light beam having the wavelength $\lambda 1$ with a difference in optical path length of 1.25 wavelength and provides the red light beam having the wavelength $\lambda 2$ with a difference in optical path length of 0.75 wavelength. A diffraction structure having a sawtooth cross section or a stepwise cross section approximating the sawtooth cross section is formed in the region R2. The height ds of one step of the steps in the region R2 provides the blue light beam having a wavelength $\lambda 1$ with a difference in optical path length of less than 0.5 wavelength. The height of the sawtooth cross section or the stepwise cross section approximating the sawtooth cross section that is formed in the region R2 provides the blue light beam having a wavelength $\lambda A$ with a difference in optical path length of N times (N is a natural number) of the wavelength $\lambda 1$, as compared with a case of transmission in air. At least either of a slope having a width of N/2 period and a slope having a difference in height providing the blue light beam having the wavelength $\lambda 1$ with a difference in optical path length of N/2 wavelength is formed in the boundary band from an intermediate height of the uppermost level and lowermost level of the region R1 toward a sawtooth sloping direction in the region R2 at an end of one period of the diffraction structure having a stepwise cross section and formed in the region R1. In the region R1, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$. In the region R2, an Nth-order diffracted light beam is generated most strongly with respect to the blue light beam having the wavelength λ1. The 1st-order diffracted light beam of the blue light beam generated from the region R1 and the Nth-order diffracted light beam of the blue light beam generated from the region R2 are condensed via a transparent base material with a thickness t1. The −1st-order diffracted light beam of the red light beam generated from the region R1 is condensed via a transparent base material with a thickness t2 that is larger than the thickness t1.

Figure 8:
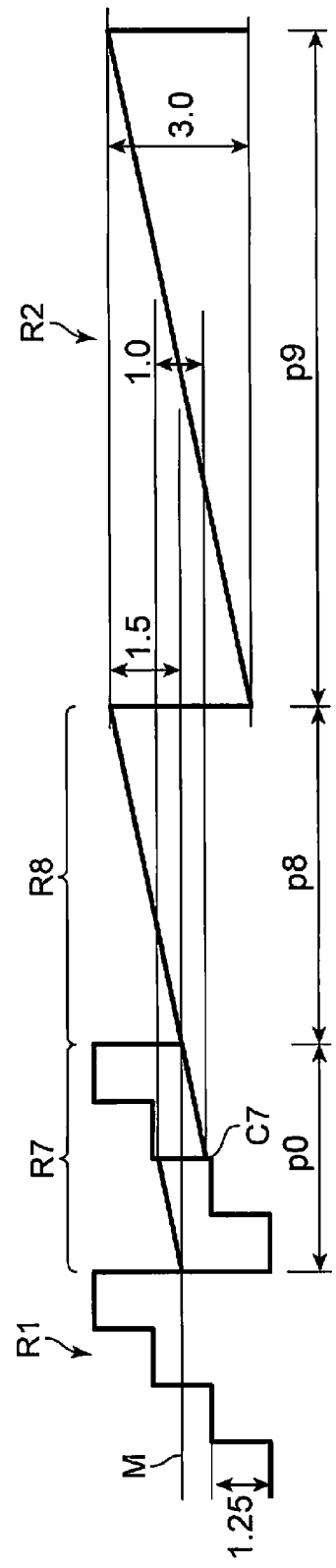
FIG. 8 shows a diffraction structure in the second variation example of Embodiment 2 of the present invention.

FIG. 8 shows a diffraction structure in the second variation example of Embodiment 2 of the present invention. For example, in the case in which the design is such that the region R2 generates most strongly the 3rd-order diffracted light beam with respect to the light beam having the wavelength λ1, as shown in FIG. 8 the slope having a height causing a difference in optical path length of 1.5 wavelength will be formed over 1.5 period (p8) of the period p0 of the diffraction grating causing the 1st-order diffraction from the position of the average level M at the right end of a region R7 toward the sloping direction of the sawtooth shape. Further, the slope over 3 periods (p9) of the period p0 of the diffraction grating causing the 1st-order diffraction will be repeatedly formed.

In other words, the region R7 having a stepwise cross section over one period of the region R1 is formed on the outer circumferential side of the region R1 causing the 1st-order diffraction. Further, a region R8 having a sawtooth cross section with a height causing a difference in optical path length of 1.5 wavelength is formed from the position of the average level M on the right end of the region R7 on the outer circumferential side of the region R7. The region R2 is formed on the outer circumferential side of the region R8. The region R7 and the region R8 correspond to the boundary band.

Thus, at least either of a slope having a width of 3/2 period and a slope having a difference in height providing the blue light beam having the wavelength λ1 with a difference in optical path length of 3/2 wavelength is formed in the boundary band from an intermediate height of the uppermost level and a lowermost level of the region R1 toward a sawtooth sloping direction in the region R2 at an end of one period of the diffraction structure having a stepwise cross section and formed in the region R1. In the region R1, a 1st-order diffracted light beam is generated most strongly with respect to the blue light beam having the wavelength λ1 and a −1st-order diffracted light beam is generated most strongly with respect to the red light beam having the wavelength λ2. In the region R2, a 3rd-order diffracted light beam is generated most strongly with respect to the blue light beam having the wavelength λ1. The 1st-order diffracted light beam of the blue light beam generated from the region R1 and the 3rd-order diffracted light beam of the blue light beam generated from the region R2 are condensed via the transparent base material with the thickness t1. The −1st-order diffracted light beam of the red light beam generated from the region R1 is condensed via the transparent base material with the thickness t2.

With such a configuration, the blue light beam is diffracted in the same direction in the region R1 and region R2, but in the red light beam, the 2nd-order diffracted light beam or the 3rd-order diffracted light beam is strong and the diffraction is substantially different from that of the −1st-order diffracted light beam of the region R1. Therefore, the region R2 diffracts, together with the region R1, the blue light beam so as to condense the beam with a large numerical aperture, diffracts the red light beam in the direction different from that in the region R1, and substantially does not condense the red light beam falling on the region R2. The resultant effect is that the red light beam can be condensed with a numerical aperture less than that of the blue light beam.

In the present embodiment, the region R1 corresponds to an example of the first region, the region R2 corresponds to an example of the second region, and the region R7 and the region R8 correspond to an example of the first boundary band.

Embodiment 3

Figure 9:
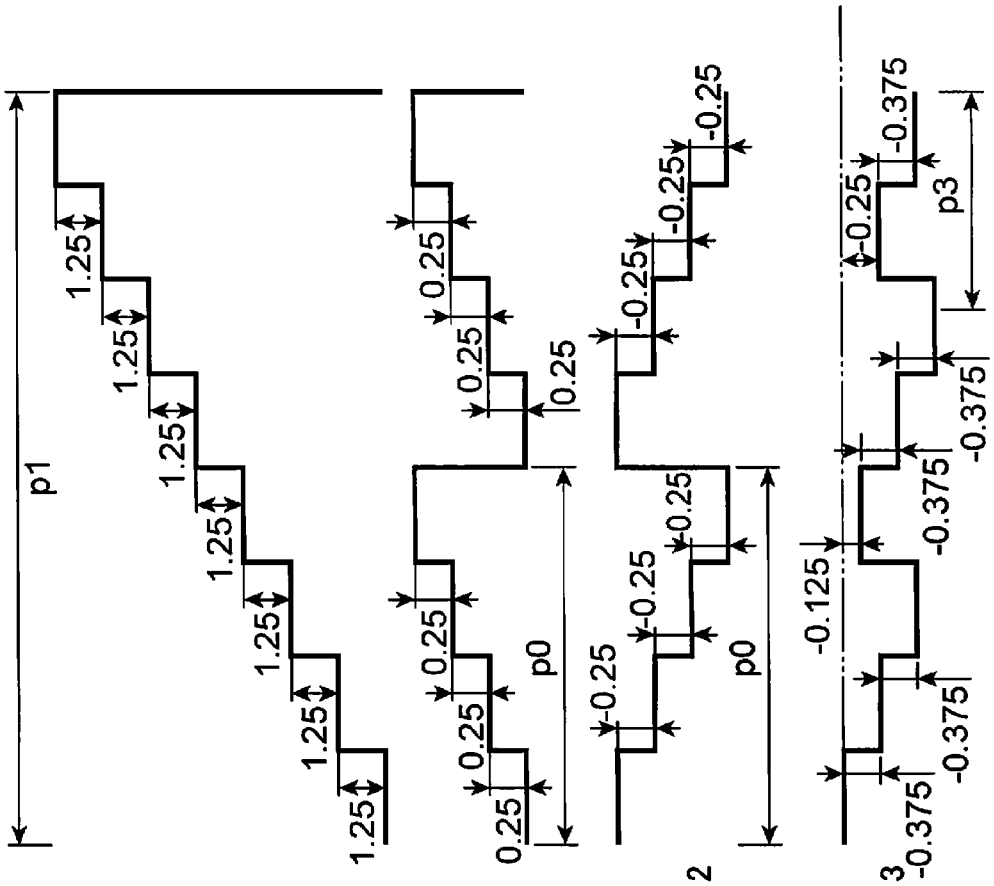
FIG. 9A shows a cross-sectional shape of the diffraction grating formed on the base material.
FIG. 9B shows a phase modulation quantity of the blue light beam generated by the cross-sectional shape shown in FIG. 9A.
FIG. 9C shows a phase modulation quantity of the red light beam generated by the cross-sectional shape shown in FIG. 9A.
FIG. 9D shows a phase modulation quantity of the infrared light beam generated by the cross-sectional shape shown in FIG. 9A.

The inventors have disclosed in WO 2009-016847 a configuration having a cross-sectional structure shown in FIG. 9 as a period, this configuration being designed to realize an objective lens, an optical head device, and an optical information device to be used for compatible reproduction of CD (compact disk), DVD, and BD, which are presently widely used, with one lens. In Embodiment 3, a hologram lens having a cross-sectional shape shown in FIG. 9A is formed in a region (R3) that is further close to the optical axis than the region R1 (region R4 shown in FIG. 10) described by way of example in Embodiment 2.

FIG. 9A shows a cross-sectional shape of the diffraction grating formed on a base material. FIG. 9B shows a phase modulation quantity of the blue light beam generated by the cross-sectional shape shown in FIG. 9A. FIG. 9C shows a phase modulation quantity of the red light beam generated by the cross-sectional shape shown in FIG. 9A. FIG. 9D shows a phase modulation quantity of the infrared light beam generated by the cross-sectional shape shown in FIG. 9A.

As shown in FIG. 9A, one step of gradation is formed to a height (depth or step) such that a difference in optical path length provided to the blue light beam having the wavelength λ1, as compared with the light beam passing in air, is about 1.25λ1. FIG. 9A shows a physical cross-sectional shape. For example, the explanation is given under an assumption that the lower side in FIG. 9A is the base material side (or glass material side) of the diffraction structure (or diffraction element or hologram element), that is, the side with a high refractive index, and the upper side is an air side, that is, a side with a low refractive index, but the reverse configuration may be also used. This feature is common with other embodiments of the present invention.

In FIG. 9A, the vertical direction corresponds to the thickness or height of the glass material. The cross-sectional shape in which rectangles are thus combined will be called a stepwise cross-sectional shape as in the above-described other embodiments. In FIG. 9A, the difference in optical path length caused by a unit step is 1.25 times the wavelength λ1 of the blue light beam. Here, the wavelength λ1 is 390 nm to 415 nm. As a standard, the wavelength λ1 is about 405 nm, the wavelength of 390 nm to 415 nm will be generally referred to as about 405 nm, and the light beam having a wavelength of 390 nm to 415 nm will called a blue light beam.

Where the height (level) of steps of a diffraction grating is represented as an integral multiple of a unit step, the phase modulation quantity of the blue light beam created by the cross-sectional shape will be an integral multiple of $2\pi+\pi/2$, and the phase modulation quantity will essentially be $\pi/2$ per one step. By forming an 8-level gradation (7 steps), it is possible to approximate a sawtooth shape having a height with a difference in optical path length of two wavelengths. As shown in FIG. 9B, the diffraction structure shown in FIG. 9A acts as if to form two periods causing the +1st-order diffraction. Therefore, a +2nd-order diffracted light beam is generated most strongly with respect to the blue light beam.

Further, the wavelength λ2 is taken as 630 nm to 680 nm. As a standard, a wavelength of 660 nm is most often used as the wavelength λ2, the wavelength of 630 nm to 680 nm will be generally referred to as about 660 nm, and the light beam having a wavelength of 630 nm to 680 nm will be called a red light beam. With respect to the light beam having the wavelength $\lambda 2$, the cross-sectional shape shown in FIG. 9A creates the difference in optical path length caused by a unit step of about 0.75 times the wavelength $\lambda 2$ of the red light beam. The phase modulation quantity of the red light beam created by the cross-sectional shape will be an integral multiple of $2\pi$–$\pi$/2, and the phase modulation quantity will essentially be $-\pi/2$ per one step. Where the 8-level gradation (7 steps) is formed, it is possible to approximate a sawtooth shape having the slope that is reversed with respect to that of the above-described sawtooth shape relating to the blue light beam and a height with a difference in optical path length of two wavelengths. As shown in FIG. 9C, the diffraction structure shown in FIG. 9A acts as if to form two periods causing the −1st-order diffraction. Therefore, a −2nd-order diffracted light beam is generated most strongly with respect to the red light beam.

Further, the wavelength $\lambda 3$ is taken as 770 nm to 820 nm. As a standard, the light beam having a wavelength $\lambda 3$ of 780 nm will be called an infrared light beam. The infrared light beam is condensed by the objective lens with a numerical aperture of 0.45 to 0.5 on the information recording surface through a transparent base material with a thickness of 1.2 mm, and the reflected light from the information recording surface is received, thereby reproducing the CD.

With respect to the light beam having the wavelength $\lambda 3$, the cross-sectional shape shown in FIG. 9A creates the difference in optical path length caused by a unit step of about 0.625 times the wavelength $\lambda 3$ of the infrared light beam. The phase modulation quantity of the infrared light beam created by the cross-sectional shape will be an integral multiple of about $0.625\times 2\pi$, and the phase modulation quantity will essentially be $-0.375\times 2\pi$ per one step. Where the 8-level gradation (7 steps) is formed, it is possible to approximate a sawtooth shape having the slope that is reversed with respect to that of the above-described sawtooth shape relating to the blue light beam and has the same direction as that of the sawtooth shape relating to the red light beam, and a height with a difference in optical path length of three wavelengths. As shown in FIG. 9D, the diffraction structure shown in FIG. 9A acts as if to form three periods causing the −1st-order diffraction. Therefore, a −3rd-order diffracted light beam is generated most strongly with respect to the infrared light beam.

The advantage of the present configuration is that the diffraction efficiency of light beams with three wavelengths can be increased with good balance. Further, where the third region R3, which is a common region for the red light beam and blue light beam, is co-present, the diffraction order of the diffraction structure having the 8-level cross-sectional shape of the present configuration is a +2nd order with respect to the blue light beam and a −2nd order with respect to the red light beam. Therefore, the ratio of the diffraction order of the blue light beam to the diffraction order of the red light beam is 1:−1. As a result, the diffraction order of the diffraction structure having the 8-level cross-sectional shape has the same ratio as that of the diffraction structure having the 4-level cross-sectional shape in which the diffraction order with respect to the blue light beam is a +1st order and the diffraction order with respect to the red light beam is a −1st order.

Therefore, the effect obtained when a combination of the optical element and refractive lens is used is that the ratio of the diffractive power and refractive power is the same and the occurrence of a large aberration is prevented even with the light beam having a wavelength somewhat different from the designed wavelength.

Thus, since the strongest diffraction with respect to the blue light beam, red light beam, and infrared light beam occurs at completely different orders, such as +2nd order, −2nd order, and −3rd order, the diffraction direction is significantly different for the blue light beam, red light beam, and infrared light beam and the design can be performed such as to condense the beams via different base material thicknesses by using this difference in diffraction directions.

Figure 10:
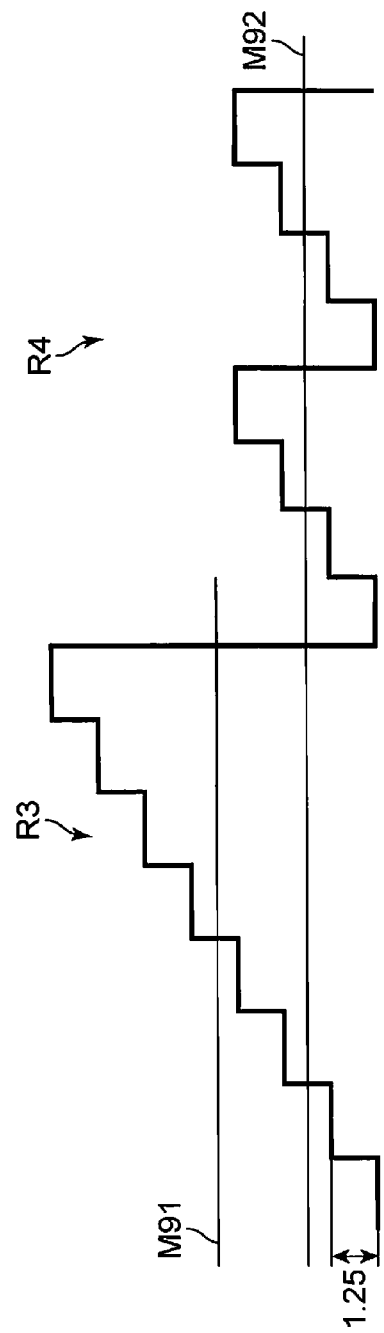
FIG. 10 illustrates a process leading to Embodiment 3 of the present invention.

FIG. 10 illustrates a process leading to Embodiment 3 of the present invention. As shown in FIG. 10, the hologram lens having the cross-sectional shape shown in FIG. 9A is formed in the region R3 that is the closest to the optical axis. As a result, the region R3 condenses the blue light beam, red light beam, and infrared light beam through transparent base materials having mutually different thicknesses. Further, the region R4 having the diffraction structure identical, for example, to that of the region R1 shown in FIG. 6 is formed in the outer circumferential portion of the region R3, and the region R4 condenses the blue light beam and red light beam via the base materials of different thicknesses together with the light beam that has passed through the region R3. A region (this region is not shown in FIG. 10) having the diffraction structure identical, for example, to that of the region R2 shown in FIGS. 6 to 8 is formed in the outer circumferential portion of the region R4, and this region (region R2) condenses the blue light beam together with the light beams that have passed through the region R3 and the region R4 located in the inner circumferential portion on the information recording surface of the BD. Since the blue light beam passes through all of the regions, it is desirable that the phases in all of the regions be matched.

The region R4 may have the diffraction structure identical to that of the region R20 shown in FIG. 3, and a region having the diffraction structure identical to that of the region R10 shown in FIG. 3 may be provided in the outer circumferential portion of the region R4. The boundary band RB shown in FIG. 3 is formed between the region R4 and the region R10. A boundary band (for example, the region R7 shown in FIG. 7 or the regions R7 and R8 shown in FIG. 8) is formed between the region R4 and the region R2. In other words, the region R4 and the region on the outer circumferential side of the region R4 can use the diffraction structures described in Embodiment 1 and Embodiment 2.

The 8-level cross-sectional shape of the region R3 is obtained by repeating twice the 4-level cross-sectional shape of the region R4. Therefore, it seems that continuity of phase in the boundary portion of the two regions can be ensured by combining the lowermost portion of the region R3 and the lowermost portion of the region R4, as shown in FIG. 10. However, since the average level M91 of the region R3 and the average level M92 of the region R4 do not match in this form, the average phases of the two regions shift and condensing quality is degraded when the wavelength shifts from the designed center $\lambda 1$.

Figure 11:
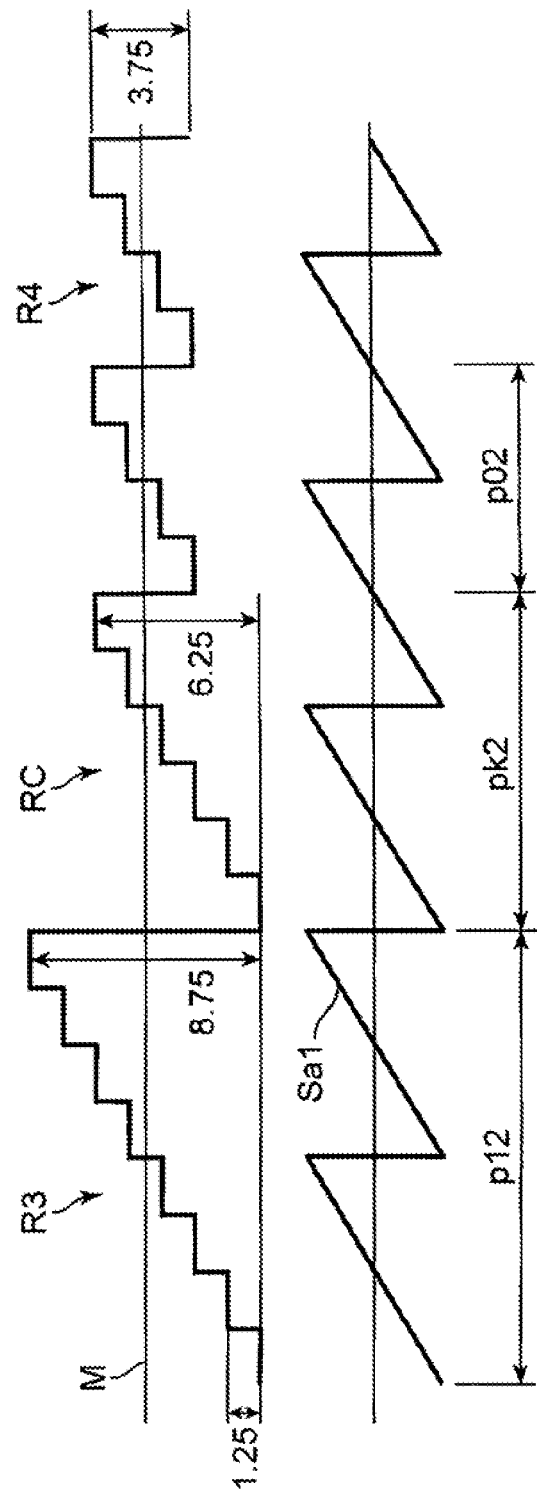
FIG. 11 shows a diffraction structure in Embodiment 3 of the present invention.

The sawtooth shape that is approximated by the two regions will be considered below in the same manner as in Embodiment 2. FIG. 11 shows a diffraction structure according to Embodiment 3 of the present invention. The sawtooth shape approximated by the stepwise region R3 and region R4 is the sawtooth shape Sa1 shown in FIG. 11, and it has been found that where the stepwise shapes of the region R3, region R4, and boundary band RC are configured as shown in FIG. 11, the phases of the region R3 and region R4 are matched. Further, the average phase levels M of the two regions also coincide, and no phase shift occurs even when the wavelength somewhat shifts from the designed value. The present configuration can be interpreted as a configuration provided with a boundary band RC between the region R3 and the region R4 in the same manner as in Embodiment 1.

When the 8 gradation levels of the region R3 are defined as levels 0, 1, 2, 3, 4, 5, 6, 7 in ascending order from the lower side, the 4 gradation levels of the region R4 are formed to match the height of the 2, 3, 4, 5 level in the central portion of the region R3.

A total of 6 levels including the levels 0, 1, 2, 3 which are half periods of the region R3 and the levels 4, 5 which are half periods of the region R4 are formed in the boundary band RC.

Thus, a diffraction structure having a stepwise cross section with 7 steps and 8 levels is formed in the region R3. A diffraction structure having a stepwise cross section with 3 steps and 4 levels is formed in the region R4. The height da of one step in each of steps of the region R3 and the region R4 provides the blue light beam having the wavelength $\lambda 1$ with a difference in optical path length of 1.25 wavelength and provides the red light beam having the wavelength $\lambda 2$ with a difference in optical path length of 0.75 wavelength. When the 8 levels in the stepwise cross section with 7 steps and 8 levels that is formed in the region R3 are defined as levels 0, 1, 2, 3, 4, 5, 6, 7 in ascending order from the lower side to the higher side, the 4 levels of the stepwise cross section with 3 steps and 4 levels that is formed in the region R4 are set to the same height as the levels 2, 3, 4, 5 of the region R3. In the configuration with 7 steps and 8 levels, the number of steps from the lowermost surface to the uppermost surface is 7 and the number of gradations from the lowermost surface to the uppermost surface is 8.

A diffraction structure having a stepwise cross section with the levels identical to the levels 0, 1, 2, 3, 4, 5 of the region R3 is formed in the boundary band RC.

In the region R3, a 2nd-order diffracted light beam is generated most strongly with respect to the blue light beam having the wavelength $\lambda 1$ and a −2nd-order diffracted light beam is generated most strongly with respect to the red light beam having the wavelength $\lambda 2$. In the region R4, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$. The 2nd-order diffracted light beam of the blue light beam generated from the region R3 and the 1st-order diffracted light beam of the blue light beam generated from the region R4 are condensed via the transparent base material with the thickness t1. The −2nd-order diffracted light beam of the red light beam generated from the region R3 and the −1st-order diffracted light beam of the red light beam generated from the region R4 are condensed via the transparent base material with the thickness t2 that is larger than the thickness t1. A −3rd-order diffracted light beam of the infrared light beam generated from the region R3 is condensed via the transparent base material with the thickness t3 that is larger than the thickness t2.

When a more general case is considered, where the diffraction region with N2 levels (N2 is a positive even number) and a diffraction region with M2 levels (M2 is a positive even number different from N2) are copresent, the average levels of the two regions are matched with the base line and a boundary band RC with (N2+M2)/2 levels is provided at the boundary of the two regions. As a results, phases of the regions R3 and R4 can be matched.

Thus, a diffraction structure having a stepwise cross section with (N2−1) steps and N2 levels (N2 is a positive even number) is formed in the region R3. A diffraction structure having a stepwise cross section with (M2−1) steps and M2 levels (M2 is a positive even number different from N2 and less than N2) is formed in the region R4. A diffraction structure having a stepwise cross section with (N2+M2)/2 levels is formed in the boundary band RC in order to match average levels of the region R3 and the region R4.

For example, when the region R2 shown in FIG. 6 is formed on the outer circumferential side of the region R4, the phases may be matched in the same manner as in Embodiment 2. Further, the phases of the region R3 and region R4 should be also matched with respect to the red light beam, but where the diffraction structure is configured in a stepwise form shown in FIG. 11 on the grounds similar to those considered for the blue light beam, the phases of the region R3 and region R4 can be also matched with respect to the red light beam.

In the present embodiment, the region R4 corresponds to an example of the first region, the region R2 corresponds to an example of the second region, the region R3 corresponds to an example of the third region, and the boundary band RC corresponds to an example of the second boundary band.

Embodiment 4

Figure 12:
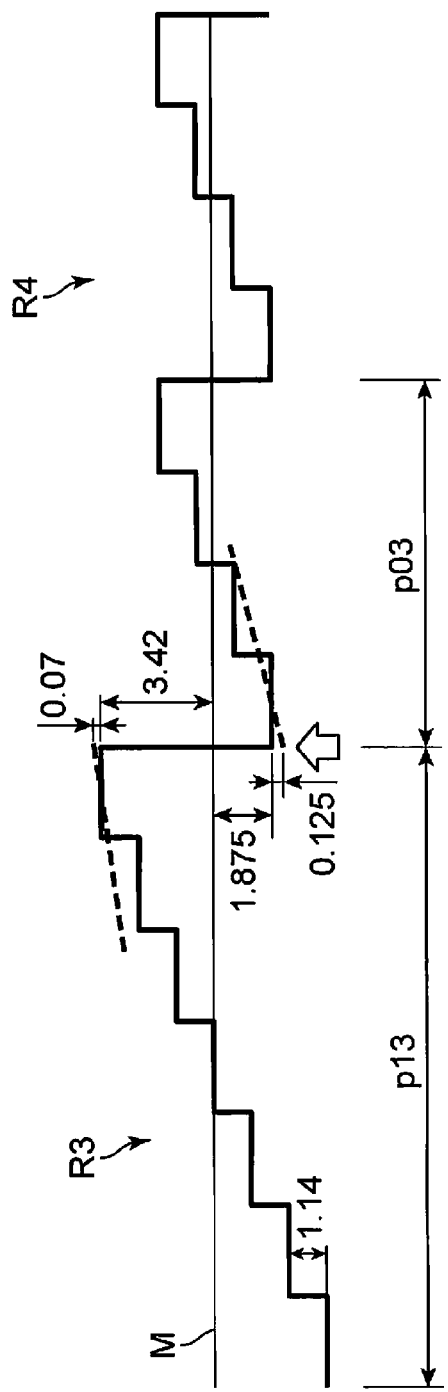
FIG. 12 illustrates a process leading to Embodiment 4 of the present invention.

The inventors have disclosed in WO 2009-016847 another configuration having a cross-sectional structure shown in FIG. 12 as a period, this configuration being designed to realize an objective lens, an optical head device, and an optical information device to be used for compatible reproduction of CD (compact disk), DVD, and BD, which are presently widely used, with one lens. FIG. 12 illustrates a process leading to Embodiment 4 of the present invention. A hologram lens having a configuration of the region R3 shown in FIG. 12 is formed in a range even closer to the optical axis than the region R1 described by way of example in Embodiment 2.

As shown in FIG. 12, one step of gradation in the region R3 is formed to a height (depth or step) such that a difference in optical path length provided to the blue light beam having the wavelength $\lambda 1$, as compared with the light beam passing in air, is about $1.14\lambda 1$. FIG. 12 shows a physical cross-sectional shape. For example, the explanation is given under an assumption that the lower side in FIG. 12 is the base material side (or glass material side) of the diffraction structure (or diffraction element or hologram element), that is, the side with a high refractive index, and the upper side is an air side, that is, a side with a low refractive index, but the reverse configuration may be also used. This feature is common with other embodiments of the present invention.

In FIG. 12, the vertical direction corresponds to the thickness or height of the glass material. The cross-sectional shape in which rectangles are thus combined will be called a stepwise cross-sectional shape as in the above-described other embodiments. In FIG. 12, the difference in optical path length caused by a unit step in the region R3 is 1.14 times the wavelength $\lambda 1$ of the blue light beam. Here, the wavelength $\lambda 1$ is 390 nm to 415 nm. As a standard, the wavelength $\lambda 1$ is about 405 nm, the wavelength of 390 nm to 415 nm will be generally referred to as about 405 nm, and the light beam having a wavelength of 390 nm to 415 nm will called a blue light beam.

Where the height (level) of steps of a diffraction grating is represented as an integral multiple of a unit step, the phase modulation quantity of the blue light beam created by the cross-sectional shape will be an integral multiple of $2\pi+0.14\times 2\pi$, and the phase modulation quantity will essentially be $0.14\times 2\pi$ per one step. By forming a 7-level gradation (6 steps), it is possible to approximate a sawtooth shape having a height with a difference in optical path length of one wavelength. The diffraction structure shown in FIG. 12 acts as if to form one period causing the +1st-order diffraction. Therefore, the +1st-order diffraction is generated most strongly with respect to the blue light beam.

Further, the wavelength λ2 is taken as 630 nm to 680 nm. As a standard, a wavelength of 660 nm is most often used as the wavelength λ2, the wavelength of 630 nm to 680 nm will be generally referred to as about 660 nm, and the light beam having a wavelength of 630 nm to 680 nm will be called a red light beam. With respect to the light beam having the wavelength λ2, the cross-sectional shape of the region R3 shown in FIG. 12 creates the difference in optical path length caused by a unit step of about 0.7 times the wavelength λ2 of the red light beam. The phase modulation quantity of the red light beam created by the cross-sectional shape will be an integral multiple of $2\pi-0.3\times 2\pi$, and the phase modulation quantity will essentially be $-0.3\times 2\pi$ per one step. Where the 7-level gradation (6 steps) is formed, it is possible to approximate a sawtooth shape having the slope that is reversed with respect to that of the above-described sawtooth shape relating to the blue light beam and a height with a difference in optical path length of about two wavelengths. The diffraction structure shown in FIG. 12 acts as if to form two periods causing the −1st-order diffraction. Therefore, the −2nd-order diffraction is generated most strongly with respect to the red light beam.

Further, the wavelength λ3 is taken as 770 nm to 820 nm. As a standard, the light beam having a wavelength λ3 of 780 nm will be called an infrared light beam. The infrared light beam is condensed by the objective lens with a numerical aperture of 0.45 to 0.5 on the information recording surface through a transparent base material with a thickness of 1.2 mm, and the reflected light from the information recording surface is received, thereby reproducing the CD.

With respect to the light beam having the wavelength λ3, the cross-sectional shape of the region R3 shown in FIG. 12 creates the difference in optical path length caused by a unit step of about 0.6 times the wavelength λ3 of the infrared light beam. The phase modulation quantity of the infrared light beam created by the cross-sectional shape will be an integral multiple of $0.6\times 2\pi$, and the phase modulation quantity will essentially be $-0.4\times 2\pi$ per one step. Where the 7-level gradation (6 steps) is formed, it is possible to approximate a sawtooth shape having the slope that is reversed with respect to that of the above-described sawtooth shape relating to the blue light beam and has the same direction as that of the sawtooth shape relating to the red light beam, and a height with a difference in optical path length of about three wavelengths. The diffraction structure shown in FIG. 12 acts as if to form three periods causing the −1st-order diffraction. Therefore, the −3rd-order diffraction is generated most strongly with respect to the infrared light beam.

Thus, since the strongest diffraction with respect to the blue light beam, red light beam, and infrared light beam occurs at completely different orders, such as +1st order, −2nd order, and −3rd order, the diffraction direction is significantly different for the blue light beam, red light beam, and infrared light beam and the design can be performed such as to condense the beams via different base material thicknesses by using this difference in diffraction directions.

The hologram lens having the cross-sectional shape shown in FIG. 12 is formed in the region R3 that is the closest to the optical axis. As a result, the region R3 condenses the blue light beam, red light beam, and infrared light beam through transparent base materials having mutually different thicknesses. Further, the region R4 having the diffraction structure identical, for example, to that of the region R1 shown in FIG. 6 is formed in the outer circumferential portion of the region R3, and the region R4 condenses the blue light beam and red light beam via the base materials of different thicknesses together with the light beam that has passed through the region R3. A region (this region is not shown in FIG. 12) having the diffraction structure identical, for example, to that of the region R2 shown in FIGS. 6 to 8 is formed in the outer circumferential portion of the region R4, and this region (region R2) condenses the blue light beam together with the light beams that have passed through the region R3 and the region R4 located in the inner circumferential portion on the information recording surface of the BD. Since the blue light beam passes through all of the regions, it is desirable that the phases in all of the regions be matched.

It seems that the height direction may be adjusted as shown in FIG. 12 to match the average level of the cross-sectional shape having of the region R3 having 7 levels with the average level of the cross-sectional shape of the region R4 having 4 levels and link continuously the phases of the regions R3 and R4. However, detailed investigation of the approximated phase variation shows that a phase shift occurs.

In FIG. 12, the difference in optical path length at the right end of the region R3 is higher by about 3.5 wavelengths (=3.42+0.07) than the average level M. In other words, essentially, a phase shift of 0.5 wavelength occurs.

By contrast, the difference in optical path length at the left end of the region R4 is lower by about 2.0 wavelengths (=1.875+0.125) than the average level M. In other words, essentially, no phase shift occurs.

As a result, essentially a phase difference of 0.5 wavelength occurs between the right end of the region R3 and the left end of the region R4.

Figure 13:
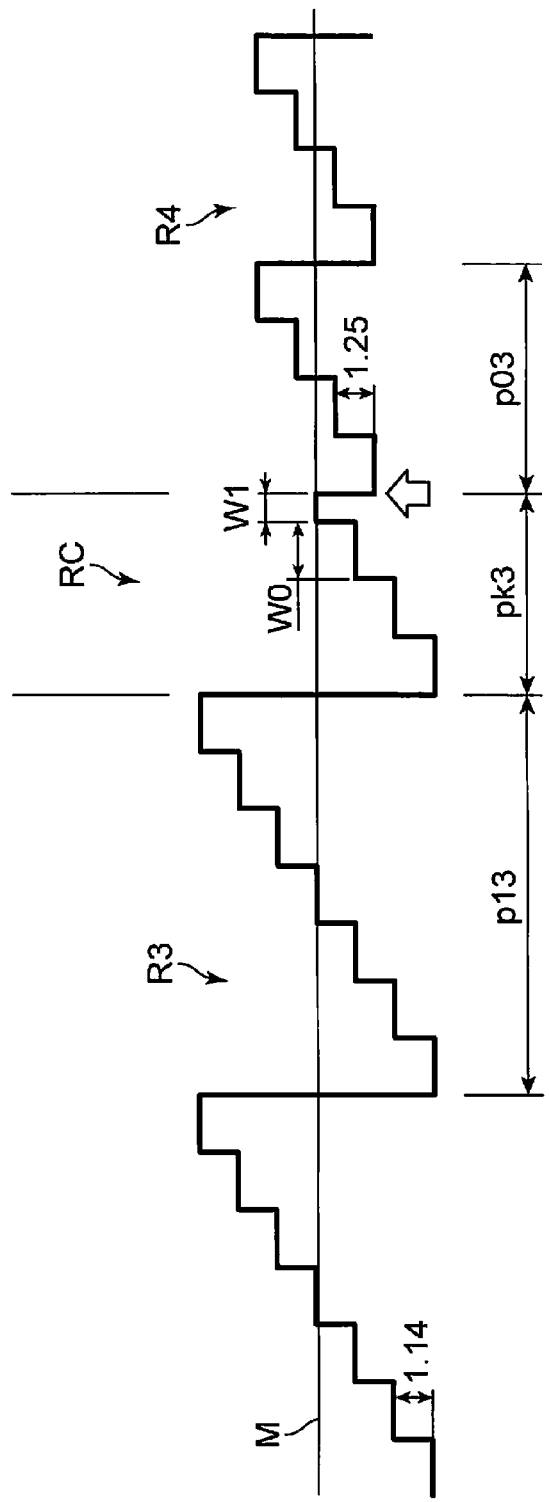
FIG. 13 shows a diffraction structure in Embodiment 4 of the present invention.

The inventors have invented the configuration that eliminates the phase shift, while matching the average levels of the phases. FIG. 13 shows a diffraction structure in Embodiment 4 of the present invention. A boundary band RC is provided between the region R3 and the region R4 in order to match the phases of the region R3 and region R4. A diffraction structure having 4 levels and a width of the period pk3 that is about half that of one period p13 of the 7-level diffraction structure formed in the R3 is formed in the boundary band RC. However, the level width W1 of the step at the right end of the boundary band RC is about half the level width W0 of the other steps in the boundary band RC. In the configuration shown in FIG. 13, the diffraction structure identical to that of the region R3 is formed by extension to the boundary band RC, and the optical path length at the right end of the region R3 matches the average level M. At the left end of the region R4, the optical path length also substantially matches the average level M. Therefore, continuity of phases of the region R3 and region R4 can be realized.

Thus, the first diffraction structure having a stepwise cross section with 6 steps and 7 levels is formed in the region R3. The second diffraction structure having a stepwise cross section with 3 steps and 4 levels is formed in the region R4. The height da of one step of the first diffraction structure and the second diffraction structure provides the blue light beam having the wavelength λ1 with a difference in optical path length of 1.14 wavelength and provides the red light beam having the wavelength λ2 with a difference in optical path length of 0.7 wavelength. The boundary band RC has a step of 0.5 period of the region R3.

In the region R3, a 1st-order diffracted light beam is generated most strongly with respect to the blue light beam having the wavelength λ1 and a −2nd-order diffracted light beam is generated most strongly with respect to the red light beam having the wavelength λ2. In the region R4, a 1st-order diffracted light beam is generated most strongly with respect to the blue light beam having the wavelength λ1 and a −1st-order diffracted light beam is generated most strongly with respect to the red light beam having the wavelength λ2. The 2nd-order diffracted light beam of the blue light beam generated from the region R3 and the 1st-order diffracted light beam of the blue light beam generated from the region R4 are condensed via the transparent base material with the thickness t1. The −2nd-order diffracted light beam of the red light beam generated from the region R3 and the −1st-order diffracted light beam of the red light beam generated from the region R4 are condensed via the transparent base material with the thickness t2 that is larger than the thickness t1. A −3rd-order diffracted light beam of the infrared light beam generated from the region R3 is condensed via a transparent base material with a thickness t3 that is larger than the thickness t2.

Figure 14:
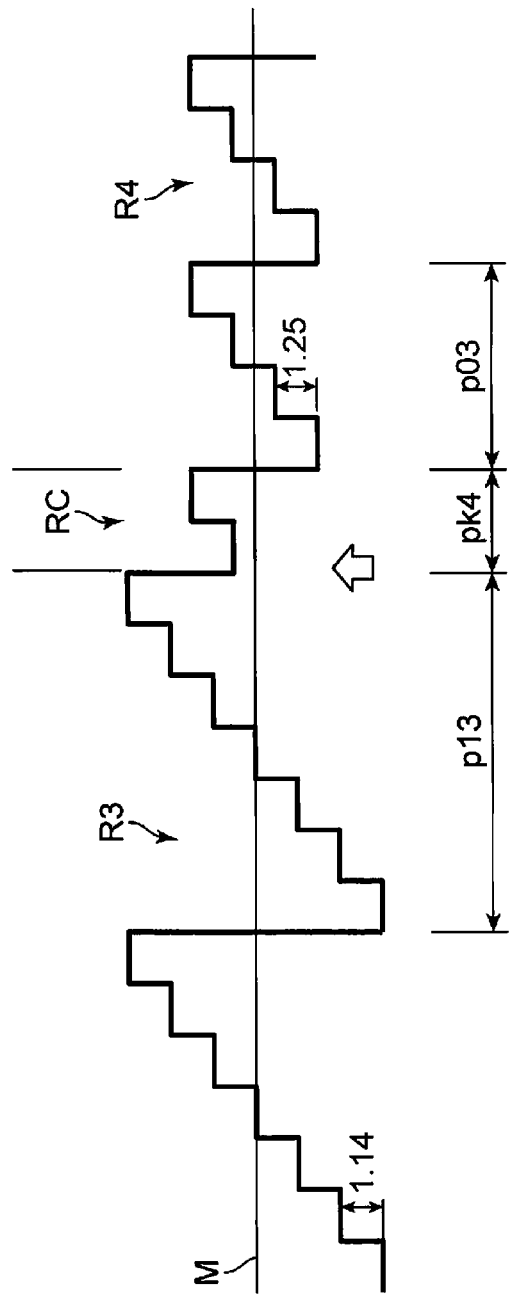
FIG. 14 shows a diffraction structure in the first variation example of Embodiment 4 of the present invention.

The boundary band RC may be also formed by extending the diffraction structure of the region R4. FIG. 14 shows a diffraction structure in the first variation example of Embodiment 4 of the present invention. A diffraction structure having 2 levels and a width of the period pk4 that is about half that of one period p03 of the diffraction structure having 4 levels and formed in the R4 is formed in the boundary band RC. In the configuration shown in FIG. 14, the diffraction structure identical to that of the region R4 is formed by extension to the boundary band RC, and the difference in optical path length of about 0.5 wavelength occurs between the left end of the region R4 and the average level M. The difference in optical path length of about 0.5 wavelength also occurs between the right end of the region R3 and the average level M. Therefore, continuity of phases of the region R3 and region R4 can be realized.

Thus, the first diffraction structure having a stepwise cross section with 6 steps and 7 levels is formed in the region R3. The second diffraction structure having a stepwise cross section with 3 steps and 4 levels is formed in the region R4. The height da of the first diffraction structure and the second diffraction structure provides the blue light beam having the wavelength λ1 with a difference in optical path length of 1.14 wavelength and provides the red light beam having the wavelength λ2 with a difference in optical path length of 0.7 wavelength. The boundary band RC has a step of 0.5 period of the region R4.

In the region R3, a 1st-order diffracted light beam is generated most strongly with respect to the blue light beam having the wavelength λ1 and a −2nd-order diffracted light beam is generated most strongly with respect to the red light beam having the wavelength λ2. In the region R4, a 1st-order diffracted light beam is generated most strongly with respect to the blue light beam having the wavelength λ1 and a −1st-order diffracted light beam is generated most strongly with respect to the red light beam having the wavelength λ2. The 2nd-order diffracted light beam of the blue light beam generated from the region R3 and the 1st-order diffracted light beam of the blue light beam generated from the region R4 are condensed via the transparent base material with the thickness t1. The −2nd-order diffracted light beam of the red light beam generated from the region R3 and the −1st-order diffracted light beam of the red light beam generated from the region R4 are condensed via the transparent base material with the thickness t2 that is larger than the thickness t1. A −3rd-order diffracted light beam of the infrared light beam generated from the region R3 is condensed via a transparent base material with a thickness t3 that is larger than the thickness t2.

Figure 15:
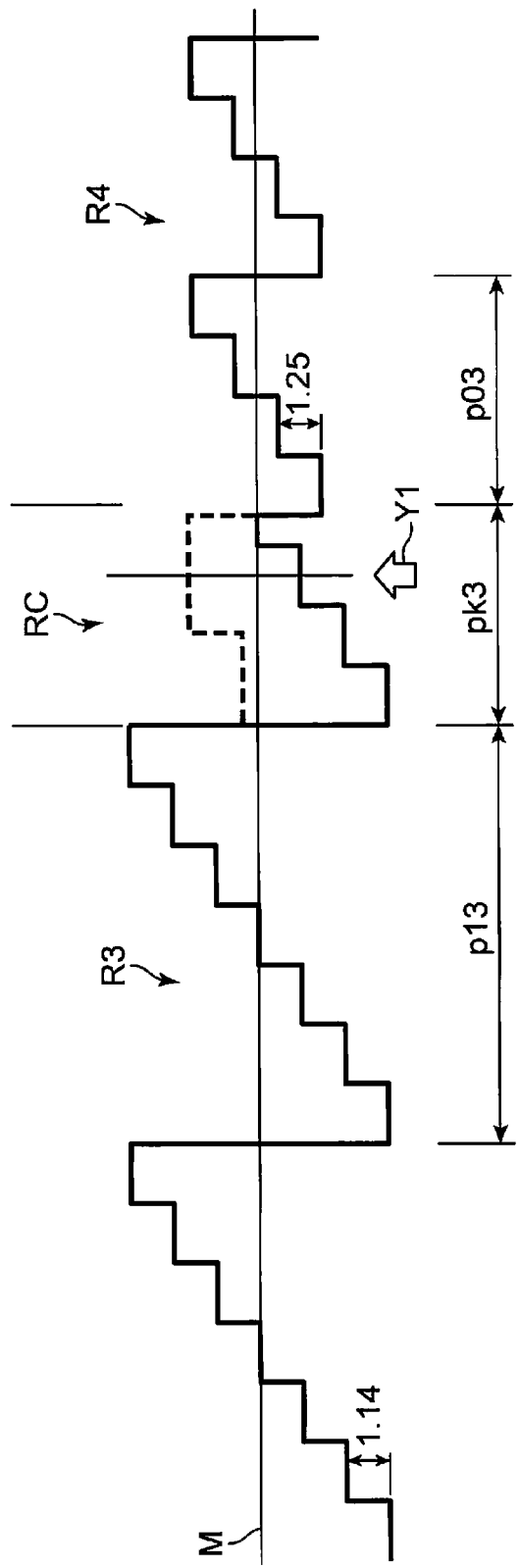
FIG. 15 shows a diffraction structure in the second variation example of Embodiment 4 of the present invention.

Further, in Embodiment 4, a diffraction structure can be obtained by combining the diffraction structure shown in FIG. 13 and the diffraction structure shown in FIG. 14. Such configuration will be explained below with reference to FIGS. 15 and 16. FIG. 15 shows a diffraction structure of the second variation example of Embodiment 4 of the present invention. The broken line shown in FIG. 15 is a line where the boundary band of the diffraction structure shown in FIG. 14 is superimposed on the boundary band of the diffraction structure shown in FIG. 13.

The boundary band RC in FIG. 13 is obtained by extending the cross-sectional shape of the diffraction structure of the region R3, and the boundary band RC in FIG. 14 is obtained by extending the cross-sectional shape of the diffraction structure of the region R4. The phase continuity can be ensured in both diffraction structures. Therefore, the phase continuity can be also ensured for the intermediate form thereof. For example, as shown in FIG. 15 the cross-sectional shape on the left side (the position indicated by the upward arrow Y1 serves as a boundary) is the cross-sectional shape represented by the solid line, that is, the cross-sectional shape obtained by extending the diffraction structure of the region R3, and the cross-sectional shape on the right side is the cross-sectional shape represented by the broken line, that is, the cross-sectional shape obtained by extending the diffraction structure of the region R4.

Figure 16:
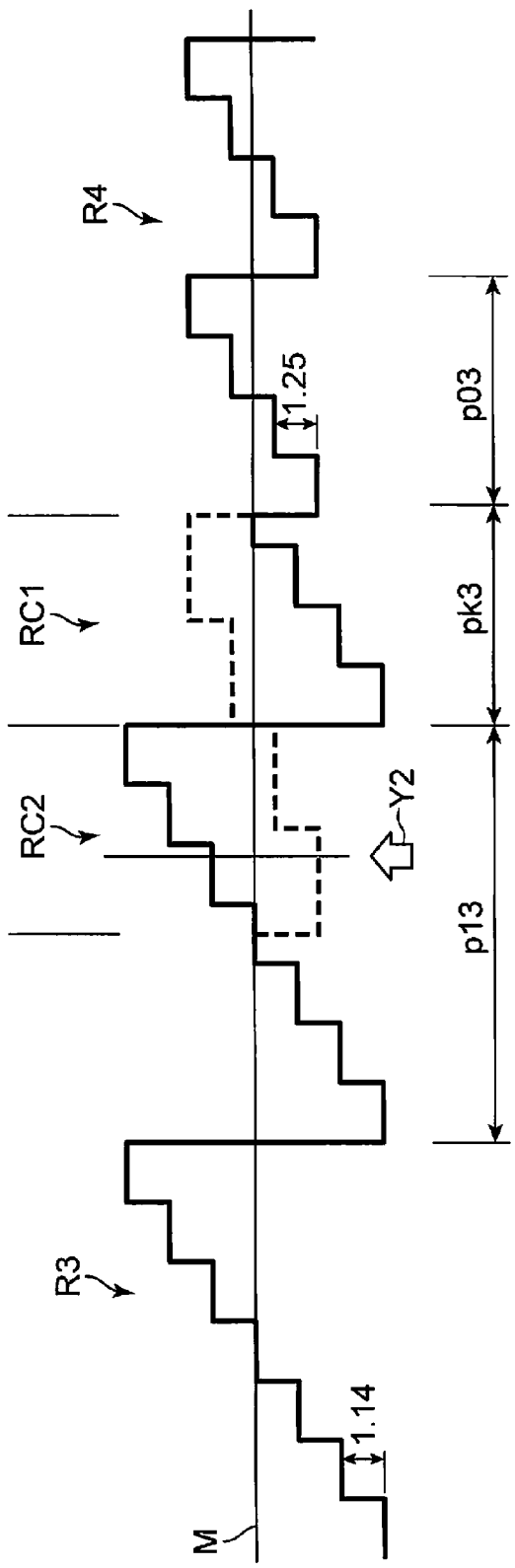
FIG. 16 shows a diffraction structure in the third variation example of Embodiment 4 of the present invention.

Further, the diffraction structure of the boundary band RC shown in FIG. 15 can be extended by half a period toward the region R3. FIG. 16 shows a diffraction structure in the third variation example of Embodiment 4 of the present invention. The broken line shown in FIG. 16 is a line where the boundary band of the diffraction structure shown in FIG. 14 is superimposed on the boundary band of the diffraction structure shown in FIG. 13. In FIG. 16, the cross-sectional shape of the boundary band RC2 on the left side (the position indicated by the upward arrow Y2 serves as a boundary) is the cross-sectional shape represented by the solid line, that is, the cross-sectional shape obtained by extending the diffraction structure of the region R3, and the cross-sectional shape of the boundary band RC1 on the right side is the cross-sectional shape represented by the broken line, that is, the cross-sectional shape obtained by extending the diffraction structure of the region R4.

When the interval between the uppermost level and lowermost level of the cross-sectional shape of each region is defined as one period, the point in the center of one period of the cross-sectional shape having 6 steps and 7 levels matches the uppermost level or lowermost level of the configuration having 3 steps and 4 levels, as shown in FIG. 13. As a specific example of such shape, the position of the connection point of the region R3 and region R4 in the boundary band RC can be changed to the left or to the right, as shown in FIG. 16, in response to phase variation, with respect to the cross-sectional shape shown in FIG. 13 as a reference.

The connection portion may be changed in the above-described manner so that both the point in the center of one period of the cross-sectional shape having 6 steps and 7 levels and the uppermost level or lowermost level of the configuration having 3 steps and 4 levels match the phase of the average level M. When a more general case is considered, in a diffraction structure that is constituted by steps such that one step provides a difference in optical path length of equal to or greater than 1 wavelength and equal to or less than 1.5 wavelength and has a shape between the uppermost level and the lowermost level such that has a stepwise cross section with NE steps and (NE+1) levels (NE is a positive even number), a point in the center between the uppermost level and the lowermost level is taken as a reference point. Further, in a diffraction structure that has a shape between the uppermost level and the lowermost level such that has a stepwise cross section with NO steps and (NO+1) levels (NO is a positive odd number), a point in the uppermost level or the lowermost level is taken as a reference point. Further, in the diffraction structure having a sawtooth cross section such as shown by way of example in FIG. 3, a point in the center between the uppermost level and the lowermost level matches the phase of the average level M. Therefore, the point in the center between the uppermost level and the lowermost level may be taken as a reference point.

Therefore, the first diffraction structure is constituted by steps such that one step provides a difference in optical path length of equal to or greater than 1 wavelength and equal to or less than 1.5 wavelength and has a shape between the uppermost level and the lowermost level such that has a stepwise cross section with NE steps and (NE+1) levels (NE is a positive even number). The second diffraction structure is constituted by steps such that one step provides a difference in optical path length of equal to or greater than 1 wavelength and equal to or less than 1.5 wavelength and has a shape between the uppermost level and the lowermost level such that has a stepwise cross section with NO steps and (NO+1) levels (NO is a positive odd number). When the first diffraction structure and the second diffraction structure are copresent, the point in the center between the uppermost level and the lowermost level of the first diffraction structure is taken as a reference point, the point in the uppermost level or the lowermost level of the second diffraction structure is taken as a reference point, and the reference point of the first diffraction structure may be matched with the reference point of the second diffraction structure in the boundary portion of the region having the first diffraction structure and the region having the second diffraction structure.

The third diffraction structure has a sawtooth cross section. When the first diffraction structure and the third diffraction structure are copresent, the point in the center between the uppermost level and the lowermost level of the first diffraction structure is taken as a reference point, the point in the center between the uppermost level and the lowermost level of the third diffraction structure is taken as a reference point, and the reference point of the first diffraction structure may be matched with the reference point of the third diffraction structure in the boundary portion of the region having the first diffraction structure and the region having the third diffraction structure.

When the second diffraction structure and the third diffraction structure are copresent, the point in the uppermost level or the lowermost level of the second diffraction structure is taken as a reference point, the point in the center between the uppermost level and the lowermost level of the third diffraction structure is taken as a reference point, and the reference point of the second diffraction structure may be matched with the reference point of the third diffraction structure in the boundary portion of the region having the second diffraction structure and the region having the third diffraction structure.

Thus, any diffraction structure from among the first diffraction structure that is constituted by steps, such that one step provides a difference in optical path length of equal to or greater than 1 wavelength and equal to or less than 1.5 wavelength, and has a shape between the uppermost level and the lowermost level such that has a stepwise cross section with NE steps and (NE+1) levels (NE is a positive even number), the second diffraction structure that is constituted by steps, such that one step provides a difference in optical path length of equal to or greater than 1 wavelength and equal to or less than 1.5 wavelength, and has a shape between the uppermost level and the lowermost level such that has a stepwise cross section with NO steps and (NO+1) levels (NO is a positive odd number), and the third diffraction structure having a sawtooth cross section is formed in the region R3 and in the region R4. Different diffraction structures are formed in the region R3 and the region R4. The point in the center between the uppermost level and the lowermost level of the first diffraction structure is taken as a reference point, the point in the uppermost level or the lowermost level of the second diffraction structure is taken as a reference point, the point in the center between the uppermost level and the lowermost level of the third diffraction structure is taken as a reference point, and the reference point of the diffraction structure of the region R3 is matched with the reference point of the diffraction structure of the region R4.

The position of the connection point of the region R3 and region R4 can be changed to the left or to the right (radial direction of the lens), as explained using FIG. 16, with reference to the above-described method for fabricating the diffraction structure of the boundary band. The operation of matching the reference points in the present embodiment includes such change in the position of the connection point to the left or to the right (radial direction of the lens).

Where the region R2 shown in FIG. 6 is formed, for example, on the outer circumferential side of the region R4, the phases of the region R4 and region R2 may be matched in the same manner as in Embodiment 2. With respect to the red light beam, phases of the region R3 and region R4 should be matched, but in Embodiment 4, the phases of the region R3 and region R4 can be adjusted also with respect to the red light beam.

Figure 17:
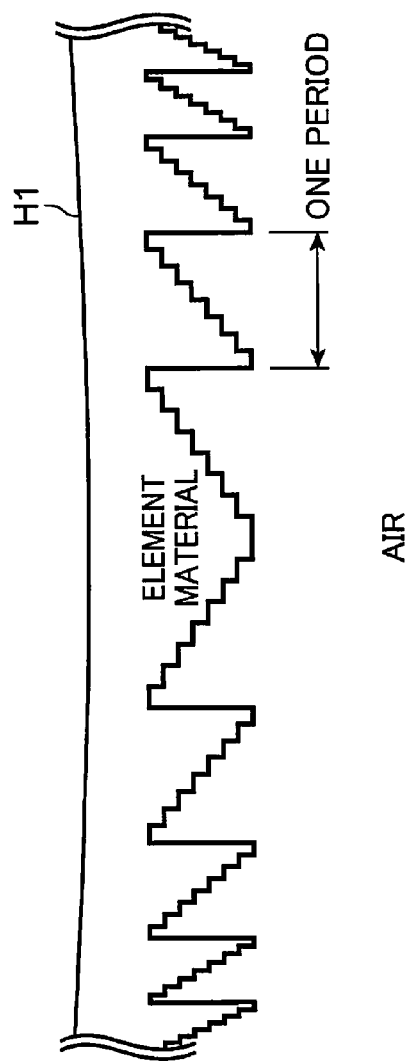
FIG. 17 is a conceptual view illustrating the hologram lens having formed therein the diffraction structure of region R3 shown in FIG. 11.

The explanation above is focused on a one-period diffraction grating. A schematic diagram in which the region R3 shown in FIG. 11 is taken as a hologram lens is shown in FIG. 17. FIG. 17 illustrates a hologram lens in which the diffraction structure of the region R3 shown in FIG. 11 is formed. In the configuration shown in FIG. 17, the hologram lens H1 acts as a convex lens with respect to the blue light beam and as a concave lens with respect to the red light beam and infrared light beam. The hologram lens H1 is a configuration useful for ensuring a certain distance between the lens and the optical disk surface when information is reproduced from a CD and a DVD. Where the positions of the element material (glass material) and air are reversed, the hologram lens H1 acts as a concave lens with respect to the blue light beam and as a convex lens with respect to the red light beam and infrared light beam.

In the present invention, when a sawtooth or stepwise cross-sectional shape is shown in the figures as a cross-sectional shape of the diffraction grating, a representative cross-sectional shape is shown. When a lens is actually fabricated, the peaks and valleys of the sawtooth configuration can be rounded, the angles of the steps can be rounded, and the inclination angle can somewhat vary due to the fabrication errors and differences in the shape of fabrication tools or fabrication methods, but it is in principle essential that the phase shift is reduced to a minimum limit by providing the diffraction structure of the boundary band that corresponds to the concept of the present invention, and certain differences in shape will not affect this result.

One period of the diffraction grating, as referred to herein, is a length for which the difference in the phase of the incident light and the phase of the diffracted light beam is a multiple integer of $2\pi$, and this length changes according to the diffraction angle.

When lens performance is determined from a variety of viewpoints, the phase is sometimes deliberately designed to be discontinuous. In such cases, it is possible to take the configuration in accordance with the present invention as a base configuration, define the coefficient $A=\phi/2\pi$ where $\phi$ is a phase discontinuity, take the absolute value of diffraction order as NK (NK is a natural number), and perform shifting in the transverse axis direction (radial direction of the lens) by a distance obtained by multiplying one period by the coefficient A and then dividing by NK. Such a case is also a variation example in which the present invention is used.

In Embodiment 4, the region R4 may have a diffraction structure identical to that of the region R20 shown in FIG. 3, and a region having a diffraction structure identical to that of the region R10 shown in FIG. 3 may be further provided in the outer circumferential portion of the region R4. The boundary band RB shown in FIG. 3 is formed between the region R4 and the region R10. A boundary band (for example, the region R7 shown in FIG. 7 or the region R7 and region R8 shown in FIG. 8) is also formed between the region R4 and the region R2. In other words, the diffraction structures explained in Embodiment 1 and Embodiment 2 can be used in the region R4 and the region on the outer circumferential side of the region R4.

In the present embodiment, the region R3 corresponds to an example of the first region, the region R4 corresponds to an example of the second region, the region R2 corresponds to an example of the third region, and the boundary band RC corresponds to an example of the second boundary band and the boundary band.

Embodiment 5

Figure 18:
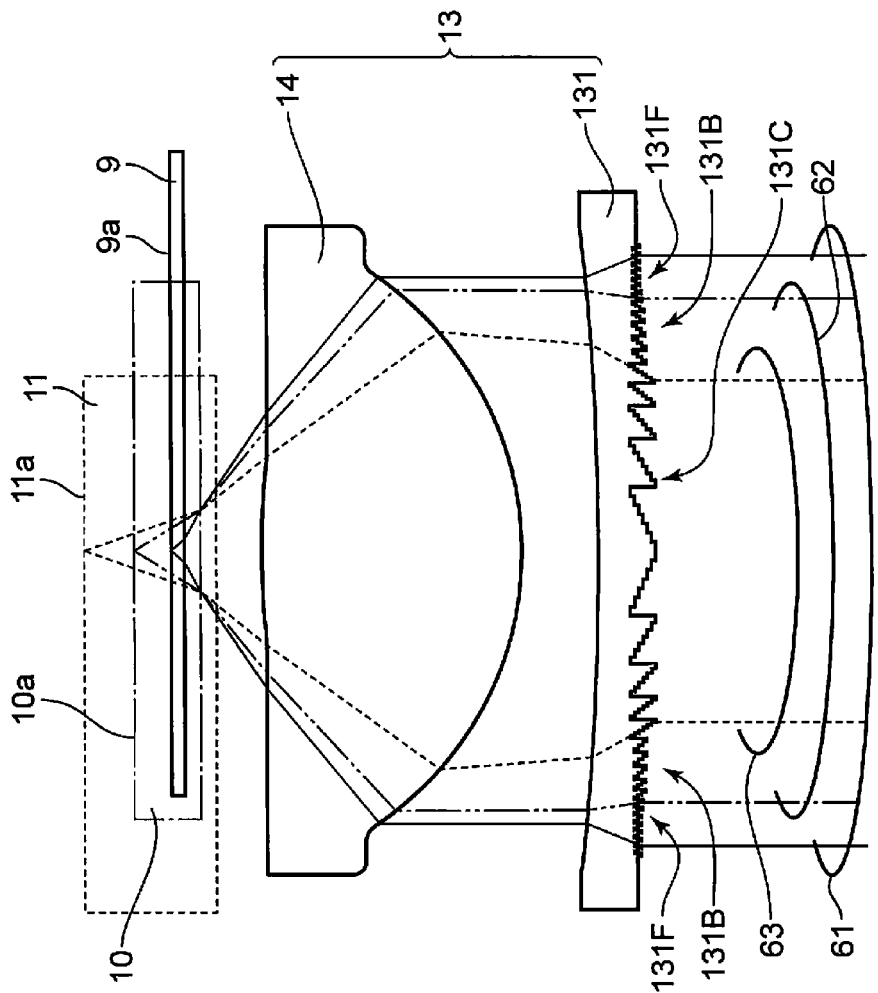
FIG. 18 shows a configuration of the compound objective lens in Embodiment 5 of the present invention.

Another configuration example of a CD, DVD and BD compatible lens will be explained below with reference to FIG. 18. FIG. 18 shows a configuration of the compound objective lens according to Embodiment 5 of the present invention. A compound objective lens 13 is provided with an optical element 131 and an objective lens 14.

The optical element 131 is an optical element of a diffraction type or a phase difference type, and the refractive surface may be formed on one or both surfaces thereof. In the optical element 131 shown in FIG. 18, the refractive surface is formed only on one surface of the optical disk. In the optical element 131, the concave refractive surface is formed on one surface. The concave refractive surface is combined with a diffraction structure or phase difference element that acts as a convex lens with respect to a blue light beam, thereby ensuring mutual cancelation of lens power. As a result, the lens power with respect to the reference wavelength of the blue light beam of the entire optical element 131 can be zeroed. Therefore, the refractive objective lens 14 that is used in combination with the optical element 131 may be designed so as to enable condensing at a predetermined numerical aperture equal to or greater than NA1 via the transparent base material of the optical disk 9 with a thickness t1. The resultant effect is that inspection during fabrication of the objection lens 14 is facilitated.

The optical disk 9 is for example a BD and has a transparent base material with a thickness t1. The optical disk 10 is for example a DVD and has a transparent base material with a thickness t2 that is larger than the thickness t1. The optical disk 11 is for example a CD and has a transparent base material with a thickness t3 that is larger than the thickness t2.

In any case, the objective lens 14 is designed such that the blue light beam having a wavelength 71 is modulated by the optical element 131 and then further condensed on the information recording surface 9a via the transparent base material of the optical disk 9 having the thickness t1. Further, the objective lens 14 is designed such that the red light beam having a wavelength $\lambda 2$ is modulated by the diffraction structure or the optical element of the phase difference type of the optical element 131 and then further condensed on the information recording surface 10a via the transparent base material of the optical disk 10 having the thickness t2. Further, the objective lens 14 is designed such that the infrared light beam having a wavelength $\lambda 3$ is modulated by the optical element 131 and then further condensed on the information recording surface 11a via the transparent base material of the optical disk 11 having the thickness t3.

The light beams with different wavelengths can be designed so as to be condensed on the information recording surface when passing through transparent base materials of different thicknesses by using the difference in wavelength, difference in the aforementioned diffraction order, difference in phase provided by the phase difference, and difference (dispersion) in refractive index depending on the wavelength of the refractive objective lens 14.

The diffraction structure may be directly formed on the surface of the objective lens 14 and the optical element 131 and the objective lens 14 may be integrated. In this case, the number of components can be reduced. For example, where the grating shape shown in FIG. 6 is formed integrally on the surface of the objective lens, it is possible to deform the surface of the objective lens 14, that is, the average level M to match the refractive surface and deform the cross-sectional shape of the diffraction grating similarly to the deformation of the average level M. Therefore, where the surface of the objective lens is aspherical, each step surface drawn horizontally in FIG. 6 or the sloped portion of the sawtooth shape is also aspherical. Further, with the design in which steps are formed on the surface of the objective lens, a shape is obtained in which the steps are further superimposed on the grating shape shown in FIG. 6.

It goes without saying that the shape of the objective lens combining the aspherical shape of the objective lens surface and the grating shape obtained under the assumption that the objective lens of the present embodiment is flat is also within the scope of rights of the present invention.

Numerical apertures NA used when condensing the respective light beams differ between the CD, DVD, and BD. The numerical aperture NA1 suitable for BD is equal to or greater than 0.85. The numerical aperture NA2 suitable for DVD is about 0.6 to 0.67. The numerical aperture NA3 suitable for CD is about 0.45 to 0.55. Where the numerical aperture is less than the abovementioned values of numerical apertures NA1 to NA3, the light beams cannot be converged to a sufficiently small size on the recording surface. Where the numerical aperture is greater than the abovementioned values of numerical apertures NA1 to NA3, when the optical disk is deformed and tilted, a large distortion of wave surface occurs and the configuration is unsuitable for stable recording or reproduction of information.

Since the numerical aperture NA3 should be less than the numerical aperture NA2 and the numerical aperture NA1, a total of three concentric round regions are provided in the optical element 131 around the optical axis as a center. A diffraction structure identical to that of the region R3 shown in FIG. 11 and described in Embodiment 3 above is formed in the innermost region 131C. An infrared light beam 63 incident on the innermost region 131C is condensed on the information recording surface 11a via the transparent base material having a thickness t3 of about 1.2 mm, as shown by a broken line.

A diffraction structure identical to that of the region R4 shown in FIG. 11, in other words, the region R1 shown in FIG. 6, is formed in a region 131B located outside the innermost region 131C. A red light beam 62 incident on the intermediate region 131B and the innermost region 131C is condensed on the information recording surface 10a via the transparent base material having a thickness t2 of about 0.6 mm.

A diffraction structure identical to that of the region R2 shown in FIG. 6 is formed in the region 131F outside of the intermediate region 131B. A blue light beam 61 incident on the innermost region 131C, intermediate region 131B, and outer region 131F is condensed on the information recording surface 9a via the transparent base material having a thickness t1 of about 0.1 mm.

Thus, the innermost region 131C is commonly used for the CD using an infrared light beam, DVD using a red light beam, and BD using a blue light beam. The blue light beam 61, which has the shortest wavelength, demonstrates large dispersion in the refractive objective lens 14 and the focal point depth thereof is small. Therefore, it is desirable that axial color aberration of the blue light beam be corrected. The correction of the axial color aberration can be realized by designing the diffraction structure of the optical element 131 so as to ensure a convex lens action.

Where the diffraction element structure of the above-described embodiment is used, the infrared light beam 63 shown by a broken line or a red light beam 62 shown by a two-dot-dash line is subjected to action reversed with respect to that in the case of the blue light beam 61. Therefore, the concave lens action is demonstrated and the focal length is enlarged. In particular, since the infrared light beam 63 has a wavelength larger than that of the red light beam 62, a strong concave lens action is demonstrated. For this reason, the focal length of the red light beam 62 becomes larger than the focal length of the blue light beam 61, and the focal length of the infrared light beam 63 becomes larger than the focal length of the red light beam 62. Therefore, the focal point positions of the red light beam 62 or infrared light beam 63 can be moved farther from the objective lens 14 and the beams can be focused via the thick transparent base material of the optical disk 10 or optical disk 11. In other words, the resultant effect is that the distance between the surface of the objective lens 14 and the surface of the optical disk 10 or optical disk 11, that is, the working distance (WD), can be ensured.

Figure 19:
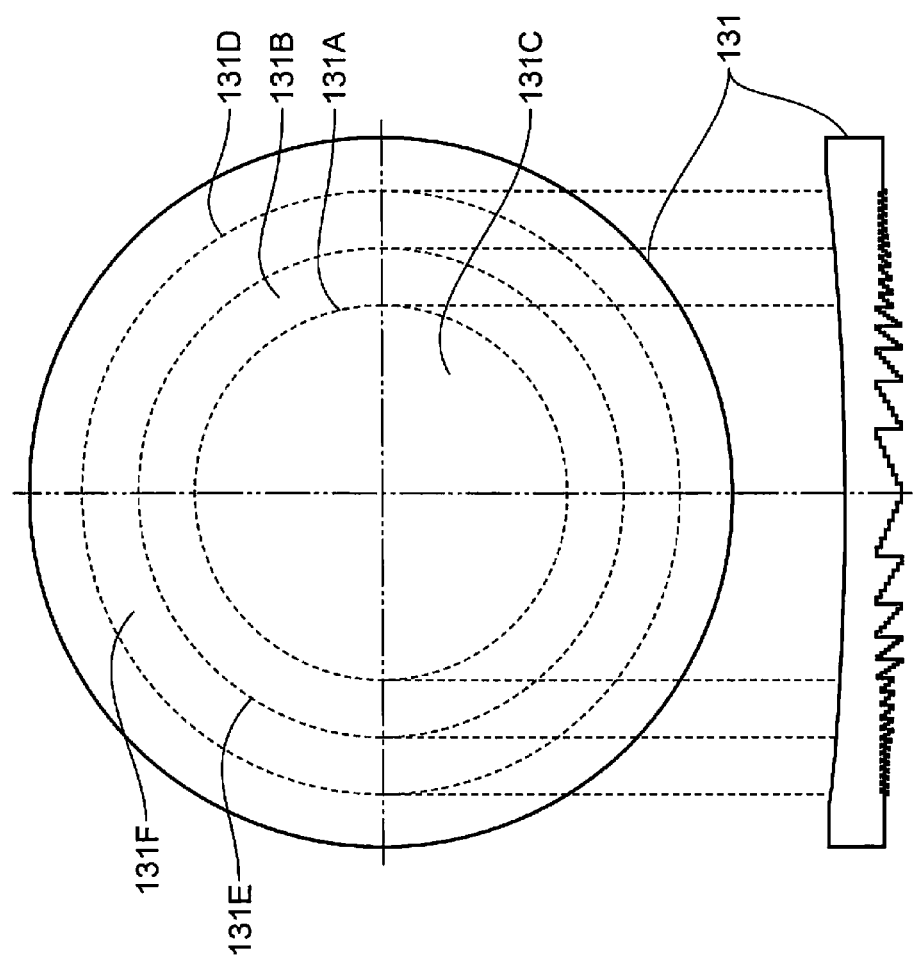
FIG. 19 shows the optical element shown in FIG. 18.

FIG. 19 illustrates the optical element 131 shown in FIG. 18. The upper figure in FIG. 19 is a plan view illustrating the optical element 131. The lower figure in FIG. 19 is a cross-sectional view similar to that of FIG. 18 that illustrates the optical element 131. Explaining the configuration with reference to FIG. 18, the diffraction structure of the optical element 131 differs between the innermost region 131C on the inside of the inner-intermediate boundary 131A, the intermediate region 131B between the inner-intermediate boundary 131A and the intermediate-outer boundary 131E, and the outer region 131F between the intermediate-outer boundary 131E and the effective range 131D of the optical beam.

The inner region 131C includes an intersection point of the optical element 131 and the optical axis, that is, the center of the optical element 131. The region 131C is used when information is recorded/reproduced on/from the optical disk 11 by using an infrared light beam, when information is recorded/reproduced on/from the optical disk 10 by using a red light beam, and when information is recorded/reproduced on/from the optical disk 9 by using a blue light beam.

The intermediate region 131B is used when information is recorded/reproduced on/from the optical disk 10 by using a red light beam and when information is recorded/reproduced on/from the optical disk 9 by using a blue light beam. When information is recorded/reproduced on/from the optical disk 11 by using an infrared light beam, the infrared light beam that has passed through the region 131B is not condensed, and the numerical aperture NA3 is less than the numerical aperture NA1 and numerical aperture NA2.

The outer region 131F is only used when information is recorded/reproduced on/from the optical disk 9 by using a blue light beam. When information is recorded/reproduced on/from the optical disk 10 by using a red light beam or when information is recorded/reproduced on/from the optical disk 11 by using an infrared light beam, the red light beam or infrared light beam that has passed through the region 131F is not condensed, and the numerical aperture NA2 is less than the numerical aperture NA1.

In the outer region 131F, it is desirable that the diffraction structure having a sawtooth-shaped cross section be provided, as in the region R2 shown in FIG. 6, and the diffraction efficiency of the blue light beam be further increased. From the standpoint of easiness of processing, it is desirable that the period and depth of the region 131F be doubled or tripled to induce the 2nd-order diffraction or 3rd-order diffraction.

When compatible reproduction of DVD and BD is performed and compatible reproduction with CD is not performed, the region 131C is omitted and the region 131B is formed to reach the vicinity of the optical axis.

By forming a diffraction structure as a convex lens such that the blue light beam is subjected to convex lens action by the diffraction structure, it is also possible to reduce focal length variations when the wavelength λ1 changes by about several nanometers.

By using the design such that the focal length of the red light beam is larger than the focal length of the blue light beam and the focal length of the infrared light beam is larger than the focal length of the red light beam, or by using the design such that the red light beam and the infrared light beam are both subjected to concave lens action by the diffraction structure, it is possible to enlarge further the space (working distance) between the objective lens surface and the optical disk surface.

Embodiment 6

Figure 20:
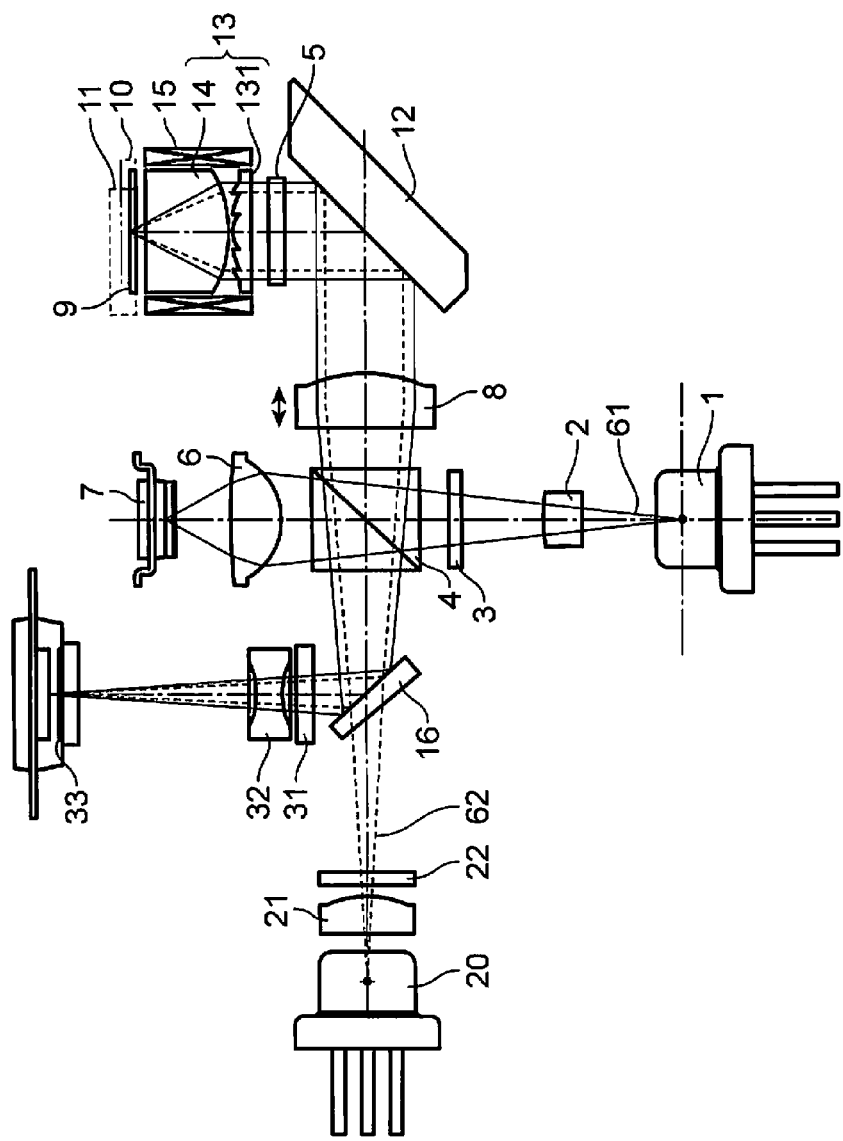
FIG. 20 shows a conceptual configuration of the optical head device in Embodiment 6 of the present invention.

FIG. 20 shows a schematic configuration of the optical head device in Embodiment 6 of the present invention. In FIG. 20, the optical head device is provided with a laser beam source 1, a relay lens 2, a three-beam grating 3, a beam splitter 4, a ¼ wavelength plate 5, a condensing lens 6, a photodetector 7, a collimator lens 8, a rising mirror 12, a compound objective lens 13, an actuator 15, a beam splitter 16, a two-wavelength laser beam source 20, a relay lens 21, a three-beam grating 22, a detection diffraction element 31, a detection lens 32, and a photodetector 33. The compound objective lens 13 is provided with the objective lens 14 and the optical element 131.

The laser beam source 1 emits a blue light beam having a wavelength λ1 within a range of 390 nm to 415 nm, the standard wavelength being about 408 nm. The two-wavelength laser beam source 20 emits a red light beam having a wavelength λ2 within a range of 630 nm to 680 nm, the standard wavelength being 660 nm, and an infrared light beam having a wavelength λ3 within a range of 770 nm to 810 nm, the standard wavelength being 780 nm. The collimator lens 8 converts the beam into a parallel beam. The rising mirror 12 folds the optical axis.

The optical disk 9 is a third-generation optical disk such as BD that has a base material thickness t1 of about 0.1 mm (the base material thickness of equal to or less than 0.11 mm that includes the production error is called about 0.1 mm) or a base material thickness less than 0.1 mm and records/reproduces information with an optical beam having the wavelength λ1. The optical disk 10 is a second-generation optical disk such as DVD that has a base material thickness t2 of about 0.6 mm (the base material thickness of 0.5 mm to 0.7 mm that includes the production error is called about 0.6 mm) and records/reproduces information with an optical beam having the wavelength λ2. The optical disk 11 is a first-generation optical disk such as CD that has a base material thickness t3 of about 1.2 mm (the base material thickness of 0.8 mm to 1.5 mm that includes the production error is called about 1.2 mm) and records/reproduces information with an optical beam having the wavelength λ3.

In the optical disk 9 and optical disk 10 shown in FIG. 20, only the base material from the incidence plane of the light beam to the recording surface is shown. Actually, in order to increase the mechanical strength and obtain the outer shape with a thickness of 1.2 mm equal to that of a CD (optical disk 11), the base material and a protective sheet are pasted together. In the optical disk 10, the base material is pasted together with the protective material with a thickness of 0.6 mm. In the optical disk 9, the base material is pasted together with the protective material with a thickness of 1.1 mm. Even in the optical disk 11, the base material is pasted together with a thin protective material. In FIG. 20, the protective material is omitted for the sake of simplicity.

FIG. 20 shows a configuration in which the optical head device is provided with the two-wavelength laser beam source 20 that emits light beams with two wavelengths, namely, the wavelengths λ2 and λ3, but it is also possible to use a configuration including separate light beam sources for each wavelength and a dichroic mirror that mates the optical paths of the light beams from the light beam sources.

When compatible reproduction of DVD and BD is performed and compatible reproduction of CD is not performed, the infrared light beam source can be omitted.

The laser beam source 1 and the two-wavelength laser beam source 20 are preferably constituted by semiconductor laser beam sources, thereby making it possible to reduce the optical head device and the optical information device using the optical head device in size, weight, and power consumption.

When information is recorded/reproduced on/from the optical disk 9, which has the highest recording density, the blue light beam 61 with a wavelength λ1 that has been emitted from the laser beam source 1 is reflected by the beam splitter 4 and converted into a substantially parallel light beam by the collimator lens 8. The optical axis of the blue light beam 61 converted into the substantially parallel light beam is folded by the rising mirror 12 and the beam is converted into a circular polarized light beam by the ¼ wavelength plate 5. The ¼ wavelength plate 5 is designed so as to act as a ¼ wavelength plate with respect to both the light beam having the wavelength 2J and the light beam having the wavelength λ2. The blue light beam 61 converted into the circular polarized light beam is then condensed by the optical element 131 and the objective lens 14 on the information recording surface 9a via the transparent base material of the optical disk 9 with a thickness of about 0.1 mm. For the sake of convenience of illustration, the rising mirror 12 is described to bend the light beam upward, as shown in the figure, but in the actual configuration, the optical axis of the light beam is folded from the sheet surface forward (or rearward) in the direction perpendicular to the sheet surface.

The blue light beam 61 reflected by the information recording surface 9a follows the original optical path in reverse (return path) and is converted by the ¼ wavelength plate 5 into a linear polarized light beam in the direction orthogonal to the forward path. The linear polarized light beam is almost entirely transmitted by the beam splitter 4 and entirely reflected by the beam splitter 16. The blue light beam 61 reflected by the beam splitter 16 is diffracted by the detection diffraction element 31, the focal length thereof is extended by the detection lens 32, and the beam falls on the photodetector 33. By computing the output of the photodetector 33, it is possible to obtain servo signals used for focus control or tracking control and information signals.

As described hereinabove, the beam splitter 4 is provided with a polarization separation membrane that entirely reflects the light beam linear polarized in one direction and entirely transmits the light beam linear polarized in the direction orthogonal to the one direction with respect to the blue light beam 61 with the wavelength λ1. Further, as will be described hereinbelow, the beam splitter 4 entirely transmits the red light beam 62 and the infrared light beam 63 emitted from the two-wavelength laser light beam source 20 with respect to the red light beam 62 with the wavelength λ2 and the infrared light beam 63 with the wavelength λ3. Thus, the beam splitter 4 is an optical path branching element having polarizing ability and wavelength selectivity. By eliminating the dependence on polarization from the beam splitter 4, it is possible to omit the ¼ wavelength plate 5.

When information is recorded/reproduced on/from the optical disk 10, the red light beam 62 with a wavelength λ2, which is a substantially linear polarized light emitted from the two-wavelength laser beam source 20 is transmitted by the beam splitter 16 and the beam splitter 4 and converted into a substantially parallel light beam by the collimator lens 8. The optical axis of red light beam 62 converted into the substantially parallel light beam is folded by the rising mirror 12 is then condensed by the optical element 131 and the objective lens 14 on the information recording surface 10a via the transparent base material of the optical disk 10 with a thickness of about 0.6 mm.

The red light beam 62 reflected by the information recording surface 10a follows the original optical path in reverse (return path) and is almost entirely transmitted by the beam splitter 4 and entirely reflected by the beam splitter 16. The red light beam 62 reflected by the beam splitter 16 is diffracted by the detection diffraction element 31, the focal length thereof is extended by the detection lens 32, and the beam falls on the photodetector 33. By computing the output of the photodetector 33, it is possible to obtain servo signals used for focus control or tracking control and information signals. Thus, in order to obtain servo signals of the optical disk 9 and optical disk 10 from the photodetector 33 commonly used for the blue light beam and the red light beam, the light generation point of the laser beam source 1 and the light generation point of the red light beam of the two-wavelength light beam source 20 are disposed so as to be in imaging relationship with respect to the common position on the objective lens 14 side. As a result, the number of photodetectors and also the number of wirings can be reduced.

The beam splitter 16 is a polarization separation membrane that entirely reflects the light beam linear polarized in one direction and entirely transmits the light beam linear polarized in the direction orthogonal to the one direction with respect to the red light beam 62 with the wavelength λ2. Further, the beam splitter 16 entirely reflects the blue light beam 61 with the wavelength λ1. Thus, the beam splitter 16 is also an optical path branching element having polarizing ability and wavelength selectivity. By eliminating the dependence on polarization from the beam splitter 16, it is also possible to omit the ¼ wavelength plate 5. A configuration in which the positions of the light beam source 20 and the photodetector 33 are exchanged can be also used.

The operation in the case of recording/reproducing information on/from the optical disk 11 by causing emission of the infrared light beam 63 from the two-wavelength laser beam source 20 is similar to the operation in the case of recording/reproducing information on/from the optical disk 10 by causing emission of the red light beam 62 from the two-wavelength laser beam source 20.

Examples of configurations producing additional effect as the configurations of the entire optical head device will be explained below. The important feature of the present embodiment is the optical element 131 for realizing compatible reproduction or recording on the optical disk 9, optical disk 10, and optical disk 11, or the compound objective lens 13 having combined therein the optical element 131 and the objective lens 14. The constituent components that will be explained in addition to the optical element 131 or the compound objective lens 13 include the below-described contents, the beam splitters, detection lenses, and detection diffraction elements are not mandatory constituent components even among the above-described components, and although the respective effects are demonstrated thereby as the preferred constituent components, other constituent components can be also used as appropriate.

In FIG. 20, the optical head device is further provided with the three-beam grating (diffraction element) 3 between the laser beam source 1 and the beam splitter 4, thereby making it possible to detect tracking signals of the optical disk 9 by the well-known differential push-pull (DPP) method.

The optical head device is further provided with the relay lens 2 between the laser beam source 1 and the beam splitter 4, thereby making it possible to obtain the appropriate light take-in ratio of the blue light beam 61 in the collimator lens 8.

The optical head device is further provided with the three-beam grating (diffraction element) 22 between the two-wavelength laser beam source 20 and the beam splitter 16, thereby making it possible to detect tracking signals of the optical disk 10 by the well-known differential push-pull (DPP) method.

Another effective feature is that by moving the collimator lens 8 in the optical axis direction (left-right direction in FIG. 20) in the optical head device, the parallelism of the light beam can be changed. When the base material has an error of thickness or the optical disk 9 is a dual layer disk, spherical aberration caused by interlayer thickness occurs, but this spherical aberration can be corrected by moving the collimator lens 8 in the optical axis direction as mentioned hereinabove.

By so moving the collimator lens 8, it is possible to correct the spherical aberration of about several hundreds of $m\lambda$ when the numerical aperture of the condensed light beam with respect to the optical disk is 0.85, and a base material thickness error of ±30 μm can be also corrected. Further, when information is recorded/reproduced on/from the optical disk 11 by using the infrared light beam 63, by moving the collimator lens 8 to the left side in FIG. 20, that is, toward the two-wavelength laser beam source 20, the infrared light beam 63 directed toward the objective lens 14 is made a divergent light beam. As a result, it is also possible to withdraw the condensing spot on the optical disk 11 further from the objective lens 14, correct part of the aberration caused by the base material thickness, reduce the aberration correction amount required for the optical element 131, enlarge the diffraction structure pitch, and facilitate the fabrication of the optical element 131.

Further, it is also possible to cause the transmission of part (for example, about 10%) of the linear polarized blue light beam that has been emitted from the laser beam source 1 and fallen on the beam splitter 4 and introduce the transmitted blue light beam to the photodetector 7 by the condensing lens 6. The variation in quantity of light emitted from the laser beam source 1 can be monitored using signals obtained from the photodetector 7, and the quantity of light emitted from the laser beam source 1 can be controlled to a constant value by feedback of the monitored variation in quantity of emitted light.

Further, it is also possible to cause the reflection of part (for example, about 10%) of the linear polarized light beam that has been emitted from the two-wavelength laser beam source 20 and fallen on the beam splitter 4 and introduce the reflected light beam to the photodetector 7 by the condensing lens 6. The variation in quantity of light emitted from the two-wavelength laser beam source 20 can be monitored using signals obtained from the photodetector 7, and the quantity of light emitted from the two-wavelength laser beam source 20 can be controlled to a constant value by feedback of the monitored variation in quantity of emitted light.

Embodiment 7

Figure 21:
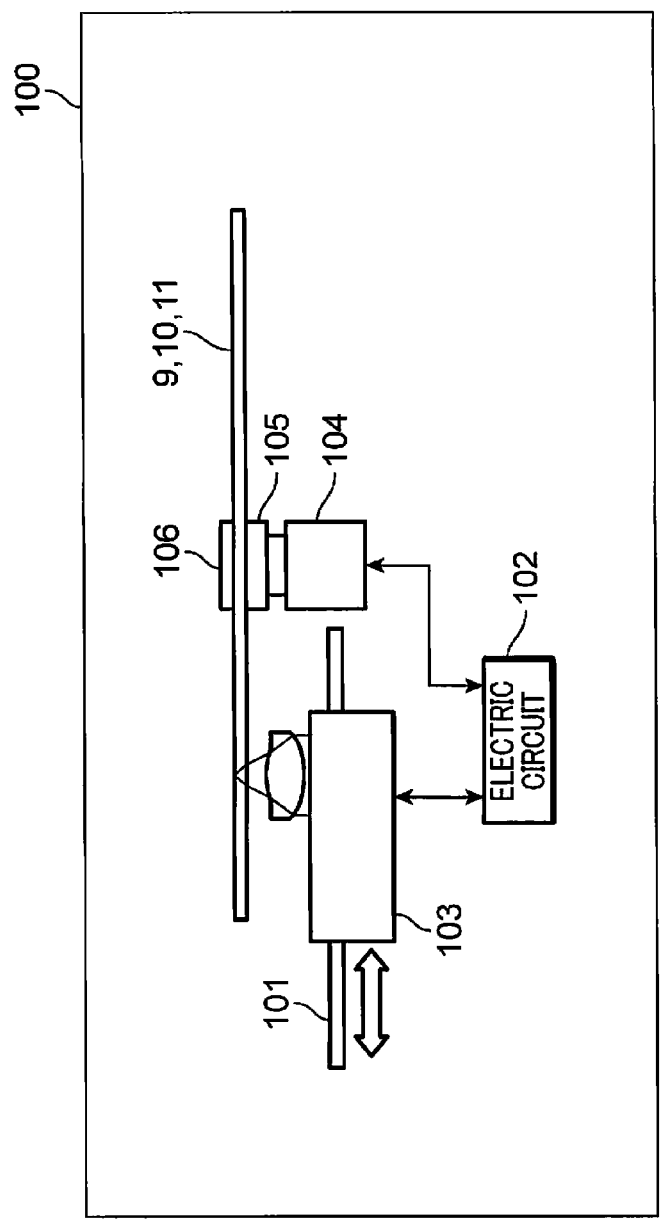
FIG. 21 shows a conceptual configuration of the optical information device in Embodiment 7 of the present invention.

An optical information device provided with the optical head device according to Embodiment 6 of the present invention will be explained below. FIG. 21 shows a schematic configuration of the optical information device in Embodiment 7 of the present invention. An optical information device 100 is provided with a drive device 101, an electric circuit 102, an optical head device 103, and a motor 104.

In FIG. 21, the optical disk 9 (or the optical disk 10 or the optical disk 11) is placed on a turntable 105, fixed between the turntable 105 and a clamper 106, and rotated by the motor 104. The optical head device 103 is the optical head device explained in Embodiment 6. The drive device 101 coarsely move the optical head device 103 to the track of the optical disk 9 where the desired information is present.

The optical head device 103 sends a focus error signal or a tracking error signal to the electric circuit 102 correspondingly to the positional relationship of the optical head device 103 and the optical disk 9. In response to the focus error signal or tracking error signal, the electric circuit 102 sends to the optical head device 103 an objective lens drive signal for finely moving the objective lens. The optical head device 103 performs focus control or tracking control of the optical disk 9 on the basis of the objective lens drive signal and reads information from the optical disk 9 or writes (records) information to the optical disk 9 or deletes information from the optical disk 9.

An optical information device 100 according to the Embodiment 7 is provided with the optical head device 103 described above in Embodiment 6. The resultant effect is that small, inexpensive, and lightweight optical head device that is constituted by a small number of parts makes it possible to adapt the optical information device to a plurality of optical disks with different recording densities.

Embodiment 8

Embodiment 8 relates to a computer equipped with the optical information device 100 described in Embodiment 7.

A computer equipped with the optical information device according to the above-described Embodiment 7 or using the above-described recording or reproduction method can record/reproduce information with good stability on/from optical disks of various types and therefore has a wide application range.

Figure 22:
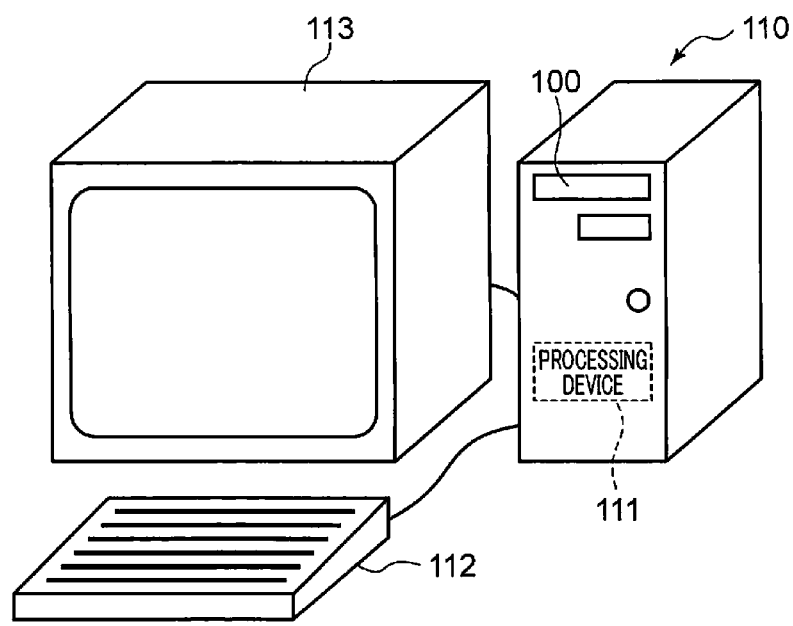
FIG. 22 shows a conceptual configuration of the computer in Embodiment 8 of the present invention.

FIG. 22 shows a schematic configuration of the computer according to Embodiment 8 of the present invention. In FIG. 22, a computer 110 is provided with the optical information device 100 according to Embodiment 7, an input device 112 for inputting information, such as a keyboard, a mouse, or a touch panel, a processing device 111 such as a central Processing unit (CPU) that performs processing on the basis of information inputted form the input device 112 or information read from the optical information device 100, and an output device 113 such as a display device such as a CRT (Cathode Ray Tube) monitor or a liquid crystal display device for displaying information such as the processing results obtained in the processing unit 111 or a printer for printing the information. The processing device 111 processes information recorded in the optical information device 100 and/or information reproduced from the optical information device 100.

In Embodiment 8, the computer 110 corresponds to an example of the information processing device, and the processing device 111 corresponds to an example of the information processing unit.

Embodiment 9

Embodiment 9 relates to an optical disk player equipped with the optical information device according to Embodiment 7.

An optical disk player equipped with the optical information device according to the above-described Embodiment 7 or using the above-described recording or reproduction method can record/reproduce information with good stability on/from optical disks of various types and therefore has a wide application range.

Figure 23:
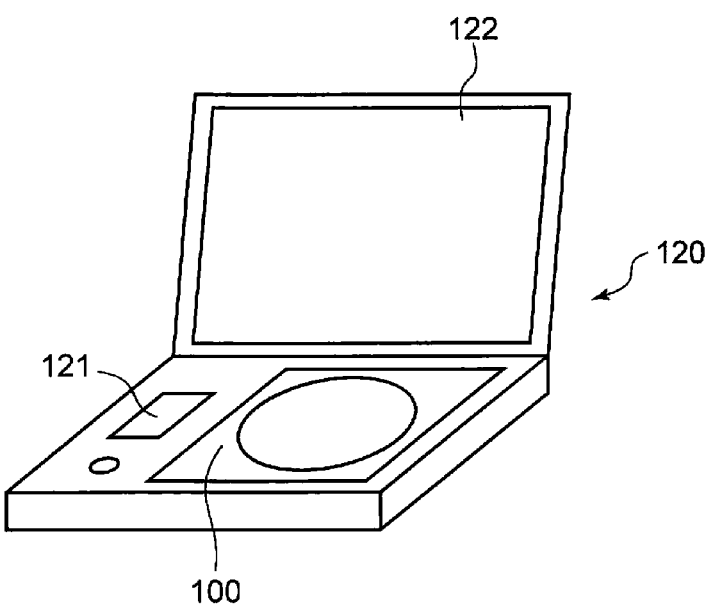
FIG. 23 shows a conceptual configuration of the optical disk player in Embodiment 9 of the present invention.

FIG. 23 shows a schematic configuration of the optical disk player according to Embodiment 9 of the present invention. In FIG. 23, an optical disk player 120 is provided with the optical information device 100 according to Embodiment 7 and a decoder 121 that converts information signals obtained from the optical information device 100 into image information. The decoder 121 processes the information recorded in the optical information device 100 and/or information reproduced from the optical information device 100. The optical disk player 120 of the present configuration can be also used as a car navigation system by combining the optical disk player with a GPS (Global Positioning System). The optical disk player 120 can be also used in a configuration additionally including a display device 122 for displaying information, such as a liquid crystal display device.

In Embodiment 9, the optical disk player 120 corresponds to an example of the information processing device, and the decoder 121 corresponds to an example of the information processing unit.

Embodiment 10

Embodiment 10 relates to an optical disk recorder equipped with the optical information device according to Embodiment 7.

An optical disk recorder equipped with the optical information device according to the above-described Embodiment 7 or using the above-described recording or reproduction method can record/reproduce information with good stability on/from optical disks of various types and therefore has a wide application range.

Figure 24:
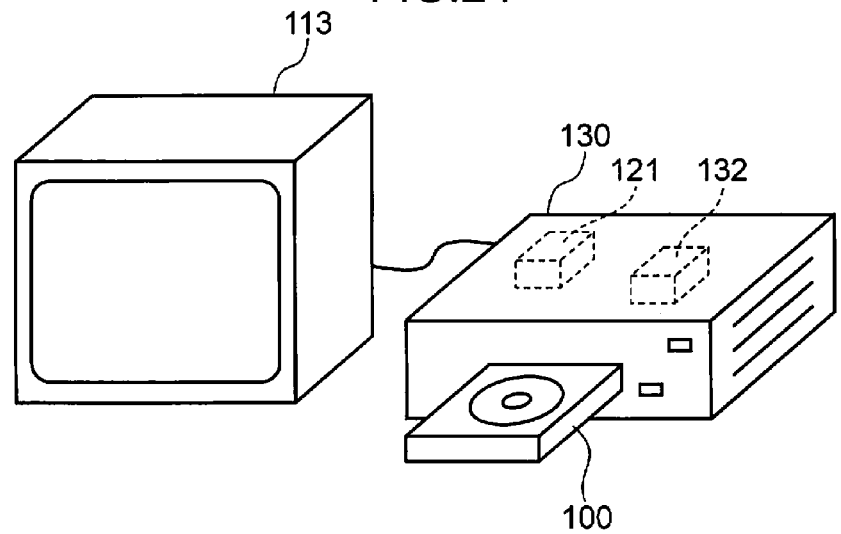
FIG. 24 shows a conceptual configuration of the optical disk recorder in Embodiment 10 of the present invention.

The optical disk recorder according to Embodiment 10 will be explained below with reference to FIG. 24. FIG. 24 shows a schematic configuration of the optical disk recorder according to Embodiment 10 of the present invention. In FIG. 24, an optical disk recorder 130 is provided with the optical information device 100 according to Embodiment 7 and an encoder 132 that converts into image information into information signals that are recorded by the optical information device 100 on an optical disk. The encoder 132 processes information recorded on the optical information device 100 and/or information reproduced from the optical information device 100.

The optical disk recorder 130 preferably includes the decoder 121 for converting the information signals obtained from the optical information device 100 into image information. With such a configuration, information that has already been recorded on the optical disk can be also reproduced. Further, the optical disk recorder 130 may be provided with an output device 113 such as a display device such as a PDP (plasma display panel) or a liquid crystal display device for displaying information or a printer for printing the information.

In Embodiment 10, the optical disk recorder 130 corresponds to an example of the information processing device, and the encoder 132 corresponds to an example of the information processing unit.

Embodiment 11

Embodiment 11 relates to an optical disk server equipped with the optical information device according to Embodiment 7.

Figure 25:
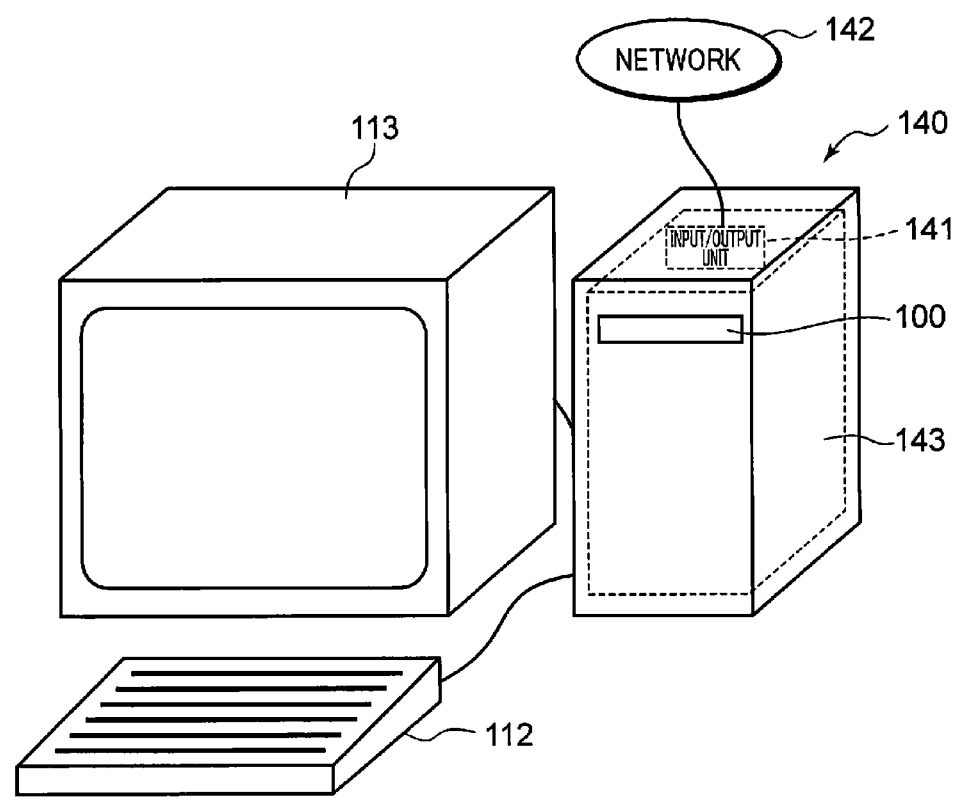
FIG. 25 shows a conceptual configuration of the optical disk server in Embodiment 11 of the present invention.

The optical disk server according to Embodiment 11 will be explained below with reference to FIG. 25. FIG. 25 shows a schematic configuration of the optical disk server according to Embodiment 11 of the present invention. In FIG. 25, an optical disk server 140 is provided with the optical information device 100 according to Embodiment 7 and an input/output unit 141 that inputs/outputs information recorded or reproduced by the optical information device 100 from/to the outside.

The optical information device 100 is the optical information device described in Embodiment 7. The input/output unit 141 takes in information recorded on the optical information device 100 from the outside and outputs information read from the optical information device 100 to the outside. The input/output unit 141 processes information recorded on the optical information device 100 and/or information reproduced from the optical information device 100. The input/output unit 141 is connected by wire or in a wireless manner to a network 142. The input/output unit 141 exchanges via the network 142 information with a plurality of devices, for example, a computer, a telephone, and a television tuner. As a result, the optical disk server 140 can be used as an information server shared by the plurality of devices.

The optical disk server 140 can record/reproduce information with good stability on/from optical disks of various types and therefore has a wide application range. Further, the optical disk server 140 may be also provided with a output device 113 such as a display device such as a PDP or a liquid crystal display device for displaying information or a printer for printing information. The optical disk server 140 may be also provided with the input device 112 for inputting information, such as a keyboard, a mouse, and a touch panel.

The optical disk server 140 may be also provided with a changer 143 for setting a plurality of optical disks into the optical information device 100 and taking the disks therefrom. As a result, a larger volume of information can be recorded and stored.

In Embodiment 11, the optical disk server 140 corresponds to an example of the information processing device, and the input/output unit 141 corresponds to an example of the information processing unit.

In Embodiments 8 to 11 described hereinabove, the output device 113 and the display device 122 are shown in FIGS. 22 to 25, but it goes without saying that the computer 110, optical disk player 120, optical disk recorder 130, and optical disk server 140 can be obtained in commercially available configurations provided with respective output terminals and having no output device 113 or display device 122. Further, although no input device is shown in FIGS. 23 and 24, the optical disk player 120 and the optical disk recorder 130 may be provided with an input device for inputting information, such as a keyboard, a mouse, a touch panel, or a remote controller. Conversely, in the above-described Embodiments 8 to 11, the computer 110, optical disk player 120, optical disk recorder 130, and optical disk server 140 can be configured to have no input device and include only input terminals.

Embodiment 12

Embodiment 12 relates to a vehicle equipped with the optical information device according to Embodiment 7.

Figure 26:
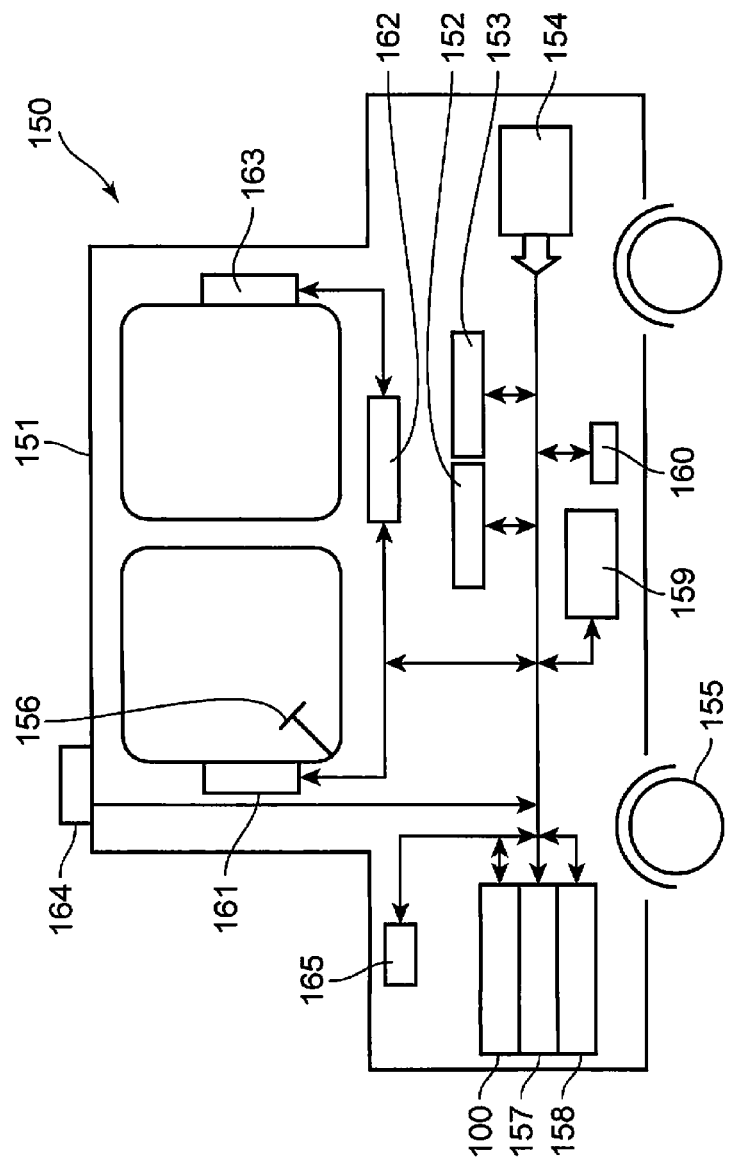
FIG. 26 shows a conceptual configuration of the vehicle in Embodiment 12 of the present invention.
Figure 27:
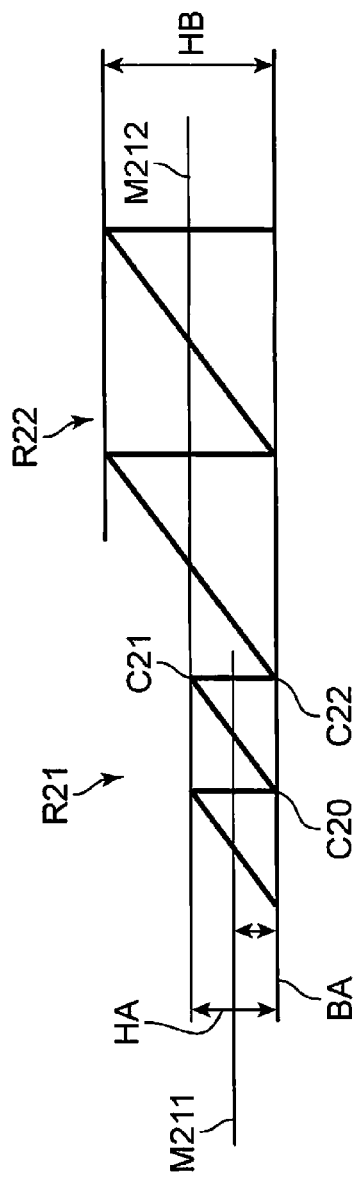
FIG. 27 shows part of the conventional objective lens.

The vehicle according to Embodiment 12 will be explained below with reference to FIG. 26. FIG. 26 shows a schematic configuration of the vehicle according to Embodiment 12 of the present invention. In FIG. 26, a vehicle 150 is provided with the optical information device 100, a vehicle body 151, a power generating unit 152, a fuel storage unit 153, an electric power source 154, wheels 155, a steering wheel 156, a changer 157, an optical disk accommodation unit 158, a processing unit 159, a semiconductor memory 160, a display device 161, an amplifier 162, a speaker 163, a position sensor 164, and a wireless communication unit 165.

The optical information device 100 is an optical information device described in Embodiment 7. The vehicle body 151 carries the optical information device 100. The power generating unit 152 generates power for moving the vehicle body 151. The fuel storage unit 153 stores fuel supplied to the power generating unit 152. The electric power source 154 supplies electric power to various units in the vehicle body 151. By installing the optical information device 100 according to Embodiment 7 on the vehicle body 151, it is possible to record/reproduce information with good stability on/from optical disks of various types even when the vehicle moves. When the vehicle 150 is a electric train or an automobile, the vehicle 150 is further provided with wheels 155 for traveling. Where the vehicle 150 is an automobile, the vehicle 150 is further provided with the steering wheel 156 for changing the travel direction.

By providing the vehicle 150 with the changer 157 and the optical disk accommodation unit 158, it is possible to use easily a large number of optical disks. Further, since the vehicle 150 is provided with the processing device 159 that can process information obtained from the optical disks into images, the semiconductor member 160 that stores temporarily the information, and the display device 161 for displaying the information, it is possible to reproduce video information from the optical disks. The processing device 159 processes information recorded on the optical information device 100 and/or information reproduced from the optical information device 100. By providing the vehicle 150 with the amplifier 162 and the speaker 163, it is possible to reproduce voice of music from the optical disks.

Further, by providing the vehicle 150 with the position sensor 164 such as a GPS, it is possible to display the present position or traveling direction, together with the map information reproduced from the optical disk, on the display device 161 and output the present position or traveling direction by a voice from the speaker 163. By providing the vehicle 150 with the wireless communication unit 165, it is possible to acquire information from the outside via the wireless communication unit 165 and complementary use the information acquired from the outside and the information reproduced from the optical disk.

In Embodiment 12, the vehicle 150 corresponds to an example of the information processing device, and the processing device 159 corresponds to an example of the information processing unit.

The above-described specific embodiments mainly include the invention having the following features.

A compound objective lens according to one aspect of the present invention includes: an optical element having a diffraction structure; and a refractive lens, wherein the diffraction structure includes a first region, a second region, and a first boundary band provided between the first region and the second region; a diffraction structure having a sawtooth or stepwise cross section is formed in the first region and the second region; a height of the sawtooth or stepwise cross section formed in the first region provides a light beam, which has a predetermined wavelength, with a difference in optical path length of N times the predetermined wavelength, as compared with a case of transmission in air; a height of the sawtooth or stepwise cross section formed in the second region provides the light beam, which has the predetermined wavelength, with a difference in optical path length of J times the predetermined wavelength, as compared with a case of transmission in air; at least one of a difference in height between both ends of the first boundary band and a width of the first boundary band provides the light beam, which has the predetermined wavelength, with a difference in optical path length of (N+J)/2 times (N and J are mutually different natural numbers) the predetermined wavelength, as compared with a case of transmission in air.

With such a configuration, the compound objective lens is provided with the optical element having a diffraction structure and the refractive lens. The diffraction structure includes the first region, the second region, and the first boundary band provided between the first region and the second region. The diffraction structure having a sawtooth or stepwise cross section is formed in the first region and the second region. The height of the sawtooth or stepwise cross section formed in the first region provides the light beam having the predetermined wavelength with a difference in optical path length of N times the predetermined wavelength, as compared with a case of transmission in air. The height of the sawtooth or stepwise cross section formed in the second region provides the light beam having the predetermined wavelength with a difference in optical path length of J times the predetermined wavelength, as compared with a case of transmission in air. At least either of the difference in height between both ends of the first boundary band and the width of the first boundary band provides the light beam having the predetermined wavelength with a difference in optical path length of (N+J)/2 times (N and J are mutually different natural numbers) the predetermined wavelength, as compared with a case of transmission in air. Each of the difference in optical path length of N times the predetermined wavelength, the difference in optical path length of J times the predetermined wavelength, and the difference in optical path length of (N+J)/2 times the predetermined wavelength includes fluctuations of about 10%.

Therefore, the light beam with the predetermined wavelength is provided with a difference in optical path length of (N+J)/2 times (N and J are mutually different natural numbers) the predetermined wavelength, as compared with a case of transmission in air, by at least either of the difference in height between both ends of the first boundary band provided between the first region and the second region and the width of the first boundary band. Therefore, phase shift can be avoided and the occurrence of aberration can be inhibited even when the light beam source wavelength shifts from the designed value.

The abovementioned compound objective lens preferably has a configuration in which the light beam with the predetermined wavelength is a blue light beam having a wavelength $\lambda 1$; the first region is formed on an outer circumferential side of the second region; a height of the sawtooth cross-section formed in the second region provides the blue light beam, which has the wavelength $\lambda 1$, with a difference in optical path length that is twice the wavelength $\lambda 1$, as compared with a case of transmission in air; a height of the sawtooth cross-section formed in the first region provides the blue light beam, which has the wavelength $\lambda 1$, with a difference in optical path length of N times (N is a natural number other than 2) the wavelength as compared with a case of transmission in air; at least one of a difference in height between both ends of the first boundary band and a width of the first boundary band provides the blue light beam having the wavelength $\lambda 1$ with a difference in optical path length of (N+2)/2 times the wavelength $\lambda 1$, as compared with a case of transmission in air; in the first region, a 1st-order diffracted light beam is generated most strongly with respect to a red light beam having a wavelength $\lambda 2$ and a 2nd-order diffracted light beam is generated most strongly with respect to the blue light beam having the wavelength $\lambda 1$; the 2nd-order diffracted light beam of the blue light beam generated from the second region and the Nth-order diffracted light beam of the blue light beam generated from the first region are condensed via a transparent base material with a thickness t1; and the 1st-order diffracted light beam of the red light beam generated from the second region is condensed via a transparent base material with a thickness t2 that is larger than the thickness t1.

With such a configuration, the first region is formed on the outer circumferential side of the second region. The height of the sawtooth cross-section formed in the second region provides the blue light beam having the wavelength $\lambda 1$ with a difference in optical path length that is twice the wavelength $\lambda 1$, as compared with a case of transmission in air. The height of the sawtooth cross-section formed in the first region provides the blue light beam having the wavelength $\lambda 1$ with a difference in optical path length of N times (N is a natural number other than 2) the wavelength $\lambda 1$, as compared with a case of transmission in air. At least either of the difference in height between both ends of the first boundary band and the width of the first boundary band provides the blue light beam having the wavelength $\lambda 1$ with a difference in optical path length of (N+2)/2 times the wavelength as compared with a case of transmission in air. Further, in the first region, the 1st-order diffracted light beam is generated most strongly with respect to the red light beam having the wavelength $\lambda 2$ and the 2nd-order diffracted light beam is generated most strongly with respect to the blue light beam having the wavelength $\lambda 1$. The 2nd-order diffracted light beam of the blue light beam generated from the second region and the Nth-order diffracted light beam of the blue light beam generated from the first region are condensed via the transparent base material with the thickness t1. The 1st-order diffracted light beam of the red light beam generated from the second region is condensed via the transparent base material with the thickness t2 that is larger than the thickness t1. Each of the difference in optical path length that is twice the wavelength of the blue light beam, the difference in optical path length of N times and the difference in optical path length of (N+2)/2 times the wavelength of the blue light beam includes fluctuations of about 10%.

Therefore, the 2nd-order diffracted light beam of the blue light beam generated from the second region and the Nth-order diffracted light beam of the blue light beam generated from the first region can be condensed on the information recording surface via a transparent base material with a thickness t1. The 1st-order diffracted light beam of the red light beam generated from the second region can be condensed on the information recording surface through via the transparent base material with the thickness t2 that is larger than the thickness t1.

The abovementioned compound objective lens preferably has a configuration in which the diffraction structure further includes a third region formed on the inside of the second region and a second boundary band provided between the second region and the third region; a diffraction structure having a stepwise cross section with (N2−1) steps and N2 levels (N2 is a positive even number) is formed in the third region; a diffraction structure having a stepwise cross section with (M2−1) steps and M2 levels (M2 is a positive even number different from N2 and less than N2) is formed in the second region; and a diffraction structure having a stepwise cross section with (N2+M2)/2 levels is formed in the second boundary band, with average levels of the third region and the second region being matched.

With such a configuration, the diffraction structure further includes the third region formed on the inside of the second region and the second boundary band provided between the second region and the third region. The diffraction structure having the stepwise cross section with (N2−1) steps and N2 levels (N2 is a positive even number) is formed in the third region. The diffraction structure having the stepwise cross section with (M2−1) steps and M2 levels (M2 is a positive even number different from N2 and preferably less than N2) is formed in the second region. The diffraction structure having the stepwise cross section with (N2+M2)/2 levels is formed in the second boundary band in order to match average levels of the third region and the second region.

Therefore, phases of the third region and second region can be matched by the second boundary band provided between the third region and the second region.

The abovementioned compound objective lens preferably has a configuration in which a diffraction structure having a stepwise cross section with 7 steps and 8 levels is formed in the third region; a diffraction structure having a stepwise cross section with 3 steps and 4 levels is formed in the second region; a height da of one step in each of steps of the third region and the second region provides the blue light beam, which has the wavelength $\lambda 1$, with a difference in optical path length of 1.25 wavelength and provides the red light beam, which has the wavelength $\lambda 2$, with a difference in optical path length of 0.75 wavelength; when the 8 levels in the stepwise cross section with 7 steps and 8 levels that is formed in the third region are defined as levels 0, 1, 2, 3, 4, 5, 6, 7 in ascending order from the lower side to the higher side, the 4 levels of the stepwise cross section with 3 steps and 4 levels that is formed in the second region are set to the same height as the levels 2, 3, 4, 5 of the third region; in the third region, a 2nd-order diffracted light beam is generated most strongly with respect to the blue light beam having the wavelength $\lambda 1$ and a −2nd-order diffracted light beam is generated most strongly with respect to the red light beam having the wavelength λ2; in the second region, a 1st-order diffracted light beam is generated most strongly with respect to the blue light beam having the wavelength λ1 and a −1st-order diffracted light beam is generated most strongly with respect to the red light beam having the wavelength λ2; the 2nd-order diffracted light beam of the blue light beam generated from the third region and the 1st-order diffracted light beam of the blue light beam generated from the second region are condensed via the transparent base material with the thickness t1; the −2nd-order diffracted light beam of the red light beam generated from the third region and the −1st-order diffracted light beam of the red light beam generated from the second region are condensed via the transparent base material with the thickness t2 that is larger than the thickness t1; and a −3rd-order diffracted light beam of the infrared light beam generated from the third region is condensed via a transparent base material with a thickness t3 that is larger than the thickness t2.

With such a configuration, the diffraction structure having the stepwise cross section with 7 steps and 8 levels is formed in the third region. The diffraction structure having the stepwise cross section with 3 steps and 4 levels is formed in the second region. The height da of one step in each of steps of the third region and the second region provides the blue light beam having the wavelength λ1 with a difference in optical path length of 1.25 wavelength and provides the red light beam having the wavelength λ2 with a difference in optical path length of 0.75 wavelength. When the 8 levels in the stepwise cross section with 7 steps and 8 levels that is formed in the third region are defined as levels 0, 1, 2, 3, 4, 5, 6, 7 in ascending order from the lower side to the higher side, the 4 levels of the stepwise cross section with 3 steps and 4 levels that is formed in the second region are set to the same height as the levels 2, 3, 4, 5 of the third region. In the third region, the 2nd-order diffracted light beam is generated most strongly with respect to the blue light beam having the wavelength λ1 and the −2nd-order diffracted light beam is generated most strongly with respect to the red light beam having the wavelength λ2. In the second region, the 1st-order diffracted light beam is generated most strongly with respect to the blue light beam having the wavelength λ1 and the −1st-order diffracted light beam is generated most strongly with respect to the red light beam having the wavelength λ2. The 2nd-order diffracted light beam of the blue light beam generated from the third region and the 1st-order diffracted light beam of the blue light beam generated from the second region are condensed via the transparent base material with the thickness t1. The −2nd-order diffracted light beam of the red light beam generated from the third region and the −1st-order diffracted light beam of the red light beam generated from the second region are condensed via the transparent base material with the thickness t2 that is larger than the thickness t1. The −3rd-order diffracted light beam of the infrared light beam generated from the third region is condensed via the transparent base material with the thickness t3 that is larger than the thickness t2. Each of the difference in optical path length of 1.25 wavelength and the difference in optical path length of 0.75 wavelength includes fluctuations of about 10%.

Therefore, the 2nd-order diffracted light beam of the blue light beam generated from the third region and the 1st-order diffracted light beam of the blue light beam generated from the second region can be condensed on the information recording surface via the transparent base material with the thickness t1, the −2nd-order diffracted light beam of the red light beam generated from the third region and the −1st-order diffracted light beam of the red light beam generated from the second region can be condensed on the information recording surface via the transparent base material with the thickness t2 that is larger than the thickness t1, and the −3rd-order diffracted light beam of the infrared light beam generated from the third region can be condensed on the information recording surface via the transparent base material with the thickness t3 that is larger than the thickness t2.

The abovementioned compound objective lens preferably has a configuration in which a diffraction structure having a stepwise cross section with levels identical to the levels 0, 1, 2, 3, 4, 5 of the third region is formed in the second boundary band.

With such a configuration, since the diffraction structure having the stepwise cross section with levels identical to the levels 0, 1, 2, 3, 4, 5 of the third region is formed in the second boundary band, phases of the third region and the second region can be matched.

The abovementioned compound objective lens preferably has a configuration in which a diffraction structure having a sawtooth cross section or a stepwise cross section that approximates the sawtooth cross section is formed in the first region; a height ds of one step of the steps in the first region provides the blue light beam, which has the wavelength λ1, with a difference in optical path length of less than 0.5 wavelength; a height of the sawtooth cross section or the stepwise cross section that approximates the sawtooth cross section that is formed in the first region provides the blue light beam, which has the wavelength λ1, with a difference in optical path length of N times (N is a natural numbers) the wavelength λ1, as compared with a case of transmission in air; at least one of a slope having a width of N/2 period and a slope having a difference in height providing the blue light beam, which has the wavelength λ1, with a difference in optical path length of N/2 wavelength is formed in the first boundary band from an intermediate height of the uppermost level and lowermost level of the second region toward a sawtooth sloping direction in the first region at an end of one period of the diffraction structure having a stepwise cross section and formed in the second region; the 2nd-order diffracted light beam of the blue light beam generated from the third region, the 1st-order diffracted light beam of the blue light beam generated from the second region, and the Nth-order diffracted light beam of the blue light beam generated from the first region are condensed via the transparent base material with the thickness t1; the −2nd-order diffracted light beam of the red light beam generated from the third region and the −1st-order diffracted light beam of the red light beam generated from the second region are condensed via the transparent base material with the thickness t2 that is larger than the thickness t1; and the −3rd-order diffracted light beam of the infrared light beam generated from the third region is condensed via the transparent base material with the thickness t3 that is larger than the thickness t2.

With such a configuration, the diffraction structure having the sawtooth cross section or the stepwise cross section that approximates the sawtooth cross section is formed in the first region. The height ds of one step of the steps in the first region provides the blue light beam having the wavelength λ1 with a difference in optical path length of less than 0.5 wavelength. The height of the sawtooth cross section or the stepwise cross section that approximates the sawtooth cross section that is formed in the first region provides the blue light beam having the wavelength λ1 with a difference in optical path length of N times (N is a natural numbers) the wavelength λ1, as compared with a case of transmission in air. At least either of the slope having the width of N/2 period and the slope having the difference in height providing the blue light beam having the wavelength λ1 with a difference in optical path length of N/2 wavelength is formed in the first boundary band from an intermediate height of the uppermost level and lowermost level of the second region toward the sawtooth sloping direction in the first region at an end of one period of the diffraction structure having the stepwise cross section and formed in the second region. The 2nd-order diffracted light beam of the blue light beam generated from the third region, the 1st-order diffracted light beam of the blue light beam generated from the second region, and the Nth-order diffracted light beam of the blue light beam generated from the first region are condensed via the transparent base material with the thickness t1. The −2nd-order diffracted light beam of the red light beam generated from the third region and the −1st-order diffracted light beam of the red light beam generated from the second region are condensed via the transparent base material with the thickness t2 that is larger than the thickness t1. The −3rd-order diffracted light beam of the infrared light beam generated from the third region is condensed via the transparent base material with the thickness t3 that is larger than the thickness t2. The difference in optical path length of N times the wavelength includes fluctuations of about 10%.

Therefore, the first region diffracts, together with the second region, the blue light beam so as to condense the blue light beam with a large numerical aperture and also diffracts the red light beam in the direction different from that of the diffraction in the second region, and the red light beam falling on the first region is substantially not condensed. Therefore, the red light beam can be condensed with a numerical aperture smaller than that of the blue light beam.

The abovementioned compound objective lens preferably has a configuration in which a focal length of the red light beam is larger than a focal length of the blue light beam; and a focal length of the infrared light beam is larger than the focal length of the red light beam.

With such a configuration, the focal length of the red light beam is larger than the focal length of the blue light beam, and the focal length of the infrared light beam is larger than the focal length of the red light beam. Therefore, the focal position of the red light or infrared light can be moved far from the compound objective lens and focusing can be performed via a thick transparent base material of an optical disk.

The abovementioned compound objective lens preferably has a configuration in which the red light beam and the infrared light beam are subjected to a concave lens action by the diffraction structure.

With such a configuration, since the red light beam and the infrared light beam are subjected to concave lens action by the diffraction structure, the focal length of the red light beam and infrared light beam can be increased.

A compound objective lens according to another aspect of the present invention includes: an optical element having a diffraction structure; and a refractive lens, wherein the diffraction structure includes a first region, a second region, and a first boundary band provided between the first region and the second region; a diffraction structure having a stepwise cross section is formed in the first region; a height da of one step of the steps of the first region provides a blue light beam, which has a wavelength λ1, with a difference in optical path length of 1.25 wavelength and provides a red light beam, which has a wavelength λ2, with a difference in optical path length of 0.75 wavelength; a diffraction structure having a sawtooth cross section or a stepwise cross section that approximates the sawtooth cross section is formed in the second region; a height ds of one step of the steps in the second region provides the blue light beam, which has the wavelength λ1, with a difference in optical path length of less than 0.5 wavelength; a height of the sawtooth cross section or the stepwise cross section that approximates the sawtooth cross section that is formed in the second region provides the blue light beam, which has the wavelength λ1, with a difference in optical path length of N times (N is a natural numbers) the wavelength λ1, as compared with a case of transmission in air; at least one of a slope having a width of N/2 period and a slope having a difference in height providing the blue light beam, which has the wavelength λ1, with a difference in optical path length of N/2 wavelength is formed in the first boundary band from an intermediate height of the uppermost level and lowermost level of the first region toward a sawtooth sloping direction in the second region at an end of one period of the diffraction structure having a stepwise cross section and formed in the first region; in the first region, a 1st-order diffracted light beam is generated most strongly with respect to the blue light beam having the wavelength λ1 and a −1st-order diffracted light beam is generated most strongly with respect to the red light beam having the wavelength λ2; in the second region, an Nth-order diffracted light beam is generated most strongly with respect to the blue light beam having a wavelength λ1; the 1st-order diffracted light beam of the blue light beam generated from the first region and the Nth-order diffracted light beam of the blue light beam generated from the second region are condensed via a transparent base material with a thickness t1; and the −1st-order diffracted light beam of the red light beam generated from the first region is condensed via a transparent base material with a thickness t2 that is larger than the thickness t1.

With such a configuration, the compound objective lens includes the optical element having a diffraction structure and the refractive lens. The diffraction structure includes the first region, the second region, and the first boundary band provided between the first region and the second region. The diffraction structure having the stepwise cross section is formed in the first region. The height da of one step of the steps of the first region provides the blue light beam having the wavelength λ1 with a difference in optical path length of 1.25 wavelength and provides the red light beam having the wavelength λ2 with a difference in optical path length of 0.75 wavelength. The diffraction structure having the sawtooth cross section or the stepwise cross section that approximates the sawtooth cross section is formed in the second region. The height ds of one step of the steps in the second region provides the blue light beam having the wavelength λ1 with a difference in optical path length of less than 0.5 wavelength. The height of the sawtooth cross section or the stepwise cross section that approximates the sawtooth cross section that is formed in the second region provides the blue light beam having the wavelength λ1 with a difference in optical path length of N times (N is a natural numbers) the wavelength λ1, as compared with a case of transmission in air. At least either of the slope having the width of N/2 period and the slope having the difference in height providing the blue light beam having the wavelength λ1 with a difference in optical path length of N/2 wavelength is formed in the first boundary band from an intermediate height of the uppermost level and lowermost level of the first region toward a sawtooth sloping direction in the second region at an end of one period of the diffraction structure having a stepwise cross section and formed in the first region. In the first region, the 1st-order diffracted light beam is generated most strongly with respect to the blue light beam having the wavelength λ1 and the −1st-order diffracted light beam is generated most strongly with respect to the red light beam having the wavelength λ2. In the second region, the Nth-order diffracted light beam is generated most strongly with respect to the blue light beam having the wavelength λ1. The 1st-order diffracted light beam of the blue light beam generated from the first region and the Nth-order diffracted light beam of the blue light beam generated from the second region are condensed via the transparent base material with the thickness t1. The −1st-order diffracted light beam of the red light beam generated from the first region is condensed via the transparent base material with the thickness t2 that is larger than the thickness t1. Each of the difference in optical path length of 1.25 wavelength, the difference in optical path length of 0.75 wavelength, and the difference in optical path length of N times the wavelength includes fluctuations of about 10%.

Therefore, at the end of the first region having a stepwise cross section, the first region is brought close to the phase identical to that at the intermediate height of the uppermost level and lowermost level of the first region, that is, at the average level, and the phase of the first region can be matched with that of the second region. Therefore, phase shift can be avoided and the occurrence of aberration can be inhibited even when the light beam source wavelength shifts from the designed value.

The abovementioned compound objective lens preferably has a configuration in which the N is equal to 3; at least one of a slope having a width of 3/2 period and a slope having a difference in height providing the blue light beam, which has the wavelength $\lambda 1$, with a difference in optical path length of 3/2 wavelength is formed in the first boundary band from an intermediate height of the uppermost level and lowermost level of the first region toward a sawtooth sloping direction in the second region at an end of one period of the diffraction structure having a stepwise cross section and formed in the first region; in the first region, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$; in the second region, a 3rd-order diffracted light beam is generated most strongly with respect to the blue light beam having the wavelength $\lambda 1$; the 1st-order diffracted light beam of the blue light beam generated from the first region and the 3rd-order diffracted light beam of the blue light beam generated from the second region are condensed via the transparent base material with the thickness t1; and the −1st-order diffracted light beam of the red light beam generated from the first region is condensed via the transparent base material with the thickness t2.

With such a configuration, at least either of the slope having a width of 3/2 period and the slope having a difference in height providing the blue light beam having the wavelength $\lambda 1$ with a difference in optical path length of 3/2 wavelength is formed in the first boundary band from the intermediate height of the uppermost level and lowermost level of the first region toward the sawtooth sloping direction in the second region at an end of one period of the diffraction structure having a stepwise cross section and formed in the first region. In the first region, the 1st-order diffracted light beam is generated most strongly with respect to the blue light beam having the wavelength $\lambda 1$ and the −1st-order diffracted light beam is generated most strongly with respect to the red light beam having the wavelength $\lambda 2$. In the second region, the 3rd-order diffracted light beam is generated most strongly with respect to the blue light beam having the wavelength $\lambda 1$. The 1st-order diffracted light beam of the blue light beam generated from the first region and the 3rd-order diffracted light beam of the blue light beam generated from the second region are condensed via the transparent base material with the thickness t1. The −1st-order diffracted light beam of the red light beam generated from the first region is condensed via the transparent base material with the thickness t2.

Therefore, the first region diffracts, together with the second region, the blue light beam so as to condense the blue light beam with a large numerical aperture and also diffracts the red light beam in the direction different from that of the diffraction in the second region, and the red light beam falling on the first region is substantially not condensed. Therefore, the red light beam can be condensed with a numerical aperture larger than that of the blue light beam.

The abovementioned compound objective lens preferably has a configuration in which the diffraction structure further includes a third region formed on the inside of the first region and a second boundary band provided between the first region and the third region; a diffraction structure having a stepwise cross section with (N2−1) steps and N2 levels (N2 is a positive even number) is formed in the third region; a diffraction structure having a stepwise cross section with (M2−1) steps and M2 levels (M2 is a positive even number different from N2 and less than N2) is formed in the first region; and a diffraction structure having a stepwise cross section with (N2+M2)/2 levels is formed in the second boundary band, with average levels of the third region and the first region being matched.

With such a configuration, the diffraction structure further includes the third region formed on the inside of the first region and the second boundary band provided between the first region and the third region. The diffraction structure having a stepwise cross section with (N2−1) steps and N2 levels (N2 is a positive even number) is formed in the third region. The diffraction structure having a stepwise cross section with (M2−1) steps and M2 levels (M2 is a positive even number different from N2 and less than N2) is formed in the first region. The diffraction structure having a stepwise cross section with (N2+M2)/2 levels is formed in the second boundary band in order to match average levels of the third region and the first region.

Therefore, phases of the third region and first region can be matched by the second boundary band provided between the first region and the third region.

The abovementioned compound objective lens preferably has a configuration in which a diffraction structure having a stepwise cross section with 7 steps and 8 levels is formed in the third region; a diffraction structure having a stepwise cross section with 3 steps and 4 levels is formed in the first region; a height da of one step in each of steps of the third region and the first region provides the blue light beam, which has the wavelength $\lambda 1$, with a difference in optical path length of 1.25 wavelength and provides the red light beam, which has the wavelength $\lambda 2$, with a difference in optical path length of 0.75 wavelength; when the 8 levels in the stepwise cross section with 7 steps and 8 levels that is formed in the third region are defined as levels 0, 1, 2, 3, 4, 5, 6, 7 in ascending order from the lower side to the higher side, the 4 levels of the stepwise cross section with 3 steps and 4 levels that is formed in the first region are set to the same height as the levels 2, 3, 4, 5 of the third region; in the third region, a 2nd-order diffracted light beam is generated most strongly with respect to the blue light beam having the wavelength $\lambda 1$ and a −2nd-order diffracted light beam is generated most strongly with respect to the red light beam having the wavelength $\lambda 2$; in the first region, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$; the 2nd-order diffracted light beam generated from the third region and the 1st-order diffracted light beam of the blue light beam generated from the first region are condensed via the transparent base material with the thickness t1; the −2nd-order diffracted light beam of the red light beam generated from the third region and the −1st-order diffracted light beam of the red light beam generated from the first region are condensed via the transparent base material with the thickness t2 that is larger than the thickness t1; and a −3rd-order diffracted light beam of the infrared light beam generated from the third region is condensed via a transparent base material with a thickness t3 that is larger than the thickness t2.

With such a configuration, the diffraction structure having a stepwise cross section with 7 steps and 8 levels is formed in the third region. The diffraction structure having a stepwise cross section with 3 steps and 4 levels is formed in the first region. The height da of one step in each of steps of the third region and the first region provides the blue light beam having the wavelength λ1 with a difference in optical path length of 1.25 wavelength and provides the red light beam having the wavelength λ2 with a difference in optical path length of 0.75 wavelength. When the 8 levels in the stepwise cross section with 7 steps and 8 levels that is formed in the third region are defined as levels 0, 1, 2, 3, 4, 5, 6, 7 in ascending order from the lower side to the higher side, the 4 levels of the stepwise cross section with 3 steps and 4 levels that is formed in the first region are set to the same height as the levels 2, 3, 4, 5 of the third region. In the third region, the 2nd-order diffracted light beam is generated most strongly with respect to the blue light beam having the wavelength λ1 and the −2nd-order diffracted light beam is generated most strongly with respect to the red light beam having the wavelength λ2. In the first region, the 1st-order diffracted light beam is generated most strongly with respect to the blue light beam having the wavelength λ1 and the −1st-order diffracted light beam is generated most strongly with respect to the red light beam having the wavelength λ2. The 2nd-order diffracted light beam of the blue light beam generated from the third region and the 1st-order diffracted light beam of the blue light beam generated from the first region are condensed via the transparent base material with the thickness t1. The −2nd-order diffracted light beam of the red light beam generated from the third region and the −1st-order diffracted light beam of the red light beam generated from the first region are condensed via the transparent base material with the thickness t2 that is larger than the thickness t1. The −3rd-order diffracted light beam of the infrared light beam generated from the third region is condensed via the transparent base material with the thickness t3 that is larger than the thickness t2. Each of the difference in optical path length of 1.25 wavelength and the difference in optical path length of 0.75 wavelength includes fluctuations of about 10%.

Therefore, the 2nd-order diffracted light beam of the blue light beam generated from the third region and the 1st-order diffracted light beam of the blue light beam generated from the first region can be condensed on the information recording surface via the transparent base material with the thickness t1, the −2nd-order diffracted light beam of the red light beam generated from the third region and the −1st-order diffracted light beam of the red light beam generated from the first region can be condensed on the information recording surface via the transparent base material with the thickness t2 that is larger than the thickness t1, and the −3rd-order diffracted light beam of the infrared light beam generated from the third region can be condensed on the information recording surface via the transparent base material with the thickness t3 that is larger than the thickness t2.

The abovementioned compound objective lens preferably has a configuration in which a diffraction structure having a stepwise cross section with levels identical to the levels 0, 1, 2, 3, 4, 5 of the third region is formed in the second boundary band.

With such a configuration, since the diffraction structure having the stepwise cross section with levels identical to the levels 0, 1, 2, 3, 4, 5 of the third region is formed in the second boundary band, phases of the third region and the first region can be matched.

The abovementioned compound objective lens preferably has a configuration in which a diffraction structure having a sawtooth cross section or a stepwise cross section that approximates the sawtooth cross section is formed in the second region; a height ds of one step of the steps in the second region provides the blue light beam, which has the wavelength λ1, with a difference in optical path length of less than 0.5 wavelength; a height of the sawtooth cross section or the stepwise cross section that approximates the sawtooth cross section that is formed in the second region provides the blue light beam, which has the wavelength λ1, with a difference in optical path length of N times (N is a natural numbers) the wavelength λ1, as compared with a case of transmission in air; at least one of a slope having a width of N/2 period and a slope having a difference in height providing the blue light beam, which has the wavelength λ1, with a difference in optical path length of N/2 wavelength is formed in the first boundary band from an intermediate height of the uppermost level and lowermost level of the first region toward a sawtooth sloping direction in the second region at an end of one period of the diffraction structure having a stepwise cross section and formed in the first region; the 2nd-order diffracted light beam of the blue light beam generated from the third region, the 1st-order diffracted light beam of the blue light beam generated from the first region, and the Nth-order diffracted light beam of the blue light beam generated from the second region are condensed via the transparent base material with the thickness t1; the −2nd-order diffracted light beam of the red light beam generated from the third region and the −1st-order diffracted light beam of the red light beam generated from the first region are condensed via the transparent base material with the thickness t2 that is larger than the thickness t1; and the −3rd-order diffracted light beam of the infrared light beam generated from the third region is condensed via the transparent base material with the thickness t3 that is larger than the thickness t2.

With such a configuration, the diffraction structure having a sawtooth cross section or a stepwise cross section that approximates the sawtooth cross section is formed in the second region. The height ds of one step of the steps in the second region provides the blue light beam having the wavelength λ1 with a difference in optical path length of less than 0.5 wavelength. The height of the sawtooth cross section or the stepwise cross section that approximates the sawtooth cross section that is formed in the second region provides the blue light beam having the wavelength λ1 with a difference in optical path length of N times (N is a natural numbers) the wavelength λ1, as compared with a case of transmission in air. At least either of the slope having a width of N/2 period and the slope having a difference in height providing the blue light beam having the wavelength λ1 with a difference in optical path length of N/2 wavelength is formed in the first boundary band from the intermediate height of the uppermost level and lowermost level of the first region toward the sawtooth sloping direction in the second region at an end of one period of the diffraction structure having the stepwise cross section and formed in the first region. The 2nd-order diffracted light beam of the blue light beam generated from the third region, the 1st-order diffracted light beam of the blue light beam generated from the first region, and the Nth-order diffracted light beam of the blue light beam generated from the second region are condensed via the transparent base material with the thickness t1. The −2nd-order diffracted light beam of the red light beam generated from the third region and the −1st-order diffracted light beam of the red light beam generated from the first region are condensed via the transparent base material with the thickness t2 that is larger than the thickness t1. The −3rd-order diffracted light beam of the infrared light beam generated from the third region is condensed via the transparent base material with the thickness t3 that is larger than the thickness t2. The difference in optical path length of N times the wavelength includes fluctuations of about 10%.

Therefore, the second region diffracts, together with the first region, the blue light beam so as to condense the blue light beam with a large numerical aperture and also diffracts the red light beam in the direction different from that of the diffraction in the first region, and the red light beam falling on the second region is substantially not condensed. Therefore, the red light beam can be condensed with a numerical aperture smaller than that of the blue light beam.

A compound objective lens according to yet another aspect of the present invention includes an optical element having a diffraction structure; and a refractive lens, wherein the diffraction structure includes a first region, a second region, and a boundary band provided between the first region and the second region; the first region and the second region each have formed therein any diffraction structure from among a first diffraction structure constituted by steps, such that one step provides a difference in optical path length of equal to or greater than 1 wavelength and equal to or less than 1.5 wavelength, a shape between the uppermost level and the lowermost level thereof having a stepwise cross section with NE steps and (NE+1) levels (NE is a positive even number), a second diffraction structure constituted by steps, such that one step provides a difference in optical path length of equal to or greater than 1 wavelength and equal to or less than 1.5 wavelength, a shape between the uppermost level and the lowermost level thereof having a stepwise cross section with NO steps and (NO+1) levels (NO is a positive odd number), and a third diffraction structure having a sawtooth cross section; mutually different diffraction structures are formed in the first region and the second region; and a point in the center between the uppermost level and the lowermost level of the first diffraction structure is defined as a reference point, a point in the uppermost level or the lowermost level of the second diffraction structure is defined as a reference point, and a point in the center between the uppermost level and the lowermost level of the third diffraction structure is defined as a reference point, and the reference point of the diffraction structure of the first region is matched with the reference point of the diffraction structure of the second region in the boundary band.

With such a configuration, the compound objective lens includes the optical element having a diffraction structure and the refractive lens. The diffraction structure includes the first region, the second region, and the boundary band provided between the first region and the second region. The first region and the second region each have formed therein any diffraction structure from among the first diffraction structure constituted by steps, such that one step provides a difference in optical path length of equal to or greater than 1 wavelength and equal to or less than 1.5 wavelength, a shape between the uppermost level and the lowermost level thereof having a stepwise cross section with NE steps and (NE+1) levels (NE is a positive even number), the second diffraction structure constituted by steps, such that one step provides a difference in optical path length of equal to or greater than 1 wavelength and equal to or less than 1.5 wavelength, a shape between the uppermost level and the lowermost level thereof having a stepwise cross section with NO steps and (NO+1) levels (NO is a positive odd number), and the third diffraction structure having a sawtooth cross section. Mutually different diffraction structures are formed in the first region and the second region. A point in the center between the uppermost level and the lowermost level of the first diffraction structure is taken as a reference point, a point in the uppermost level or the lowermost level of the second diffraction structure is taken as a reference point, and a point in the center between the uppermost level and the lowermost level of the third diffraction structure is taken as a reference point, and the reference point of the diffraction structure of the first region is matched with the reference point of the diffraction structure of the second region in the boundary band.

Therefore, since the reference point of the diffraction structure of the first region is matched with the reference point of the diffraction structure of the second region in the boundary band, phase continuity can be realized between the first region and the second region, phase shift can be avoided and the occurrence of aberration can be inhibited even in the case in which the light beam source wavelength shifts from the designed value.

The abovementioned compound objective lens preferably has a configuration in which the first diffraction structure having a stepwise cross section with 6 steps and 7 levels is formed in the first region; the second diffraction structure having a stepwise cross section with 3 steps and 4 levels is formed in the second region; a height da of one step of the steps of the first diffraction structure and the second diffraction structure provides the blue light beam, which has the wavelength $\lambda 1$, with a difference in optical path length of 1.14 wavelength and provides the red light beam, which has the wavelength $\lambda 2$, with a difference in optical path length of 0.7 wavelength; the boundary band has a step of 0.5 period of the first region; in the first region, a 1st-order diffracted light beam is generated most strongly with respect to the blue light beam having the wavelength $\lambda 1$ and a −2nd-order diffracted light beam is generated most strongly with respect to the red light beam having the wavelength $\lambda 2$; in the second region, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$; the 2nd-order diffracted light beam of the blue light beam generated from the first region and the 1st-order diffracted light beam of the blue light beam generated from the second region are condensed via the transparent base material with the thickness t1; the −2nd-order diffracted light beam of the red light beam generated from the first region and the −1st-order diffracted light beam of the red light beam generated from the second region are condensed via the transparent base material with the thickness t2 that is larger than the thickness t1; and a −3rd-order diffracted light beam of the infrared light beam generated from the first region is condensed via a transparent base material with a thickness t3 that is larger than the thickness t2.

With such a configuration, the first diffraction structure having a stepwise cross section with 6 steps and 7 levels is formed in the first region. The second diffraction structure having a stepwise cross section with 3 steps and 4 levels is formed in the second region. The height da of one step of the steps of the first diffraction structure and the second diffraction structure provides the blue light beam having the wavelength $\lambda 1$ with a difference in optical path length of 1.14 wavelength and provides the red light beam having the wavelength λ2 with a difference in optical path length of 0.7 wavelength. The boundary band has a step of 0.5 period of the first region. In the first region, the 1st-order diffracted light beam is generated most strongly with respect to the blue light beam having the wavelength λ1 and the −2nd-order diffracted light beam is generated most strongly with respect to the red light beam having the wavelength λ2. In the second region, the 1st-order diffracted light beam is generated most strongly with respect to the blue light beam having the wavelength λ1 and the −1st-order diffracted light beam is generated most strongly with respect to the red light beam having the wavelength λ2. The 2nd-order diffracted light beam of the blue light beam generated from the first region and the 1st-order diffracted light beam of the blue light beam generated from the second region are condensed via the transparent base material with the thickness t1. The −2nd-order diffracted light beam of the red light beam generated from the first region and the −1st-order diffracted light beam of the red light beam generated from the second region are condensed via the transparent base material with the thickness t2 that is larger than the thickness t1. The −3rd-order diffracted light beam of the infrared light beam generated from the first region is condensed via the transparent base material with the thickness t3 that is larger than the thickness t2. The difference in optical path length of 1.14 wavelength and the difference in optical path length of 0.7 wavelength each includes fluctuations of about 10%.

Therefore, the strongest diffraction of the blue light beam, red light beam, and infrared light beam occurs at respectively different orders and therefore the diffraction directions of the blue light beam, red light beam, and infrared light beam will be significantly different from each other, and by using this difference the beams can be designed to be condensed via different base material thicknesses.

The abovementioned compound objective lens preferably has a configuration in which the first diffraction structure having a stepwise cross section with 6 steps and 7 levels is formed in the first region; the second diffraction structure having a stepwise cross section with 3 steps and 4 levels is formed in the second region; a height da of the first diffraction structure and the second diffraction structure provides the blue light beam, which has the wavelength λ1, with a difference in optical path length of 1.14 wavelength and provides the red light beam, which has the wavelength λ2, with a difference in optical path length of 0.7 wavelength; the boundary band has a step of 0.5 period of the second region; in the first region, a 1st-order diffracted light beam is generated most strongly with respect to the blue light beam having the wavelength λ1 and a −2nd-order diffracted light beam is generated most strongly with respect to the red light beam having the wavelength λ2; in the second region, a 1st-order diffracted light beam is generated most strongly with respect to the blue light beam having the wavelength λ1 and a −1st-order diffracted light beam is generated most strongly with respect to the red light beam having the wavelength λ2; the 2nd-order diffracted light beam of the blue light beam generated from the first region and the 1st-order diffracted light beam of the blue light beam generated from the second region are condensed via the transparent base material with the thickness t1; the −2nd-order diffracted light beam of the red light beam generated from the first region and the −1st-order diffracted light beam of the red light beam generated from the second region are condensed via the transparent base material with the thickness t2 that is larger than the thickness t1; and a −3rd-order diffracted light beam of the infrared light beam generated from the first region is condensed via a transparent base material with a thickness t3 that is larger than the thickness t2.

With such a configuration, the first diffraction structure having a stepwise cross section with 6 steps and 7 levels is formed in the first region. The second diffraction structure having a stepwise cross section with 3 steps and 4 levels is formed in the second region. The height da of the first diffraction structure and the second diffraction structure provides the blue light beam having the wavelength λ1 with a difference in optical path length of 1.14 wavelength and provides the red light beam having the wavelength λ2 with a difference in optical path length of 0.7 wavelength. The boundary band has a step of 0.5 period of the second region. In the first region, the 1st-order diffracted light beam is generated most strongly with respect to the blue light beam having the wavelength λ1 and the −2nd-order diffracted light beam is generated most strongly with respect to the red light beam having the wavelength λ2. In the second region, the 1st-order diffracted light beam is generated most strongly with respect to the blue light beam having the wavelength λ1 and the −1st-order diffracted light beam is generated most strongly with respect to the red light beam having the wavelength λ2. The 2nd-order diffracted light beam of the blue light beam generated from the first region and the 1st-order diffracted light beam of the blue light beam generated from the second region are condensed via the transparent base material with the thickness t1. The −2nd-order diffracted light beam of the red light beam generated from the first region and the −1st-order diffracted light beam of the red light beam generated from the second region are condensed via the transparent base material with the thickness t2 that is larger than the thickness t1. The −3rd-order diffracted light beam of the infrared light beam generated from the first region is condensed via the transparent base material with the thickness t3 that is larger than the thickness t2. The difference in optical path length of 1.14 wavelength and the difference in optical path length of 0.7 wavelength each includes fluctuations of about 10%.

Therefore, the strongest diffraction of the blue light beam, red light beam, and infrared light beam occurs at respectively different orders and therefore the diffraction directions of the blue light beam, red light beam, and infrared light beam will be significantly different from each other, and by using this difference the beams can be designed to be condensed via different base material thicknesses.

The abovementioned compound objective lens preferably has a configuration in which the diffraction structure further includes a third region formed on the outside of the second region; a diffraction structure having a sawtooth cross section or a stepwise cross section that approximates the sawtooth cross section is formed in the third region; a height ds of one step of the steps in the third region provides the blue light beam, which has the wavelength λ1, with a difference in optical path length of less than 0.5 wavelength; a height of the sawtooth cross section or the stepwise cross section that approximates the sawtooth cross section that is formed in the third region provides the blue light beam, which has the wavelength with a difference in optical path length of N times (N is a natural numbers) the wavelength as compared with a case of transmission in air; at least either of a slope having a width of N/2 period and a slope having a difference in height providing the blue light beam, which has the wavelength λ1, with a difference in optical path length of N/2 wavelength is formed from an intermediate height of the uppermost level and lowermost level of the second region toward a sawtooth sloping direction in the third region at an end of one period of the diffraction structure having a stepwise cross section and formed in the second region; the 1st-order diffracted light beam of the blue light beam generated from the first region, the 1st-order diffracted light beam of the blue light beam generated from the second region, and the Nth-order diffracted light beam of the blue light beam generated from the third region are condensed via the transparent base material with the thickness t1; the −2nd-order diffracted light beam of the red light beam generated from the first region and the −1st-order diffracted light beam of the red light beam generated from the second region are condensed via the transparent base material with the thickness t2 that is larger than the thickness t1; and the −3rd-order diffracted light beam of the infrared light beam generated from the first region is condensed via the transparent base material with the thickness t3 that is larger than the thickness t2.

With such a configuration, the diffraction structure further includes the third region formed on the outside of the second region. The diffraction structure having a sawtooth cross section or a stepwise cross section that approximates the sawtooth cross section is formed in the third region. The height ds of one step of the steps in the third region provides the blue light beam having the wavelength λ1 with a difference in optical path length of less than 0.5 wavelength. The height of the sawtooth cross section or the stepwise cross section that approximates the sawtooth cross section that is formed in the third region provides the blue light beam having the wavelength λ1 with a difference in optical path length of N times (N is a natural numbers) the wavelength λ1, as compared with a case of transmission in air. At least either of the slope having a width of N/2 period and the slope having a difference in height providing the blue light beam having the wavelength λ1 with a difference in optical path length of N/2 wavelength is formed from an intermediate height of the uppermost level and lowermost level of the second region toward the sawtooth sloping direction in the third region at an end of one period of the diffraction structure having a stepwise cross section and formed in the second region. The 1st-order diffracted light beam of the blue light beam generated from the first region, the 1st-order diffracted light beam of the blue light beam generated from the second region, and the Nth-order diffracted light beam of the blue light beam generated from the third region are condensed via the transparent base material with the thickness t1. The −2nd-order diffracted light beam of the red light beam generated from the first region and the −1st-order diffracted light beam of the red light beam generated from the second region are condensed via the transparent base material with the thickness t2 that is larger than the thickness t1. The −3rd-order diffracted light beam of the infrared light beam generated from the first region is condensed via the transparent base material with the thickness t3 that is larger than the thickness t2. The difference in optical path length of N times the wavelength includes fluctuations of about 10%.

Therefore, the third region diffracts, together with the second region, the blue light beam so as to condense the blue light beam with a large numerical aperture and also diffracts the red light beam in the direction different from that of the diffraction in the second region, and the red light beam falling on the third region is substantially not condensed. Therefore, the red light beam can be condensed with a numerical aperture smaller than that of the blue light beam.

The abovementioned compound objective lens preferably has a configuration in which the blue light beam is subjected to a concave lens action by the diffraction structure. With such a configuration, since the blue light beam is subjected to concave lens action by the diffraction structure, an axial color aberration can be corrected.

An optical head device according to yet another aspect of the present invention includes a first light beam source emitting a blue light beam having a wavelength λ1; a second light beam source emitting a red light beam having a wavelength λ2; the compound objective lens described in any one of the clauses above that condenses the blue light beam emitted from the first light beam source on a recording surface of an optical disk via a transparent base material with a thickness t1 and also condenses the red light beam emitted from the second light beam source on the recording surface of the optical disk via a transparent base material with a thickness t2 that is larger than the thickness t1; and a photodetector that receives the blue light beam or the red light beam reflected on the recording surface of the optical disk and outputs an electric signal in response to a received light quantity.

With such a configuration, the first light beam source emits a blue light beam having a wavelength λ1. The second light beam source emitting a red light beam having a wavelength λ2. The compound objective lens described in any one of the clauses above condenses the blue light beam emitted from the first light beam source on the recording surface of an optical disk via a transparent base material with a thickness t1 and also condenses the red light beam emitted from the second light beam source on the recording surface of the optical disk via a transparent base material with a thickness t2 that is larger than the thickness t1. The photodetector receives the blue light beam or the red light beam reflected on the recording surface of the optical disk and outputs an electric signal in response to the received light quantity. Therefore, the compound objective lens can be used in an optical head device.

An optical information device according to yet another aspect of the present invention includes the abovementioned optical head device; a motor that rotates an optical disk; and a control unit that controls the motor and the optical head device on the basis of the electric signal obtained from the optical head device. With such a configuration, the abovementioned optical head device can be used in an optical information device.

An information processing device according to yet another aspect of the present invention includes the abovementioned optical information device; and an information processing unit that processes information recorded in the optical information device and/or information reproduced from the optical information device. With such a configuration, the abovementioned optical information device can be used in an information processing device.

An optical element according to yet another aspect of the present invention is an optical element having a diffraction structure, wherein the diffraction structure includes a first region, a second region, and a first boundary band provided between the first region and the second region; a diffraction structure having a sawtooth or stepwise cross section is formed in the first region and the second region; a height of the sawtooth or stepwise cross section formed in the first region provides a light beam having a predetermined wavelength with a difference in optical path length of N times the predetermined wavelength, as compared with a case of transmission in air; a height of the sawtooth or stepwise cross section formed in the second region provides the light beam having the predetermined wavelength with a difference in optical path length of J times the predetermined wavelength, as compared with a case of transmission in air; at least either of a difference in height between both ends of the first boundary band and a width of the first boundary band provides the light beam having the predetermined wavelength with a difference in optical path length of (N+J)/2 times (N and J are mutually different natural numbers) the predetermined wavelength, as compared with a case of transmission in air.

An optical element according to yet another aspect of the present invention is an optical element having a diffraction structure, wherein the diffraction structure includes a first region R1, a second region, and a first boundary band provided between the first region R1 and the second region; a diffraction structure having a stepwise cross section is formed in the first region R1; a height da of one step of the steps of the first region R1 provides a blue light beam having a wavelength λ1 with a difference in optical path length of 1.25 wavelength and provides a red light beam having a wavelength λ2 with a difference in optical path length of 0.75 wavelength; a diffraction structure having a sawtooth cross section or a stepwise cross section that approximates the sawtooth cross section is formed in the second region; a height ds of one step of the steps in the second region provides the blue light beam having the wavelength λ1 with a difference in optical path length of less than 0.5 wavelength; a height of the sawtooth cross section or the stepwise cross section that approximates the sawtooth cross section that is formed in the second region provides the blue light beam having the wavelength λ1 with a difference in optical path length of N times (N is a natural numbers) the wavelength λ1, as compared with a case of transmission in air; at least one of a slope having a width of N/2 period and a slope having a difference in height providing the blue light beam having the wavelength λ1 with a difference in optical path length of N/2 wavelength is formed in the first boundary band from an intermediate height of the uppermost level and lowermost level of the first region R1 toward a sawtooth sloping direction in the second region at an end of one period of the diffraction structure having a stepwise cross section and formed in the first region R1; in the first region R1, a 1st-order diffracted light beam is generated most strongly with respect to the blue light beam having the wavelength λ1 and a −1st-order diffracted light beam is generated most strongly with respect to the red light beam having the wavelength λ2; in the second region, an Nth-order diffracted light beam is generated most strongly with respect to the blue light beam having the wavelength λ1; the 1st-order diffracted light beam of the blue light beam generated from the first region R1 and the Nth-order diffracted light beam of the blue light beam generated from the second region are condensed via a transparent base material with a thickness t1; and the −1st-order diffracted light beam of the red light beam generated from the first region R1 is condensed via a transparent base material with a thickness t2 that is larger than the thickness t1.

An optical element according to yet another aspect of the present invention is an optical element having a diffraction structure, wherein the diffraction structure includes a first region, a second region, and a boundary band provided between the first region and the second region; the first region and the second region each have formed therein any diffraction structure from among a first diffraction structure constituted by steps, such that one step provides a difference in optical path length of equal to or greater than 1 wavelength and equal to or less than 1.5 wavelength, a shape between the uppermost level and the lowermost level thereof having a stepwise cross section with NE steps and (NE+1) levels (NE is a positive even number), a second diffraction structure constituted by steps, such that one step provides a difference in optical path length of equal to or greater than 1 wavelength and equal to or less than 1.5 wavelength, a shape between the uppermost level and the lowermost level thereof having a stepwise cross section with NO steps and (NO+1) levels (NO is a positive odd number), and a third diffraction structure having a sawtooth cross section; mutually different diffraction structures are formed in the first region and the second region; and a point in the center between the uppermost level and the lowermost level of the first diffraction structure is defined as a reference point, a point in the uppermost level or the lowermost level of the second diffraction structure is defined as a reference point, and a point in the center between the uppermost level and the lowermost level of the third diffraction structure is defined as a reference point, and the reference point of the diffraction structure of the first region is matched with the reference point of the diffraction structure of the second region in the boundary band.

Specific embodiments or examples presented in sections relating to modes for carrying out the invention merely clarify the technical contents of the present invention, and the present invention should not be interpreted narrowly as being limited to these specific examples. Thus, a variety of changes can be made without departing from the essence of the invention and scope of the appended claims.

INDUSTRIAL APPLICABILITY

The compound objective lens in accordance with the present invention can inhibit the occurrence of aberration even when the light beam source wavelength shifts from the designed value and is useful as a compound objective lens in which an objective lens is combined with a diffraction structure. Further, the optical head device in accordance with the present invention can record/reproduce information to/from optical disks of a plurality of types that differ in the base material thickness, corresponding wavelength, and recording density. The optical information device using such an optical head device can handle optical disks of a large number of standards such as CD, DVD, and BD. Therefore, the information processing device using such an optical information device can be applied to a variety of systems storing information such as computers, optical disk players, optical disk recorders, car navigation systems, editing systems, optical disk servers, AV components, and vehicles.

The invention claimed is:
1. A compound objective lens comprising:
    an optical element having a diffraction structure; and
    a refractive lens, wherein
    the diffraction structure includes a first region, a second region, and a first boundary band provided between the first region and the second region,
    a diffraction structure having a sawtooth or stepwise cross section is formed in the first region and the second region,
    a height of the sawtooth or stepwise cross section formed in the first region provides a light beam, which has a predetermined wavelength, with a difference in optical path length of N times the predetermined wavelength, as compared with a case of transmission in air;
    a height of the sawtooth or stepwise cross section formed in the second region provides the light beam, which has the predetermined wavelength, with a difference in optical path length of J times the predetermined wavelength, as compared with a case of transmission in air, and
    at least one of a difference in height between both ends of the first boundary band and a width of the first boundary band provides the light beam, which has the predetermined wavelength, with a difference in optical path length of (N+J)/2 times (N and J are mutually different natural numbers) the predetermined wavelength, as compared with a case of transmission in air.

2. The compound objective lens according to claim 1, wherein the light beam with the predetermined wavelength is a blue light beam having a wavelength $\lambda 1$;

the first region is formed on an outer circumferential side of the second region;

a height of the sawtooth cross-section formed in the second region provides the blue light beam, which has the wavelength $\lambda 1$, with a difference in optical path length that is twice the wavelength $\lambda 1$, as compared with a case of transmission in air;

a height of the sawtooth cross-section formed in the first region provides the blue light beam, which has the wavelength $\lambda 1$, with a difference in optical path length of N times (N is a natural number other than 2) the wavelength $\lambda 1$, as compared with a case of transmission in air;

at least one of a difference in height between both ends of the first boundary band and a width of the first boundary band provides the blue light beam, which has the wavelength $\lambda 1$, with a difference in optical path length of (N+2)/2 times the wavelength $\lambda 1$, as compared with a case of transmission in air;

in the first region, a 1st-order diffracted light beam is generated most strongly with respect to a red light beam having a wavelength $\lambda 2$ and a 2nd-order diffracted light beam is generated most strongly with respect to the blue light beam having the wavelength $\lambda 1$;

the 2nd-order diffracted light beam of the blue light beam generated from the second region and the Nth-order diffracted light beam of the blue light beam generated from the first region are condensed via a transparent base material with a thickness t1; and the 1st-order diffracted light beam of the red light beam generated from the second region is condensed via a transparent base material with a thickness t2 that is larger than the thickness t1.

3. The compound objective lens according to claim 1, wherein the diffraction structure further includes a third region formed on the inside of the second region and a second boundary band provided between the second region and the third region;

a diffraction structure having a stepwise cross section with (N2−1) steps and N2 levels (N2 is a positive even number) is formed in the third region;

a diffraction structure having a stepwise cross section with (M2−1) steps and M2 levels (M2 is a positive even number different from N2 and less than N2) is formed in the second region; and a diffraction structure having a stepwise cross section with (N2+M2)/2 levels is formed in the second boundary band, with average levels of the third region and the second region being matched.

4. The compound objective lens according to claim 3, wherein a diffraction structure having a stepwise cross section with 7 steps and 8 levels is formed in the third region;

a diffraction structure having a stepwise cross section with 3 steps and 4 levels is formed in the second region;

a height da of one step of the steps of the third region and the second region provides the blue light beam, which has the wavelength $\lambda 1$, with a difference in optical path length of 1.25 wavelength and provides the red light beam, which has the wavelength $\lambda 2$, with a difference in optical path length of 0.75 wavelength;

when the 8 levels in the stepwise cross section with 7 steps and 8 levels that is formed in the third region are defined as levels 0, 1, 2, 3, 4, 5, 6, 7 in ascending order from the lower side to the higher side, the 4 levels of the stepwise cross section with 3 steps and 4 levels that is formed in the second region are set to the same height as the levels 2, 3, 4, 5 of the third region;

in the third region, a 2nd-order diffracted light beam is generated most strongly with respect to the blue light beam having the wavelength $\lambda 1$ and a −2nd-order diffracted light beam is generated most strongly with respect to the red light beam having the wavelength $\lambda 2$;

in the second region, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$;

the 2nd-order diffracted light beam of the blue light beam generated from the third region and the 1st-order diffracted light beam of the blue light beam generated from the second region are condensed via the transparent base material with the thickness t1;

the −2nd-order diffracted light beam of the red light beam generated from the third region and the −1st-order diffracted light beam of the red light beam generated from the second region are condensed via the transparent base material with the thickness t2 that is larger than the thickness t1; and a −3rd-order diffracted light beam of the infrared light beam generated from the third region is condensed via a transparent base material with a thickness t3 that is larger than the thickness t2.

5. The compound objective lens according to claim 4, wherein a diffraction structure having a stepwise cross section with levels identical to the levels 0, 1, 2, 3, 4, 5 of the third region is formed in the second boundary band.

6. The compound objective lens according to claim 4, wherein a diffraction structure having a sawtooth cross section or a stepwise cross section that approximates the sawtooth cross section is formed in the first region;

a height ds of one step of the steps in the first region provides the blue light beam, which has the wavelength $\lambda 1$, with a difference in optical path length of less than 0.5 wavelength;

a height of the sawtooth cross section or the stepwise cross section that approximates the sawtooth cross section that is formed in the first region provides the blue light beam, which has the wavelength $\lambda 1$, with a difference in optical path length of N times (N is a natural number) the wavelength $\lambda 1$, as compared with a case of transmission in air;

at least one of a slope having a width of N/2 period and a slope having a difference in height providing the blue light beam, which has the wavelength $\lambda 1$, with a difference in optical path length of N/2 wavelength is formed in the first boundary band from an intermediate height of an uppermost level and a lowermost level of the second region toward a sawtooth sloping direction in the first region at an end of one period of the diffraction structure having a stepwise cross section and formed in the second region;

the 2nd-order diffracted light beam of the blue light beam generated from the third region, the 1st-order diffracted light beam of the blue light beam generated from the second region, and the Nth-order diffracted light beam of the blue light beam generated from the first region are condensed via the transparent base material with the thickness t1;

the −2nd-order diffracted light beam of the red light beam generated from the third region and the −1st-order diffracted light beam of the red light beam generated from the second region are condensed via the transparent base material with the thickness t2 that is larger than the thickness t1; and the −3rd-order diffracted light beam of the infrared light beam generated from the third region is condensed via a transparent base material with the thickness t3 that is larger than the thickness t2.

7. The compound objective lens according to claim 4, wherein a focal length of the red light beam is larger than a focal length of the blue light beam; and a focal length of the infrared light beam is larger than the focal length of the red light beam.

8. The compound objective lens according to claim 4, wherein the red light beam and the infrared light beam are subjected to a concave lens action by the diffraction structure.

9. The compound objective lens according to claim 1, wherein the blue light beam is subjected to a concave lens action by the diffraction structure.

10. An optical head device comprising:

a first light beam source emitting a blue light beam having a wavelength $\lambda 1$;

a second light beam source emitting a red light beam having a wavelength $\lambda 2$;

the compound objective lens described in claim 1 that condenses the blue light beam emitted from the first light beam source on a recording surface of an optical disk via a transparent base material with a thickness t1 and also condenses the red light beam emitted from the second light beam source on the recording surface of the optical disk via a transparent base material with a thickness t2 that is larger than the thickness t1; and a photodetector that receives the blue light beam or the red light beam reflected on the recording surface of the optical disk and outputs an electric signal in response to a received light quantity.

11. An optical information device comprising:

the optical head device according to claim 10;

a motor that rotates an optical disk; and a control unit that controls the motor and the optical head device on the basis of the electric signal obtained from the optical head device.

12. An information processing device comprising:

the optical information device according to claim 11; and an information processing unit that processes information recorded in the optical information device and/or information reproduced from the optical information device.

13. A compound objective lens comprising:

an optical element having a diffraction structure; and a refractive lens, wherein the diffraction structure includes a first region, a second region, and a first boundary band provided between the first region and the second region;

a diffraction structure having a stepwise cross section is formed in the first region;

a height da of one step of the steps of the first region provides a blue light beam, which has a wavelength $\lambda 1$, with a difference in optical path length of 1.25 wavelength and provides a red light beam, which has a wavelength $\lambda 2$, with a difference in optical path length of 0.75 wavelength;

a diffraction structure having a sawtooth cross section or a stepwise cross section that approximates the sawtooth cross section is formed in the second region;

a height ds of one step of the steps in the second region provides the blue light beam, which has the wavelength $\lambda 1$, with a difference in optical path length of less than 0.5 wavelength;

a height of the sawtooth cross section or the stepwise cross section that approximates the sawtooth cross section that is formed in the second region provides the blue light beam, which has the wavelength $\lambda 1$, with a difference in optical path length of N times (N is a natural number) the wavelength $\lambda 1$, as compared with a case of transmission in air;

at least one of a slope having a width of N/2 period and a slope having a difference in height providing the blue light beam, which has the wavelength $\lambda 1$, with a difference in optical path length of N/2 wavelength is formed in the first boundary band from an intermediate height of an uppermost level and a lowermost level of the first region toward a sawtooth sloping direction in the second region at an end of one period of the diffraction structure having a stepwise cross section and formed in the first region;

in the first region, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$;

in the second region, an Nth-order diffracted light beam is generated most strongly with respect to the blue light beam having the wavelength $\lambda 1$;

the 1st-order diffracted light beam of the blue light beam generated from the first region and the Nth-order diffracted light beam of the blue light beam generated from the second region are condensed via a transparent base material with a thickness t1; and the −1st-order diffracted light beam of the red light beam generated from the first region is condensed via a transparent base material with a thickness t2 that is larger than the thickness t1.

14. The compound objective lens according to claim 13, wherein the N is equal to 3;

at least one of a slope having a width of 3/2 period and a slope having a difference in height providing the blue light beam, which has the wavelength $\lambda 1$, with a difference in optical path length of 3/2 wavelength is formed in the first boundary band from an intermediate height of an uppermost level and a lowermost level of the first region toward a sawtooth sloping direction in the second region at an end of one period of the diffraction structure having a stepwise cross section and formed in the first region;

in the first region, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$;

in the second region, a 3rd-order diffracted light beam is generated most strongly with respect to the blue light beam having the wavelength $\lambda 1$;

the 1st-order diffracted light beam of the blue light beam generated from the first region and the 3rd-order diffracted light beam of the blue light beam generated from the second region are condensed via the transparent base material with the thickness t1; and the −1st-order diffracted light beam of the red light beam generated from the first region is condensed via the transparent base material with the thickness t2.

15. The compound objective lens according to claim 13, wherein the diffraction structure further includes a third region formed on the inside of the first region and a second boundary band provided between the first region and the third region;

a diffraction structure having a stepwise cross section with (N2−1) steps and N2 levels (N2 is a positive even number) is formed in the third region;

a diffraction structure having a stepwise cross section with (M2−1) steps and M2 levels (M2 is a positive even number different from N2 and less than N2) is formed in the first region; and a diffraction structure having a stepwise cross section with (N2+M2)/2 levels is formed in the second boundary band, with average levels of the third region and the first region being matched.

16. The compound objective lens according to claim 15, wherein a diffraction structure having a stepwise cross section with 7 steps and 8 levels is formed in the third region;

a diffraction structure having a stepwise cross section with 3 steps and 4 levels is formed in the first region;

a height da of one step in the steps of the third region and the first region provides the blue light beam, which has the wavelength $\lambda 1$, with a difference in optical path length of 1.25 wavelength and provides the red light beam, which has the wavelength $\lambda 2$, with a difference in optical path length of 0.75 wavelength;

when the 8 levels in the stepwise cross section with 7 steps and 8 levels that is formed in the third region are defined as levels 0, 1, 2, 3, 4, 5, 6, 7 in ascending order from the lower side to the higher side, the 4 levels of the stepwise cross section with 3 steps and 4 levels that is formed in the first region are set to the same height as the levels 2, 3, 4, 5 of the third region;

in the third region, a 2nd-order diffracted light beam is generated most strongly with respect to the blue light beam having the wavelength $\lambda 1$ and a −2nd-order diffracted light beam is generated most strongly with respect to the red light beam having the wavelength $\lambda 2$;

in the first region, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$;

the 2nd-order diffracted light beam of the blue light beam generated from the third region and the 1st-order diffracted light beam of the blue light beam generated from the first region are condensed via the transparent base material with the thickness t1;

the −2nd-order diffracted light beam of the red light beam generated from the third region and the −1st-order diffracted light beam of the red light beam generated from the first region are condensed via the transparent base material with the thickness t2 that is larger than the thickness t1; and a −3rd-order diffracted light beam of the infrared light beam generated from the third region is condensed via a transparent base material with a thickness t3 that is larger than the thickness t2.

17. The compound objective lens according to claim 16, wherein a diffraction structure having a stepwise cross section with levels identical to the levels 0, 1, 2, 3, 4, 5 of the third region is formed in the second boundary band.

18. The compound objective lens according to claim 16, wherein a diffraction structure having a sawtooth cross section or a stepwise cross section that approximates the sawtooth cross section is formed in the second region;

a height ds of one step of the steps in the second region provides the blue light beam, which has the wavelength $\lambda 1$, with a difference in optical path length of less than 0.5 wavelength;

a height of the sawtooth cross section or the stepwise cross section that approximates the sawtooth cross section that is formed in the second region provides the blue light beam, which has the wavelength $\lambda 1$ with a difference in optical path length of N times (N is a natural number) the wavelength $\lambda 1$, as compared with a case of transmission in air;

at least one of a slope having a width of N/2 period and a slope having a difference in height providing the blue light beam, which has the wavelength $\lambda 1$, with a difference in optical path length of N/2 wavelength is formed in the first boundary band from an intermediate height of an uppermost level and a lowermost level of the first region toward a sawtooth sloping direction in the second region at an end of one period of the diffraction structure having a stepwise cross section and formed in the first region;

the 2nd-order diffracted light beam of the blue light beam generated from the third region, the 1st-order diffracted light beam of the blue light beam generated from the first region, and the Nth-order diffracted light beam of the blue light beam generated from the second region are condensed via the transparent base material with the thickness t1;

the −2nd-order diffracted light beam of the red light beam generated from the third region and the −1st-order diffracted light beam of the red light beam generated from the first region are condensed via the transparent base material with the thickness t2 that is larger than the thickness t1; and the −3rd-order diffracted light beam of the infrared light beam generated from the third region is condensed via a transparent base material with the thickness t3 that is larger than the thickness t2.

19. A compound objective lens comprising:

an optical element having a diffraction structure; and a refractive lens, wherein the diffraction structure includes a first region, a second region, and a boundary band provided between the first region and the second region;

the first region and the second region each have formed therein any diffraction structure from among a first diffraction structure constituted by steps, such that one step provides a difference in optical path length of equal to or greater than 1 wavelength and equal to or less than 1.5 wavelength, a shape between an uppermost level and a lowermost level thereof having a stepwise cross section with NE steps and (NE+1) levels (NE is a positive even number), a second diffraction structure constituted by steps, such that one step provides a difference in optical path length of equal to or greater than 1 wavelength and equal to or less than 1.5 wavelength, a shape between an uppermost level and a lowermost level thereof having a stepwise cross section with NO steps and (NO+1) levels (NO is a positive odd number), and a third diffraction structure having a sawtooth cross section, mutually different diffraction structures are formed in the first region and the second region; and a point in the center between the uppermost level and the lowermost level of the first diffraction structure is defined as a reference point, a point in the uppermost level or the lowermost level of the second diffraction structure is defined as a reference point, and a point in the center between the uppermost level and the lowermost level of the third diffraction structure is defined as a reference point, and the reference point of the diffraction structure of the first region is matched with the reference point of the diffraction structure of the second region in the boundary band.

20. The compound objective lens according to claim 19, wherein the first diffraction structure having a stepwise cross section with 6 steps and 7 levels is formed in the first region;

the second diffraction structure having a stepwise cross section with 3 steps and 4 levels is formed in the second region;

a height da of one step of the steps of the first diffraction structure and the second diffraction structure provides the blue light beam, which has the wavelength $\lambda 1$, with a difference in optical path length of 1.14 wavelength and provides the red light beam, which has the wavelength $\lambda 2$, with a difference in optical path length of 0.7 wavelength;

the boundary band has a step of 0.5 period of the first region;

in the first region, a 1st-order diffracted light beam is generated most strongly with respect to the blue light beam having the wavelength $\lambda 1$ and a −2nd-order diffracted light beam is generated most strongly with respect to the red light beam having the wavelength $\lambda 2$;

in the second region, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$;

the 2nd-order diffracted light beam of the blue light beam generated from the first region and the 1st-order diffracted light beam of the blue light beam generated from the second region are condensed via the transparent base material with the thickness t1;

the −2nd-order diffracted light beam of the red light beam generated from the first region and the −1st-order diffracted light beam of the red light beam generated from the second region are condensed via the transparent base material with the thickness t2 that is larger than the thickness t1; and a −3rd-order diffracted light beam of the infrared light beam generated from the first region is condensed via a transparent base material with a thickness t3 that is larger than the thickness t2.

21. The compound objective lens according to claim 19, wherein the first diffraction structure having a stepwise cross section with 6 steps and 7 levels is formed in the first region;

the second diffraction structure having a stepwise cross section with 3 steps and 4 levels is formed in the second region;

a height da of respective one step of the first diffraction structure and the second diffraction structure provides the blue light beam, which has the wavelength $\lambda 1$, with a difference in optical path length of 1.14 wavelength and provides the red light beam, which has the wavelength $\lambda 2$, with a difference in optical path length of 0.7 wavelength;

the boundary band has a step of 0.5 period of the second region;

in the first region, a 1st-order diffracted light beam is generated most strongly with respect to the blue light beam having the wavelength $\lambda 1$ and a −2nd-order diffracted light beam is generated most strongly with respect to the red light beam having the wavelength $\lambda 2$;

in the second region, a 1st-order diffracted light beam is generated most strongly with respect to the blue light beam having the wavelength $\lambda 1$ and a −1st-order diffracted light beam is generated most strongly with respect to the red light beam having the wavelength $\lambda 2$;

the 2nd-order diffracted light beam of the blue light beam generated from the first region and the 1st-order diffracted light beam of the blue light beam generated from the second region are condensed via the transparent base material with the thickness t1;

the −2nd-order diffracted light beam of the red light beam generated from the first region and the −1st-order diffracted light beam of the red light beam generated from the second region are condensed via the transparent base material with the thickness t2 that is larger than the thickness t1; and a −3rd-order diffracted light beam of the infrared light beam generated from the first region is condensed via a transparent base material with a thickness t3 that is larger than the thickness t2.

22. The compound objective lens according to claim 19, wherein the diffraction structure includes a third region formed on the outside of the second region;

a diffraction structure having a sawtooth cross section or a stepwise cross section that approximates the sawtooth cross section is formed in the third region;

a height ds of one step of the steps in the third region provides the blue light beam, which has the wavelength $\lambda 1$, with a difference in optical path length of less than 0.5 wavelength;

a height of the sawtooth cross section or the stepwise cross section that approximates the sawtooth cross section that is formed in the third region provides the blue light beam, which has the wavelength $\lambda 1$, with a difference in optical path length of N times (N is a natural number) the wavelength $\lambda 1$, as compared with a case of transmission in air;

at least one of a slope having a width of N/2 period and a slope having a difference in height providing the blue light beam, which has the wavelength $\lambda 1$, with a difference in optical path length of N/2 wavelength is formed from an intermediate height of an uppermost level and a lowermost level of the second region toward a sawtooth sloping direction in the third region at an end of one period of the diffraction structure having a stepwise cross section and formed in the second region;

the 1st-order diffracted light beam of the blue light beam generated from the first region, the 1st-order diffracted light beam of the blue light beam generated from the second region, and the Nth-order diffracted light beam of the blue light beam generated from the third region are condensed via the transparent base material with the thickness t1;

the −2nd-order diffracted light beam of the red light beam generated from the first region and the −1st-order diffracted light beam of the red light beam generated from the second region are condensed via the transparent base material with the thickness t2 that is larger than the thickness t1; and the −3rd-order diffracted light beam of the infrared light beam generated from the first region is condensed via a transparent base material with the thickness t3 that is larger than the thickness t2.

* * * * *